(12) United States Patent
Hasegawa

(10) Patent No.: US 7,977,399 B2
(45) Date of Patent: Jul. 12, 2011

(54) CURABLE COMPOSITION

(75) Inventor: Nobuhiro Hasegawa, Settsu (JP)

(73) Assignee: Kaneka Corporation, Osaka (JP)

( * ) Notice: Subject to any disclaimer, the term of this patent is extended or adjusted under 35 U.S.C. 154(b) by 259 days.

(21) Appl. No.: 12/444,303

(22) PCT Filed: Oct. 5, 2007

(86) PCT No.: PCT/JP2007/069583
§ 371 (c)(1),
(2), (4) Date: Apr. 3, 2009

(87) PCT Pub. No.: WO2008/041768
PCT Pub. Date: Apr. 10, 2008

(65) Prior Publication Data
US 2010/0105798 A1    Apr. 29, 2010

(30) Foreign Application Priority Data

Oct. 5, 2006  (JP) .................................. 2006-274458
Aug. 29, 2007 (JP) .................................. 2007-222421

(51) Int. Cl.
*C08L 33/04*   (2006.01)
*C08L 101/02*  (2006.01)
*C08L 20/10*   (2006.01)
*C08F 2/46*    (2006.01)

(52) U.S. Cl. ........ 522/112; 522/111; 522/109; 525/100; 525/101; 525/330.3

(58) Field of Classification Search .......... 522/109–112, 522/148; 525/100, 101, 330.3
See application file for complete search history.

(56) References Cited

U.S. PATENT DOCUMENTS

| | | | | |
|---|---|---|---|---|
| 6,274,688 | B1 * | 8/2001 | Nakagawa et al. | 526/329.7 |
| 6,407,146 | B1 * | 6/2002 | Fujita et al. | 522/99 |
| 6,552,118 | B2 * | 4/2003 | Fujita et al. | 524/588 |
| 6,964,999 | B1 | 11/2005 | Nakagawa et al. | |
| 7,081,494 | B2 * | 7/2006 | Fujita et al. | 524/543 |
| 7,388,038 | B2 * | 6/2008 | Fujita et al. | 522/99 |
| 7,601,781 | B2 * | 10/2009 | Fujita et al. | 525/100 |
| 7,781,559 | B2 * | 8/2010 | Saito et al. | 528/32 |
| 2004/0029990 | A1 | 2/2004 | Fujita et al. | |
| 2006/0160918 | A1 | 7/2006 | Fujita et al. | |

FOREIGN PATENT DOCUMENTS

| | | |
|---|---|---|
| EP | 0696621 A1 | 2/1996 |
| EP | 0774496 A1 | 5/1997 |
| EP | 0789050 A2 | 8/1997 |
| JP | 61-127711 A | 6/1986 |
| JP | 01-247403 A | 10/1989 |
| JP | 2-1859 B2 | 1/1990 |
| JP | 05-211922 A | 8/1993 |
| JP | 05-255415 A | 10/1993 |
| JP | 05-262808 A | 10/1993 |
| JP | 09-272714 A | 10/1997 |
| JP | 11-005815 A | 1/1999 |
| JP | 11-043512 A | 2/1999 |
| JP | 11-080571 A | 3/1999 |
| JP | 11-116617 A | 4/1999 |
| JP | 11-130931 A | 5/1999 |
| JP | 2000-038404 A | 2/2000 |
| JP | 2000-044626 A | 2/2000 |
| JP | 2000-072804 A | 3/2000 |
| JP | 2000-072816 A | 3/2000 |
| JP | 2000-086999 A | 3/2000 |
| JP | 2000-191912 A | 7/2000 |
| JP | 2001-011319 A | 1/2001 |
| JP | 2005-023206 A | 1/2005 |
| JP | 2005-105065 A | 4/2005 |
| JP | 2005-120174 A | 5/2005 |
| JP | 2005-179387 A | 7/2005 |
| JP | 2005-290244 A | 10/2005 |
| JP | 2005-290271 A | 10/2005 |
| JP | 2007-016248 A | 1/2007 |
| WO | 2005/030866 A1 | 4/2005 |

OTHER PUBLICATIONS

European Search Report dated Sep. 29, 2009, issued in corresponding European Patent Application No. 07829321.4.
International Search Report of PCT/JP2007/069583 with the mailing date of Dec. 11, 2007.

* cited by examiner

*Primary Examiner* — Susan W Berman
(74) *Attorney, Agent, or Firm* — Westerman, Hattori, Daniels & Adrian, LLP

(57) ABSTRACT

Disclosed is a curable composition which can be cured quickly by light. This curable composition is not left uncured even in portions which are not irradiated with light. A cured product of this curable composition is excellent in heat resistance, oil resistance and weather resistance. Specifically disclosed is a curable composition characterized by containing a vinyl polymer having at least one crosslinkable silyl group on average and a vinyl polymer having at least one photocrosslinkable group on average.

17 Claims, No Drawings

CURABLE COMPOSITION

TECHNICAL FIELD

The present invention relates to a curable composition. More particularly, the present invention relates to a curable composition which includes a vinyl polymer (I) having at least one crosslinkable silyl group on average, a vinyl polymer (II) having at least one photo-crosslinkable group on average, and a photopolymerization initiator (III).

BACKGROUND ART

As a curable composition that includes a functional group, for example, a moisture curable liquid polymer having a crosslinkable silyl group, and involving a polysiloxane based, polyoxypropylene or polyisobutylene main chain has been hitherto known. However, the curable composition prepared using such a polymer is still to be improved in some respects. Although the polysiloxane type is superior in the weather resistance, heat resistance, cold resistance, flexibility and the like, there are still problems in staining possibility due to bleeding of the low-molecular weight component, and also to painting performance. The polyoxypropylene type is superior in the flexibility, painting performance, and stain resistance; however, to the contrary, the weather resistance may not be sufficient in some cases. Although the polyisobutylene type is characteristic in the weather resistance, and moisture-resistant permeability, it has comparatively high viscosity, and is thus disadvantageous in difficulty in handling, and also requires some ingenuity for providing in one-component type.

Furthermore, polymers having an alkenyl group as a functional group are also used as a curable composition. It is known that by using a compound having a hydrosilyl group as a curing agent, a cured product that is superior in the heat resistance, durability, and deep section curability is provided. A variety of such polymer main chain skeletons having an alkenyl group have been known, and illustrative examples include polyether polymers such as polyethylene oxide, polypropylene oxide, and polytetramethylene oxide, hydrocarbon polymers such as polybutadiene, polyisoprene, polychloroprene, and polyisobutylene or hydrogenated products thereof, polyester polymers such as polyethylene terephthalate, polybutylene terephthalate, and polycaprolactone, silicone polymers such as polydimethylsiloxane, and the like.

Also, the curable compositions prepared using any of these polymers are still to be improved in some respects. For example, the polyether cured products may have insufficient heat resistance and weather resistance in certain applications. The hydrocarbon cured products such as polybutadiene and polyisoprene may be deficient in the heat resistance and weather resistance to some extent due to the internal double bonds that remain in the main chain in certain applications. Although the polyisobutylene cured products free from internal double bonds are superior in the weather resistance, they have comparatively high viscosity, and the handling may thus be difficult. Also in the case of the polyester cured products, the weather resistance may be insufficient in certain applications. Although the silicone cured products are superior in the weather resistance, heat resistance, cold resistance, and workability, there still remain problems of paint adhesiveness, staining possibility, and the like.

On the other hand, a variety of vinyl polymers having a functional group have also been known. For example, a synthesis method of a (meth)acrylic polymer having an alkenyl group at the end in which an alkenyl group-containing disulfide is used as a chain transfer agent (see Patent Document 1 and Patent Document 2); a method for obtaining a (meth) acrylic polymer having an alkenyl group at the end which includes synthesizing a vinyl polymer having a hydroxyl group at both ends using disulfide having a hydroxyl group, followed by utilizing the reactivity of the hydroxyl group (see Patent Document 3); and a method for obtaining a (meth) acrylic polymer having a silyl group at the end which includes synthesizing a vinyl polymer having a hydroxyl group at both ends using polysulfide having a hydroxyl group, followed by utilizing the reactivity of the hydroxyl group (see Patent Document 4) were disclosed so far.

On the other hand, an acrylic rubber polymer to which an active chlorine group or an epoxy group was introduced has been used conventionally for acrylic rubber compositions for molding, whereby molded articles having superior heat resistance and oil resistance have been obtained. In this regard, in attempts to meet the needs for further improving the heat resistance, techniques for introducing a vinyl group-containing organic silicon group were proposed (see Patent Document 5 and Patent Document 6).

The curable compositions including a polymer having an alkenyl group or a crosslinkable silyl group at the side chain obtained by these methods have been utilized for paints having superior weather resistance, and the like.

However, although these methods can readily produce the polymer, to introduce a silicon group at both ends into the polymer without fail is difficult, and the cured product of the same may have insufficient rubber physical properties such as elongation. Accordingly, a curable composition having satisfactory characteristics could not be obtained. In order to introduce the functional group at both ends without fail, a chain transfer agent must be used in a large amount, thereby leading to problems in production steps. In addition, since common radical polymerization is used in these methods, to control the molecular weight, and the molecular weight distribution (ratio of weight average molecular weight and number average molecular weight) of the resulting polymer has been difficult.

Provided that the vinyl polymer having a crosslinkable silyl group at the end of the molecular chain can be produced by a simple method, cured products having superior physical properties as compared with those having a crosslinkable group at the side chain would be able to be obtained. Therefore, many researchers have investigated the production method of the same; however, their industrial production cannot be performed easily.

Accordingly, in order to solve such problems, methods for production of a (meth)acrylic polymer having a functional group at the end have been developed. In particular, in the case of polymers synthesized using living radical polymerization, the molecular weight and the molecular weight distribution can be arbitrarily controlled, and the functional group can be introduced quantitatively also to the end. As a result, such methods can be utilized in curable compositions that are superior in the weather resistance, heat resistance, oil resistance and the like, and have favorable mechanical physical properties which could not be achieved with the aforementioned polyether polymers, hydrocarbon polymers, or polyester polymers (see Patent Document 7 to Patent Document 17).

However, in the case of the vinyl polymer having at least one crosslinkable silyl group, in which the main chain is produced by a living radical polymerization process, fast curing can be hardly achieved owing to the characteristics of the functional group. Thus, photo-curing has come to be enabled by using as a functional group a vinyl polymer including a group having a polymerizable double bond such as a (meth)acryloyl group, whereby fast curing on a second time scale has come to be realized (see Patent Document 18 to Patent Document 21).

Patent Document 1: JP-A-01-247403,
Patent Document 2: JP-A-05-255415
Patent Document 3: JP-A-05-262808
Patent Document 4: JP-A-05-211922
Patent Document 5: JP-A-61-127711,
Patent Document 6: JP-B-02-001859
Patent Document 7: JP-A-09-272714,
Patent Document 8: JP-A-11-005815,
Patent Document 9: JP-A-11-043512,
Patent Document 10: JP-A-11-080571,
Patent Document 11: JP-A-11-116617,
Patent Document 12: JP-A-11-130931,
Patent Document 13: JP-A-12-086999,
Patent Document 14: JP-A-12-191912,
Patent Document 15: JP-A-2000-038404,
Patent Document 16: JP-A-2000-044626,
Patent Document 17: JP-A-2000-072804
Patent Document 18: WO 2005-030866,
Patent Document 19: JP-A-2005-105065,
Patent Document 20: JP-A-2005-023206
Patent Document 21: JP-A-2000-72816

DISCLOSURE OF THE INVENTION

Problems to be Solved by the Invention

However, the composition prepared using this photocurable vinyl polymer is disadvantageous in that a part on which the light cannot be irradiated, or a part to which the light does not reach is not hardened at all. Thus, in some modes of use, problems of getting dirt and the like may be caused by unhardened composition flowed out following the photo curing.

Accordingly, an object of the present invention is to provide a curable composition which can solve the aforementioned problem, i.e., the problem of remaining the part unhardened where light irradiation is insufficient such as, e.g., failure in light irradiation with conventional photocurable compositions, while making the resulting cured product superior in mechanical physical properties, heat resistance, oil resistance and weather resistance, with the photocurable polymer being capable of keeping rapid curability inherent to the same.

Means for Solving the Problems

In view of the foregoing current status, the present inventors elaborately investigated, and consequently found that the problems described above can be solved by using a curable composition which includes: a vinyl polymer having at least one crosslinkable silyl group on average; a vinyl polymer having at least one photo-crosslinkable group on average; and a photopolymerization initiator. Accordingly, the present invention was accomplished.

More specifically, one aspect of the present invention is to provide a curable composition including a vinyl polymer (I) having at least one crosslinkable functional group on average represented by the following general formula (1) (hereinafter, may be merely referred to as "crosslinkable silyl group"), a vinyl polymer (II) having at least one crosslinkable functional group on average represented by the following general formula (2) (hereinafter, may be merely referred to as "photo-crosslinkable group" or "(meth)acryloyl group"), and a photopolymerization initiator (III);

the general formula (1):

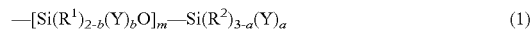

(wherein, $R^1$ and $R^2$ are the same or different, and represent an alkyl group having 1 to 20 carbon atoms, an aryl group having 6 to 20 carbon atoms, an aralkyl group having 7 to 20 carbon atoms, or a triorganosiloxy group represented by $(R')_3SiO-$ (wherein, R' represents a monovalent hydrocarbon group having 1 to 20 carbon atoms, and R' present in multiple number may be the same or different), and when $R^1$ or $R^2$ is each present in the number of 2 or more, they may be the same or different; Y represents a hydroxyl group or a hydrolyzable group, and when Y is present in the number of two or more, they may be the same or different; a represents 0, 1, 2 or 3; b represents 0, 1, or 2; and m represents an integer of 0 to 19; and wherein, the relational expression of a+mb=1 is satisfied.)

the general formula (2):

$$-OC(O)C(R^a)=CH_2 \qquad (2)$$

(wherein, $R^a$ represents a hydrogen atom, or an organic group having 1 to 20 carbon atoms).

As the above vinyl polymer (II), a product yielded by allowing a vinyl polymer having a halogen group at the end to react with a compound represented by the general formula (3):

$$M^+ {}^-OC(O)C(R^a)=CH_2 \qquad (3)$$

(wherein, $R^a$ represents a hydrogen atom, or an organic group having 1 to 20 carbon atoms; and $M^+$ represents an alkali metal ion or a quaternary ammonium ion.) can be used.

The above vinyl polymer having a halogen group at the end preferably has a group represented by the general formula (4):

$$-CR^3R^4X \qquad (4)$$

(wherein, $R^3$ and $R^4$ represent a group bound to an ethylenic unsaturated group of the vinyl monomer; and X represents a chlorine atom, a bromine atom or an iodine atom).

The aforementioned vinyl polymer (I) and/or the vinyl polymer (II) preferably have a molecular weight distribution of less than 1.8.

The main chain of the vinyl polymer (I) and/or the vinyl polymer (II) is preferably one produced by polymerizing mainly a monomer selected from the group consisting of a (meth)acrylic monomer, an acrylonitrile monomer, an aromatic vinyl monomer, a fluorine-containing vinyl monomer and a silicon-containing vinyl monomer. Of these, a (meth)acrylic polymer, or an acrylic polymer is more preferred, and an acrylate ester polymer is particularly preferred.

The main chain of the vinyl polymer (I) and/or the vinyl polymer (II) is preferably produced by a living radical polymerization process, and more preferably produced by an atom transfer radical polymerization process.

The vinyl polymer (I) and/or the vinyl polymer (II) preferably have at least one crosslinkable functional group in the molecular chain at the end.

It is preferred the amount of the vinyl polymer (II) blended be no less than 20% and no greater than 80% of the total amount of the vinyl polymer (I) and the vinyl polymer (II) by weight ratio.

The curable composition may further include a polyether polymer (IV).

It is preferred that the main chain of the polyether polymer (IV) be substantially polypropylene oxide, and also that the polyether polymer (IV) has at least one crosslinkable silyl group on average.

The curable composition may further include a vinyl polymer (V) having a number average molecular weight of no greater than 5,000.

It is preferred that the vinyl polymer (V) has a molecular weight distribution of less than 1.8.

EFFECTS OF THE INVENTION

According to the curable composition of the present invention, the problem of remaining a part unhardened where light irradiation is insufficient such as, e.g., failure in light irradiation and failure in approach of the light can be solved. In addition, rapid curability with light can be achieved at a part on which the light is irradiated, and the resulting cured product can have superior mechanical physical properties, heat resistance, oil resistance, and weather resistance.

BEST MODE FOR CARRYING OUT THE INVENTION

Hereinafter, the curable composition of the present invention is explained in detail.

Vinyl Polymers (I) and (II)

The main chains of the vinyl polymer (I) and the vinyl polymer (II) (hereinafter, the "vinyl polymer (I)" and "vinyl polymer (II)" may be merely referred to as "vinyl polymer") may be either the same or different. However, in light of the compatibility, it is more preferred that they have a similar substituent such as an ester group.

Since both polymers can be commonly explained with respect to the main chain, production method and the like, such explanations are made together in the following.

Main Chain

Heretofore, the present inventors have made a number of inventions relating to a variety of vinyl polymers having a crosslinkable functional group at the polymer end, as well as production methods, curable compositions, and applications of the same (see JP-A-11-080249, JP-A-11-080250, JP-A-11-005815, JP-A-11-116617, JP-A-11-116606, JP-A-11-080571, JP-A-11-080570, JP-A-11-130931, JP-A-11-100433, JP-A-11-116763, JP-A-09-272714 and JP-A-09-272715, and the like). The polymers disclosed in the aforementioned patent publications may be suitably used as the vinyl polymer of the present invention. The vinyl polymer of the present invention is not limited thereto, but the vinyl polymer as described below can be also used.

The vinyl monomer that may constitute the main chain of the vinyl polymer of the present invention is not particularly limited, and various types of monomers can be used.

Illustrative examples include: (meth)acrylic monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, isononyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, octadecyl (meth)acrylate, glycidyl (meth)acrylate, 2-aminoethyl (meth)acrylate, γ-(methacryloyloxypropyl)trimethoxysilane, ethylene oxide adducts of (meth)acrylic acid, trifluoromethylmethyl(meth)acrylate, 2trifluoromethylethyl (meth)acrylate, perfluoroethylmethyl (meth)acrylate, 2-perfluoroethylethyl (meth)acrylate, Perfluoroethylperfluorobutylmethyl (meth)acrylate, 2-perfluoroethyl-2-perfluorobutylethyl (meth)acrylate, Perfluoroethyl (meth)acrylate, perfluoromethyl (meth)acrylate, Diperfluoromethylmethyl (meth)acrylate, 2,2-diperfluoromethylethyl (meth)acrylate, Perfluoromethylperfluoroethylmethyl (meth)acrylate, 2-perfluoromethyl-2-perfluoroethylethyl (meth)acrylate, 2-perfluorohexylmethyl (meth)acrylate, 2-perfluorohexylethyl (meth)acrylate, 2-perfluorodecylmethyl (meth)acrylate, 2-perfluorodecylethyl (meth)acrylate, 2-perfluorohexadecylmethyl (meth)acrylate, and 2-perfluorohexadecylethyl (meth)acrylate; aromatic vinyl monomers such as styrene, vinyltoluene, a-methylstyrene, chlorstyrene, styrenesulfonic acid and salts thereof; fluorine-containing vinyl monomers such as perfluoroethylene, perfluoropropylene, and vinylidene fluoride; silicon-containing vinyl monomers such as vinyltrimethoxysilane, and vinyltriethoxysilane; maleic anhydride, maleic acid, monoalkyl esters and dialkyl esters of maleic acid; fumaric acid, monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; acrylonitrile monomers such as acrylonitrile, and methacrylonitrile; amide group-containing vinyl monomers such as acrylamide, and methacrylamide; vinyl esters such as vinyl acetate, vinyl propionate, vinyl pivalate, vinyl benzoate, and vinyl cinnamate; alkenes such as ethylene, and propylene; conjugated dienes such as butadiene, and isoprene; vinyl chloride, vinylidene chloride, allyl chloride, allyl alcohol, and the like. These may be used alone, and multiple monomers may be copolymerized.

It is preferred that the main chain of the vinyl polymer be one produced by polymerizing mainly at least one monomer selected from the group consisting of a (meth)acrylic monomer, an acrylonitrile monomer, an aromatic vinyl monomer, a fluorine-containing vinyl monomer and a silicon-containing vinyl monomer. The term "mainly" herein means that the aforementioned monomer accounts for preferably no less than 30% by mole, and more preferably no less than 50% by mole in the monomer units constituting the vinyl polymer.

Among them, the styrene monomer and the (meth)acrylic monomer are preferred in light of the physical properties and the like of the products. The acrylate ester monomers and the methacrylate ester monomers are more preferred, and the acrylate ester monomers are particularly preferred. In light of low viscosity of the blend, physical properties of the cured product such as low modulus, great elongation, weather resistance and heat resistance, butyl acrylate monomers are still further preferred. On the other hand, in applications in which the oil resistance is required such as applications for automobile and the like, copolymers mainly constituted with ethyl acrylate are further preferred. Although the polymer predominantly constituted with ethyl acrylate is superior in the oil resistance, it is likely to be somewhat inferior in the low temperature characteristics (cold resistance). Thus, in order to improve the low temperature characteristics, a part of ethyl acrylate can be replaced with butyl acrylate. However, since the favorable oil resistance is deteriorated as the proportion of butyl acrylate increases, the proportion is preferably no greater than 80% by mole, more preferably no greater than 60% by mole, still more preferably no greater than 40% by mole, and even more preferably no greater than 30% by mole to meet the applications which require oil resistance. Moreover, in order to improve the low temperature characteristics and the like without deteriorating the oil resistance, 2-methoxyethyl acrylate and 2-ethoxyethyl acrylate having oxygen introduced into the alkyl group on the side chain are also preferably used. However, since the heat resistance is likely to be deteriorated by introducing an alkoxy group having an ether linkage in the side chain, the proportion is preferably no greater than 60% by mole, and more preferably no greater than 40% when the heat resistance is required. To meet various types of applications and objects demanded, a suitable polymer can be obtained by varying the proportion taking into consideration the required physical properties such as oil resistance, heat resistance, low temperature characteristics and the like. For example, copolymers of ethyl acrylate/butyl acrylate/2-methoxyethyl acrylate (molar ratio: 40 to 50/20 to 30/20 to 30) may be illustrated as materials capable of providing excellent balance of physical properties such as oil resistance, heat resistance, low temperature characteristics and the like, but not limited thereto.

In order to improve compatibility with other polymer, such as e.g., a modified silicone resin (an oxyalkylene polymer having a crosslinkable silyl group), copolymerization with a monomer having a long chain alkyl group such as an octadecyl group, a dodecyl group, or the like is acceptable. Although not particularly limited, for example, compatibility with modified silicone resins is significantly elevated by copolymerizing with stearyl acrylate or lauryl acrylate in an amount of 5 to 30% by mole. Since the compatibility may vary depending on the molecular weight of each polymer, the proportion of the monomer to be copolymerized is preferably selected in accordance with the compatibility. In addition, when such copolymerization is to be carried out, block copolymerization may also be conducted, which may lead to the effect in a smaller amount.

In the present invention, these preferable monomers may be copolymerized with other monomer, further, block copolymerization may be also carried out. In such a procedure, these preferable monomers are preferably included in an amount of no less than 40% by weight ratio. In the description herein, for example, (meth)acrylic acid represents acrylic acid and/or methacrylic acid.

The molecular weight distribution, i.e., the ratio (Mw/Mn) of the weight average molecular weight (Mw) measured on a gel permeation chromatography and the number average molecular weight (Mn), of the vinyl polymer of the present invention is not particularly limited. However, the molecular weight distribution is preferably less than 1.8, more preferably no greater than 1.6, still more preferably no greater than 1.4, and particularly preferably no greater than 1.3 in light of the workability. With respect to the GPC determination in the present invention, the measurement is carried out on a polystyrene gel column using chloroform as a mobile phase, and the number average molecular weight may be determined in terms of the polystyrene equivalent.

The number average molecular weight of the vinyl polymer in the present invention is not particularly limited. When determined on a gel permeation chromatography, it is preferably 500 to 1,000,000, more preferably 1,000 to 500,000, still more preferably 2000 to 100,000, and particularly preferably 3,000 to 80,000. In light of the physical properties such as workability, the number average molecular weight is preferably 6,000 to 50,000. Further, as would be expected, elevated compatibility with other resin (various types of polymer) is more likely to be achieved as the molecular weight is smaller, and the resulting cured product is likely to have higher modulus and lower elongation. To the contrary, as the molecular weight is greater, the reverse tendency is exhibited.

Synthesis Method of Main Chain

Although the synthesis method of the vinyl polymer in the present invention is not limited, and free radical polymerization is acceptable, controlled radical polymerization is preferred; living radical polymerization is more preferred; and atom transfer radical polymerization is particularly preferred. Hereinafter, such polymerization is explained.

Controlled Radical Polymerization

Radical polymerization process can be classified into "general radical polymerization process" in which a monomer having a specific functional group is merely copolymerized with a vinyl monomer using an azo compound or peroxide as a polymerization initiator, and "controlled radical polymerization process" which enables a specific functional group to be introduced into a controlled position such as the end.

Although the "general radical polymerization process" is a simple process, the monomer having a specific functional group can be introduced into the polymer merely at random in this process. When to obtain a polymer having a high degree of functionalization is intended, it is necessary to use this monomer in a considerably large quantity. In contrast, to use the monomer in less quantity may be disadvantageous in that the proportion of the polymer into which this specific functional group is not introduced may be increased. Additionally, because free radical polymerization is executed, it is also problematic in that only polymers having a great molecular weight distribution and high viscosity can be obtained.

The "controlled radical polymerization process" can be further classified into "chain transfer agent process" in which polymerization is carried out using a chain transfer agent having a specific functional group, whereby a vinyl polymer having a functional group at the end can be obtained; and "living radical polymerization process" in which the polymerization growing end can grow without causing a termination reaction, whereby a polymer having a molecular weight can be obtained almost as designed.

Although the "chain transfer agent process" enables a polymer having a high degree of functionalization to be obtained, this process requires significant quantities of a chain transfer agent having a specific functional group with respect to the initiator, thereby leading to economical problems, also in respect of the processing. Moreover, since free radical polymerization is carried out similarly to the aforementioned "general radical polymerization process", this process is also problematic in that only polymers having a great molecular weight distribution and high viscosity can be obtained.

Unlike these polymerization processes, the living radical polymerization process which is reportedly difficult to control due to high polymerization rate and the termination reaction that is likely to occur resulting from coupling of the radicals executed in the "living radical polymerization process". However, according to this process, a polymer having smaller molecular weight distribution (Mw/Mn being approximately 1.1 to 1.5) can be obtained accompanied by less likelihood of occurrence of the termination reaction, and the molecular weight can be controlled freely by regulating the ratio of the charged monomer and initiator.

Therefore, the "living radical polymerization process" is more preferred as the process for production of the vinyl polymer having a specific functional group because a polymer having a smaller molecular weight distribution and low viscosity can be obtained, and the monomer having a specific functional group can be introduced into almost any position of the polymer.

The living polymerization in its narrow sense, refers to polymerization in which the molecular chain keeps growing while the end maintains the activity constantly, but in general, may refer to include pseudo living polymerization in which the molecular chain grows in an equilibrium state of the end being inactivated and activated. The living polymerization herein is also defined as the latter to involve pseudo living polymerization.

The "living radical polymerization process" has been actively investigated in recent years by a variety of groups. For example, a process in which a cobalt porphyrin complex is used as disclosed in Journal of American Chemical Society (J. Am. Chem. Soc.), 1994, Vol. 116, p. 7943, a process in which a radical capping agent such as a nitroxide compound is used as disclosed in Macromolecules, 1994, Vol. 27, p. 7228, "Atom Transfer Radical Polymerization: ATRP" in which organic halide or the like is used as an initiator, and a transition metal complex is used as a catalyst, and the like.

Among the "living radical polymerization processes", the "atom transfer radical polymerization process" in which a vinyl monomer is polymerized using an organic halide, a halogenated sulfonyl compound or the like as an initiator, and a transition metal complex as a catalyst is more preferred as the process for production of the vinyl polymer having a specific functional group since halogen or the like which is comparatively advantageous in the transformation reaction of the functional group is involved at the end, and a large degree of freedom of designing the initiator and catalyst is permitted, in addition to the advantageous features of the "living radical polymerization process" described above. Exemplary atom transfer radical polymerization processes are described in, for example: Matyjaszewski et al., J. Am. Chem. Soc., 1995, Vol. 117, p. 5614; Macromolecules, 1995, Vol. 28, p. 7901; Science, 1996, Vol. 272, p. 866; WO96/30421, WO97/18247, WO98/01480, WO98/40415, or Macromolecules, Sawamoto et al., 1995, Vol. 28, p. 1721; JP-A-09-208616, and JP-A-08-41117, and the like.

In the present invention, selection for which process is used among the aforementioned living radical polymerization is not particularly limited, but an atom transfer radical polymerization process is preferred.

The living radical polymerization is explained in detail below, but prior to its explanation, polymerization carried out using a chain transfer agent is explained which is one of the controlled radical polymerization enabling production of the vinyl polymer (V) described later. Although the radical polymerization carried out using a chain transfer agent (telomer) is not particularly limited, illustrative processes for obtaining a vinyl polymer having the end structure suited for the present invention include the following two processes.

More specifically, one process produces a halogen-terminal polymer using a halogenated hydrocarbon as a chain transfer agent as disclosed in JP-A-04-132706, and another process produces a hydroxyl group-terminated polymer using hydroxyl group-containing mercaptan, hydroxyl group-containing polysulfide or the like as a chain transfer agent as disclosed in JP-A-61-271306, Japanese Patent No. 2594402, and JP-A-54-47782.

The living radical polymerization is now explained below.

First, a process carried out using a radical capping agent such as a nitroxide compound is explained. In this polymerization, a stable nitroxy free radical (=N—O.) is generally used as a radical capping agent. Such a compound is not limited, but nitroxy free radicals derived from cyclic hydroxylamine such as 2,2,6,6-substituted-1-piperidinyloxy radical and 2,2,5,5-substituted-1-pyrrolidinyloxy radical are preferred. As the substituent, an alkyl group having no more than 4 carbon atoms such as a methyl group or an ethyl group is suitable. Specific nitroxy free radical compounds include a 2,2,6,6-tetramethyl-1-piperidinyloxy radical (TEMPO), a 2,2,6,6-tetraethyl-1-piperidinyloxy radical, a 2,2,6,6-tetramethyl-4-oxo-1-piperidinyloxy radical, a 2,2,5,5-tetramethyl-1-pyrrolidinyloxy radical, a 1,1,3,3-tetramethyl-2-isoindolinyloxy radical, an N,N-di-t-butylaminoxy radical and the like, but not limited thereto. To use a stable free radical such as a galvinoxyl free radical in place of the nitroxy free radical is also acceptable.

The aforementioned radical capping agent is used in combination with a radical generator. It is believed that a reaction product of the radical capping agent and the radical generator serves as a polymerization initiator, thereby allowing polymerization of the addition-polymerizable monomer to proceed. Although the ratio of both agents is not particularly limited, the radical generator of 0.1 to 10 mol based on 1 mol of the radical capping agent is suited.

As the radical generator, a variety of compounds can be used, and peroxide which can generate a radical under conditions of polymerization temperature is preferred. Although this peroxide is not limited, examples of the peroxide include diacyl peroxides such as benzoyl peroxide and lauroyl peroxide; dialkyl peroxides such as dicumyl peroxide and di-t-butyl peroxide; peroxycarbonates such as diisopropylperoxydicarbonate and bis(4-t-butylcyclohexyl)peroxydicarbonate; and alkyl peresters such as t-butylperoxy octoate and t-butylperoxy benzoate, and the like. Particularly, benzoyl peroxide is preferred. Furthermore, a radical generator such as a radical-generating azo compound such as azobis isobutyronitrile can be used in place of the peroxide.

As reported in Macromolecules 1995, 28, P. 2993, an alkoxyamine compound represented by the following formula may be used as an initiator in place of the radical capping agent and the radical generator used in combination.

[chemical formula 1]

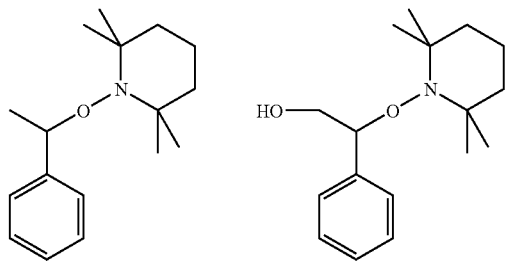

When the alkoxyamine compound is used as an initiator, a polymer having a functional group at the end can be obtained by using the compound having a functional group such as a hydroxyl group as represented by the above formula. By applying the same to the method of the present invention, a polymer having a functional group at the end can be obtained.

The polymerization conditions such as the monomer, the solvent, the polymerization temperature and the like employed in polymerization carried out using the aforementioned radical capping agent such as a nitroxide compound are not limited, and they may be similar to the conditions employed in the atom transfer radical polymerization described in the following.

Atom Transfer Radical Polymerization

Next, the atom transfer radical polymerization process which is more preferable as the living radical polymerization of the present invention is explained.

In the atom transfer radical polymerization, an organic halide, in particular, an organic halide having a highly reactive carbon-halogen bond (for example, a carbonyl compound having halogen at the a-position, a compound having halogen at the benzyl-position), a halogenated sulfonyl compound or the like is used as an initiator.

Specifically, illustrative examples include $C_6H_5$—$CH_2X$, $C_6H_5$—$C(H)(X)CH_3$, $C_6H_5$—$C(X)(CH_3)_2$ (wherein, $C_6H_5$ represents a phenyl group; and X represents chlorine, bromine, or iodine), $R^5$—$C(H)(X)$—$CO_2R^6$, $R^5$—$C(CH_3)(X)$—$CO_2R^6$, $R^5$—$C(H)(X)$—$C(O)R^6$, $R^5$—$C(CH_2)(X)$—$C(O)R^6$, (wherein, $R^5$ and $R^6$ represent a hydrogen atom, or an alkyl group, an aryl group or an aralkyl group having 1 to 20 carbon atoms; and X represents chlorine, bromine, or iodine), and
$R^5$—$C_6H_4$—$SO_2X$ (wherein, $R^5$ represents a hydrogen atom, or an alkyl group, an aryl group or an aralkyl group having 1 to 20 carbon atoms; and X represents chlorine, bromine, or iodine), and the like.

As the initiator for the atom transfer radical polymerization, an organic halide or a halogenated sulfonyl compound having a functional group other than the functional group for initiating the polymerization can be also used. In this case, a vinyl polymer having a functional group at one end of the main chain, and the end structure for the growth in the atom transfer radical polymerization at another end of the main chain is produced. Examples of the functional group include an alkenyl group, a crosslinkable silyl group, a hydroxyl group, an epoxy group, an amino group, an amide group, and the like.

The organic halide having an alkenyl group is not limited, and for example, those having the structure represented by the general formula (10) may be illustrated.

$$R^8R^9C(X)—R^{10}—R^{11}—C(R^7)\!=\!CH_2 \quad (10)$$

(wherein, $R^7$ represents hydrogen or a methyl group; $R^8$ and $R^9$ represent hydrogen, or a monovalent alkyl group, aryl group, or aralkyl group having 1 to 20 carbon atoms, or may form a bond with each other at another end; $R^{10}$ represents —C(O)O-(ester group), —C(O)-(keto group), or an o-, m- or p-phenylene group; $R^{11}$ may include a direct bond, or may include one or more ether linkages with a bivalent organic group having 1 to 20 carbon atoms; and X represents chlorine, bromine, or iodine)

Specific examples of the substituents $R^8$ and $R^9$ include hydrogen, a methyl group, an ethyl group, a n-propyl group, an isopropyl group, a butyl group, a pentyl group, a hexyl group, and the like. $R^8$ and $R^9$ may form a cyclic skeleton through linking at another end.

Specific examples of the organic halide having an alkenyl group represented by the general formula (10) include $XCH_2C(O)O(CH_2)_nCH\!=\!CH_2$, $H_3CC(H)(X)C(O)O(CH_2)_nCH\!=\!CH_2$, $(H_3C)_2C(X)C(O)O(CH_2)_nCH\!=\!CH_2$, $CH_3CH_2C(H)(X)C(O)O(CH_2)_nCH\!=\!CH_2$,

[chemical formula 2]

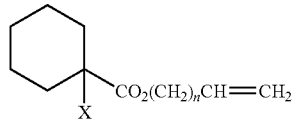
$CO_2(CH_2)_nCH\!=\!CH_2$ (in the above each formula, X represents chlorine, bromine, or iodine, and n represents an integer of 0 to 20)
$XCH_2C(O)O(CH_2)_nO(CH_2)_mCH\!=\!CH_2$, $H_3CC(H)(X)C(O)O(CH_2)_nO(CH_2)_nCH\!=\!CH_2$, $(H_3C)_2C(X)C(O)O(CH_2)_nO(CH_2)_mCH\!=\!CH_2 CH_3CH_2C(H)(X)C(O)O(CH_2)_nO(CH_2)_mCH\!=\!CH_2$,

[chemical formula 3]

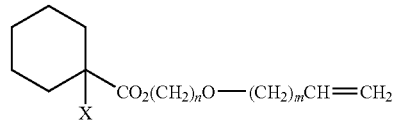
$CO_2(CH_2)_nO$——$(CH_2)_mCH\!=\!CH_2$ (in the above each formula, X represents chlorine, bromine, or iodine, n represents an integer of 1 to 20, and m represents an integer of 0 to 20)
o-, m- or p-$XCH_2$—$C_6H_4$—$(CH_2)_n$—$CH\!=\!CH_2$, o-, m- or p-$CH_3C(H)(X)$—$C_6H_4$—$(CH_2)_n$—$CH\!=\!CH_2$, o-, m- or p-$CH_3CH_2C(H)(X)$—$C_6H_4$—$(CH_2)_n$—$CH\!=\!CH_2$, (in the above each formula, X represents chlorine, bromine, or iodine, and n represents an integer of 0 to 20)
o-, m- or p-$XCH_2$—$C_6H_4$—$(CH_2)_n$—O—$(CH_2)_m$—$CH\!=\!CH_2$, o-, m- or p-$CH_3C(H)(X)$—$C_6H_4$—$(CH_2)_n$—O—$(CH_2)_m$—$CH\!=\!CH_2$, o-, m- or p-$CH_3CH_2C(H)(X)$—$C_6H_4$—$(CH_2)_n$—O—$(CH_2)_m CH\!=\!CH_2$, (in the above each formula, X represents chlorine, bromine, or iodine, n represents an integer of 1 to 20, and m represents an integer of 0 to 20)
o-, m- or p-$XCH_2$—$C_6H_4$—O—$(CH_2)_n$—$CH\!=\!CH_2$, o-, m- or p-$CH_3C(H)(X)$—$C_6H_4$—O—$(CH_2)_n$—$CH\!=\!CH_2$, o-, m- or p-$CH_3CH_2C(H)(X)$—$C_6H_4$—O—$(CH_2)_n$—$CH\!=\!CH_2$, (in the above each formula, X represents chlorine, bromine, or iodine, and n represents an integer of 0 to 20)
o-, m- or p-$XCH_2$—$C_6H_4$—O—$(CH_2)_n$—O—$(CH_2)_m$—$CH\!=\!CH_2$, o-, m- or p-$CH_3C(H)(X)$—$C_6H_4$—O—$(CH_2)_n$—O—$(CH_2)_m$—$CH\!=\!CH_2$, o-, m- or p-$CH_3CH_2C(H)(X)$—$C_6H_4$—O—$(CH_2)_n$—O—$(CH_2)_m$—$CH\!=\!CH_2$, (in the above each formula, X represents chlorine, bromine, or iodine, n represents an integer of 1 to 20, and m represents an integer of 0 to 20).

As the organic halide having an alkenyl group, compounds represented by the general formula (11) are further included.

$$H_2C\!=\!C(R^7)—R^{11}—C(R^8)(X)—R^{12}—R^9 \quad (11)$$

(wherein, $R^7$, $R^8$, $R^9$, $R^{11}$, and X are as defined above, and $R^{12}$ represents a direct bond, —C(O)O-(ester group), —C(O)-(keto group), or an o-, m- or p-phenylene group)

$R^{11}$ represents a direct bond or a bivalent organic group having 1 to 20 carbon atoms which may include one or more ether linkages, however, when $R^{11}$ represents a direct bond, the vinyl group is bound to carbon to which halogen is bound, thereby forming a halogenated allyl compound. In this case, since the carbon-halogen bond is activated by an adjacent vinyl group, it is not necessary to include a C(O)O group, a phenylene group or the like as $R^{12}$, which may be a direct bond. When $R^{11}$ is not a direct bond, $R^{12}$ is preferably a C(O)O group, a C(O) group, or a phenylene group in order to activate the carbon-halogen bond.

Specifically, illustrative examples of the compound represented by the general formula (11) include $CH_2\!=\!CHCH_2X$, $CH_2\!=\!C(CH_3)CH_2X$, $CH_2\!=\!CHC(H)(X)CH_3$, $CH_2\!=\!C(CH_3)C(H)(X)CH_3$, $CH_2\!=\!CHC(X)(CH_3)_2X$, $CH_2\!=\!CHC(H)(X)C_2H_5$, $CH_2\!=\!CHC(H)(X)CH(CH_3)_2$, $CH_2\!=\!CHC(H)(X)C_6H_5$, $CH_2\!=\!CHC(H)(X)CH_2C_6H_5$, $CH_2\!=\!CHCH_2C(H)(X)$—$CO_2R$, $CH_2\!=\!CH(CH_2)_2C(H)(X)$—$CO_2R$, $CH_2\!=\!CH(CH_2)_3C(H)(X)$—$CO_2R$, $CH_2\!=\!CH(CH_2)_8C(H)(X)$—$CO_2R$, $CH_2\!=\!CHCH_2C(H)(X)$—$C_6H_5$, $CH_2\!=\!CH(CH_2)_2C(H)(X)$—$C_6H_5$, $CH_2\!=\!CH(CH_2)_3C(H)(X)$—$C_6H_5$, (in the above each formula, X represents chlorine, bromine, or iodine, and R represents an alkyl group, an aryl group or an aralkyl group having 1 to 20 carbon atoms), and the like.

Specific examples of the halogenated sulfonyl compound having an alkenyl group include o-, m- or p—$CH_2$=CH—$(CH_2)_n$—$C_6H_4$—$SO_2X$, o-, m- or p-$CH_2$=CH—$(CH_2)_n$—O—$C_6H_4$—$SO_2X$, (in the above each formula, X represents chlorine, bromine, or iodine, and n represents an integer of 0 to 20), and the like.

Although the organic halide having the crosslinkable silyl group is not particularly limited, illustrative examples include those having a structure represented by the general formula (12).

$$R^8R^9C(X)—R^{10}R^{11}—C(H)(R^7)CH_2—[Si(R^{13})_{2-b}(Y)_bO]_m—Si(R^{14})_{3-a}(Y)_a \quad (12)$$

(wherein, $R^7$, $R^8$, $R^9$, $R^{10}$, $R^{11}$, and X are as defined above, $R^{13}$ and $R^{14}$ both represent an alkyl group, an aryl group or an aralkyl group having 1 to 20 carbon atoms, or a triorganosiloxy group represented by $(R')_3SiO$— (wherein R' represents a monovalent hydrocarbon group having 1 to 20 carbon atoms, in which R' that is present in the number of 3 may be the same of different), and when $R^{13}$ or $R^{14}$ is present in the number of 2 or more, they may be the same or different; Y represents a hydroxyl group or a hydrolyzable group, and when Y is present in the number of 2 or more, they may be the same or different; a represents 0, 1, 2, or 3; b represents 0, 1, or 2; and m represents an integer of 0 to 19; and wherein, the relational expression of a+mb=1 is satisfied.)

Specifically, illustrative examples include the compounds represented by the general formula (12), $XCH_2C(O)O(CH_2)_nSi(OCH_3)_3$, $CH_3C(H)(X)C(O)O(CH_2)_nSi(OCH_3)_3$, $(CH_3)_2C(X)C(O)O(CH_2)_nSi(OCH_3)_3$, $XCH_2C(O)O(CH_2)_nSi(CH_3)OCH_3)_2$, $CH_3C(H)(X)C(O)O(CH_2)_nSi(CH_3)(OCH_3)_2$, $(CH_3)_2C(X)C(O)O(CH_2)_nSi(CH_3)(OCH_3)_2$, (in the above each formula, X represents chlorine, bromine, or iodine, and n represents an integer of 0 to 20,)

$XCH_2C(O)O(CH_2)_nO(CH_2)_mSi(OCH_3)_3$, $H_3CC(H)(X)C(O)O(CH_2)_nO(CH_2)_mSi(OCH_3)_3$, $(H_3C)_2C(X)C(O)O(CH_2)_nO(CH_2)_mSi(OCH_3)_3$, $CH_3CH_2C(H)(X)C(O)O(CH_2)_nO(CH_2)_nSi(OCH_3)_3$, $XCH_2C(O)O(CH_2)_nO(CH_2)_mSi(CH_3)(OCH_3)_2$, $H_3CC(H)(X)C(O)O(CH_2)_nO(CH_2)_m—Si(CH_3)(OCH_3)_2$, $(H_3C)_2C(X)C(O)O(CH_2)_nO(CH_2)_m—Si(CH_3)(OCH_3)_2$, $CH_3CH_2C(H)(X)C(O)O(CH_2)_nO(CH_2)_m—Si(CH_3)(OCH_3)_2$, (in the above each formula, X represents chlorine, bromine, iodine, n represents an integer of 1 to 20, and m represents an integer of 0 to 20)

o-, m- or p-$XCH_2$—$C_6H_4$—$(CH_2)_2Si(OCH_3)_3$, o-, m- or p-$CH_3C(H)(X)$—$C_6H_4$—$(CH_2)_2Si(OCH_3)_3$, o-, m- or p-$CH_3CH_2C(H)(X)$—$C_6H_4$—$(CH_2)_2Si(OCH_3)_3$, o-, m- or p-$XCH_2$—$C_6H_4$—$(CH_2)_3Si(OCH_3)_3$, o-, m- or p-$CH_3C(H)(X)$—$C_6H_4$—$(CH_2)_3Si(OCH_3)_3$, o-, m- or p-$CH_3CH_2C(H)(X)$—$C_6H_4$—$(CH_2)_3Si(OCH_3)_3$, o-, m- or p-$XCH_2$—$C_6H_4$—$(CH_2)_2$—O—$(CH_2)_3Si(OCH_3)_3$, o-, m- or p-$CH_3C(H)(X)$—$C_6H_4$—$(CH_2)_2$—O—$(CH_2)_3Si(OCH_3)_3$, o-, m- or p-$CH_3CH_2C(H)(X)$—$C_6H_4$—$(CH_2)_2$—O—$(CH_2)_3Si(OCH_3)_3$, o-, m- or p-$XCH_2$—$C_6H_4$—O—$(CH_2)_3Si(OCH_3)_3$, o-, m- or p-$CH_3C(H)(X)$—$C_6H_4$—O—$(CH_2)_3Si(OCH_3)_3$, o-, m- or p-$CH_3CH_2C(H)(X)$—$C_6H_4$—O—$(CH_2)_3$—$Si(OCH_3)_3$, o-, m- or p-$XCH_2$—$C_6H_4$—O—$(CH_2)_2$—O—$(CH_2)_3$—$Si(OCH_3)_3$, o-, m- or p-$CH_3C(H)(X)$—$C_6H_4$—O—$(CH_2)_2$—O—$(CH_2)_3Si(OCH_3)_3$, o-, m- or p-$CH_3CH_2C(H)(X)$—$C_6H_4$—O—$(CH_2)_2$—O—$(CH_2)_3Si(OCH_3)_3$, (in the above each formula, X represents chlorine, bromine, or iodine), and the like.

Illustrative examples of the above organic halide having a crosslinkable silyl group further include those having a structure represented by the general formula (13):

$$(R^{14})_{3-a}(Y)_aSi—[OSi(R^{13})_{2-b}(Y)_b]_m—CH_2—C(H)(R^7)—R^{11}—C(R^8)(X)—R^{12}—R^9 \quad (13)$$

wherein, $R^7$, $R^8$, $R^9$, $R^{11}$, $R^{12}$, $R^{13}$, $R^{14}$, a, b, m, X, and Y are as defined above.

Specifically, illustrative examples of such a compound include $(CH_3O)_3SiCH_2CH_2C(H)(X)C_6H_5$, $(CH_3O)_2(CH_3)SiCH_2CH_2C(H)(X)C_6H_5$, $CH_3O)_3Si(CH_2)_2C(H)(X)—CO_2R$, $(CH_3O)_2(CH_3)Si(CH_2)_2C(H)(X)—CO_2R$, $(CH_3O)_3Si(CH_2)_3C(H)(X)—CO_2R$, $(CH_3O)_2(CH_3)Si(CH_2)_3C(H)(X)—CO_2R$, $(CH_3O)_3Si(CH_2)_4C(H)(X)—CO_2R$, $(CH_3O)_2(CH_3)Si(CH_2)_4C(H)(X)—CO_2R$, $(CH_3O)_3Si(CH_2)_9C(H)(X)—CO_2R$, $(CH_3O)_2(CH_3)Si(CH_2)_9C(H)(X)—CO_2R$, $(CH_3O)_3Si(CH_2)_3C(H)(X)—C_6H_5$, $(CH_3O)_2(CH_3)Si(CH_2)_3C(H)(X)—C_6H_5$, $(CH_3O)_3Si(CH_2)_4C(H)(X)—C_6H_5$, $(CH_3O)_2(CH_3)Si(CH_2)_4C(H)(X)—C_6H_5$, (in the above each formula, X represents chlorine, bromine, or iodine, and R represents an alkyl group, an aryl group or an aralkyl group having 1 to 20 carbon atoms), and the like.

The above organic halide or halogenated sulfonyl compound having a hydroxyl group is not particularly limited, and the following is illustrated.

$$HO—(CH_2)_n—OC(O)C(H)(R)(X)$$

(wherein, X represents chlorine, bromine, or iodine, R represents a hydrogen atom, or an alkyl group, an aryl group or an aralkyl group having 1 to 20 carbon atoms, and n represents an integer of 1 to 20)

The aforementioned organic halide or halogenated sulfonyl compound having an amino group is not particularly limited, and the following is illustrated.

$$H_2N—(CH_2)_n—OC(O)C(H)(R)(X)$$

(wherein, X represents chlorine, bromine, or iodine, R represents a hydrogen atom, or an alkyl group, an aryl group or an aralkyl group having 1 to 20 carbon atoms, and n represents an integer of 1 to 20)

The aforementioned organic halide or halogenated sulfonyl compound having an epoxy group is not particularly limited, and the following is illustrated.

[chemical formula 4]

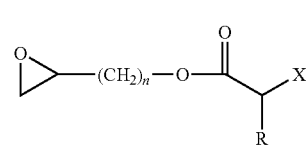

(wherein, X represents chlorine, bromine, or iodine, R represents a hydrogen atom, or an alkyl group, an aryl group or an aralkyl group having 1 to 20 carbon atoms, n represents an integer of 1 to 20).

In order to obtain a polymer having two or more end structures for the growth in a molecule, organic halide or a halogenated sulfonyl compound having two or more initiation points is preferably used as an initiator. Specifically, illustrative examples include,

[chemical formula 5]

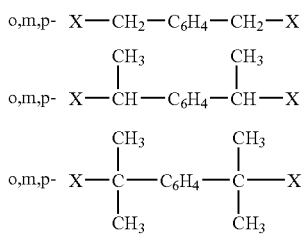

(wherein, $C_6H_4$ represents a phenylene group; and X represents chlorine, bromine, or iodine)

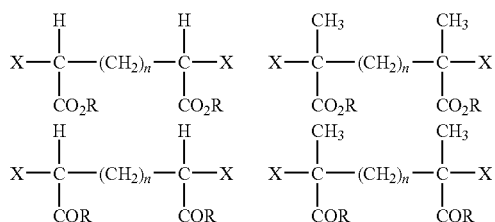

(wherein, R represents an alkyl group, an aryl group, or an aralkyl group having 1 to 20 carbon atoms; n represents an integer of 0 to 20; and X represents chlorine, bromine, or iodine)

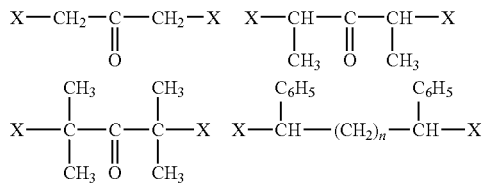

(wherein, X represents chlorine, bromine, or iodine, and n represents an integer of 0 to 20)

[chemical formula 6]

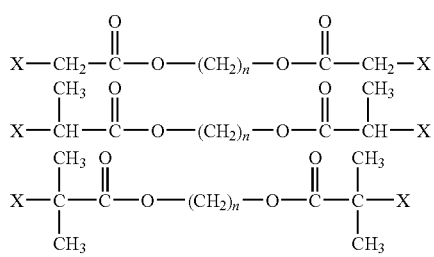

(wherein, n represents an integer of 1 to 20; and X represents chlorine, bromine, or iodine)

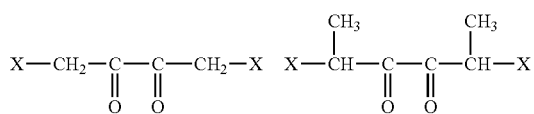

-continued

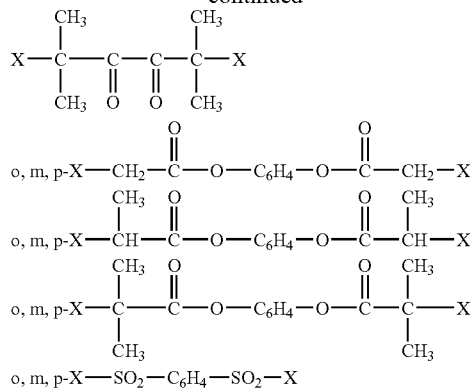

(wherein, X represents chlorine, bromine, or iodine)
and the like.

The vinyl monomer used in this polymerization is not particularly limited, and any of illustrated monomers above can be suitably used.

Although the transition metal complex used as a polymerization catalyst is not particularly limited, preferably it is any of metal complexes composed of a VII, VIII, IX, X, or XI group element in the periodic table as a central metal. More preferable ones include complexes of nullvalent copper, monovalent copper, bivalent ruthenium, bivalent iron or bivalent nickel. Of these, copper complexes are preferred. Specifically, illustrative examples of the monovalent copper compound include cuprous chloride, cuprous bromide, cuprous iodide, cuprous cyanide, cuprous oxide, cuprous perchlorate, and the like. When the copper compound is used, a ligand such as 2,2'-bipyridyl or its derivative, 1,10-phenanthroline or its derivative, polyamine such as tetramethylethylenediamine, pentamethyldiethylenetriamine or hexamethyltris(2-aminoethyl)amine is added in order to enhance the catalyst activity. Preferable ligand is a nitrogen-containing compound, more preferable ligand is a chelate type nitrogen-containing compound, and still more preferable ligand is N,N,N',N'',N''-pentamethyldiethylenetriamine. Further, a tristriphenylphosphine complex of bivalent ruthenium chloride ($RuCl_2(PPh_3)_3$) is also suitable as a catalyst. When a ruthenium compound is used as the catalyst, an aluminum alkoxide is added as an activator. Moreover, a bistriphenylphosphine complex of bivalent iron ($FeCl_2(PPh_3)_2$), a bistriphenylphosphine complex of bivalent nickel ($NiCl_2(PPh_3)_2$), and a bistributylphosphine complex of bivalent nickel ($NiBr_2(PBu_3)_2$) are also suitable as the catalyst.

The polymerization can be carried out in a solvent free system, or in various types of solvent. Examples of the solvent type include hydrocarbon solvents such as benzene and toluene; ether solvents such as diethyl ether and tetrahydrofuran; halogenated hydrocarbon solvents such as methylene chloride and chloroform; ketone solvents such as acetone, methylethyl ketone and methylisobutyl ketone; alcoholic solvents such as methanol, ethanol, propanol, isopropanol, n-butyl alcohol and tert-butyl alcohol; nitrile solvents such as acetonitrile, propionitrile and benzonitrile; ester solvents such as ethyl acetate and butyl acetate; carbonate solvents such as ethylene carbonate and propylene carbonate. These may be used alone, or as a mixture of two or more thereof.

Although not limited, the polymerization can be carried out at temperatures in the range of 0° C. to 200° C., and preferably 50 to 150° C.

The atom transfer radical polymerization of the present invention also includes reverse atom transfer radical polymerization, generally referred to. The reverse atom transfer radical polymerization means a process in which a general radical initiator such as a peroxide is allowed to act on a common atom transfer radical polymerization catalyst in the highly oxidized state upon generation of the radical, for example, on Cu (II') when Cu (I) was used as a catalyst, and as a consequence, an equilibrium state similar to that in the atom transfer radical polymerization is yielded (see, Macromolecules 1999, 32, 2872).

Crosslinkable Functional Group
Number of Crosslinkable Functional Groups

The numbers of the crosslinkable functional groups in the vinyl polymers (I) and (II) may be the same or different. In light of the curability of the composition, and the physical properties of the cured product, the polymers may have one or more on average in the molecule, preferably no less than 1.1 and no greater than 4.0, and more preferably no less than 1.2 and no greater than 3.5, but not particularly limited. When the curable composition of the present invention including the vinyl polymer (I) and/or (II) having one crosslinkable functional group in the molecule (macromonomer) is used, the number of the crosslinkable functional groups in the composition is preferably 0.5 to 1.5, more preferably 0.6 to 1.4, and still more preferably 0.7 to 1.3.

Position of Crosslinkable Functional Group

When the cured product obtained by hardening the curable composition of the present invention particularly requires rubbery properties, at least one of the crosslinkable functional groups is preferably positioned at the end of the molecular chain since greater molecular weight in between the crosslinked points which may significantly affect the rubber elasticity can be attained. More preferably, all crosslinkable functional groups are present at the end of the molecular chain.

The method for producing the vinyl polymer, in particular (meth)acrylic polymer, having at least one crosslinkable functional group at the end of the molecular chain is disclosed in JP-B-03-14068, JP-B-04-55444, JP-B-06-211922, and the like. However, since these methods pertain to free radical polymerization processes in which the aforementioned "chain transfer agent process" is used, the resultant polymer has problems of a great value of the molecular weight distribution represented by Mw/Mn being as large as no less than 2 in general, and of increased viscosity, although the crosslinkable functional group is positioned at the end of the molecular chain at a comparatively high ratio. Therefore, when to obtain a vinyl polymer that exhibits a small molecular weight distribution with a low viscosity, and having a crosslinkable functional group at the end of the molecular chain at a high ratio is intended, the aforementioned "living radical polymerization process" is preferably used, but not limited to the case of producing a polymer having a smaller molecular weight distribution.

First, the crosslinkable silyl group of the vinyl polymer (I) is explained.

Crosslinkable Silyl Group

As the crosslinkable silyl group of the present invention, groups represented by the general formula (1) may be exemplified:

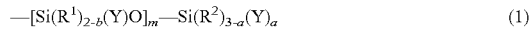

{wherein, $R^1$ and $R^2$ both represent an alkyl group having 1 to 20 carbon atoms, an aryl group having 6 to 20 carbon atoms, an aralkyl group having 7 to 20 carbon atoms, or a triorganosiloxy group represented by $(R')_3SiO—$ (wherein, R' represents a monovalent hydrocarbon group having 1 to 20 carbon atoms, and R' present in the number of 3 may be the same of different), and when $R^1$ or $R^2$ is present in the number of 2 or more, they may be the same or different; Y represents a hydroxyl group or a hydrolyzable group, and when Y is present in the number of 2 or more, they may be the same or different; a represents 0, 1, 2 or 3; b represents 0, 1 or 2; and m represents an integer of 0 to 19; and wherein, the relational expression of a+mb=1 is satisfied}.

Examples of the hydrolyzable group include groups which have been generally used such as a hydrogen atom, an alkoxy group, an acyloxy group, a ketoxymate group, an amino group, an amide group, an aminooxy group, a mercapto group and an alkenyloxy group. Of these, an alkoxy group, an amide group and an aminooxy group are preferred, and in light of ease in handling due to mild hydrolyzability, an alkoxy group is particularly preferred. Among the alkoxy groups, those having a smaller number of carbon atoms exhibit higher reactivity, i.e., the reactivity is lower in the order of: methoxy group>ethoxy group>propoxy group, and so on, which may be selected to meet the object and application.

The hydrolyzable group or the hydroxyl group can be bound to one silicon atom in the number ranging from 1 to 3, and (a+Sb) preferably falls within the range of 1 to 5. When the hydrolyzable group or the hydroxyl group is present in the crosslinkable silyl group in the number of no less than 2, they may be the same or different. Although the number of the silicon atom that constitutes the crosslinkable silyl group is no less than 1, it is preferably no greater than 20 in the case of the silicon atom linked by a siloxane bond or the like. In particular, a crosslinkable silyl group represented by the general formula (7):

wherein, $R^2$, and Y are as defined above, and a represents an integer of 1 to 3, is preferred since it is readily available.

Although not particularly limited, a is preferably no less than 2 taking into consideration the curability.

As the vinyl polymer having such a crosslinkable silyl group, a polymer having a hydrolyzable silicon group in which two hydrolyzable groups are bound per one silicon atom is often used. However, when an extremely high curing speed is needed in particular, such as the case in which the polymer is used in application of an adhesive or used at a low temperature, the curing speed may not be satisfactory. Also, when to provide the flexibility is intended after the curing, lowering of the crosslinking density is necessary, which may result in stickiness (surface tack) appearing due to insufficient crosslinking density. To cope with such cases, the group in which a is 3 (for example, trimethoxy functional group) is preferred.

Moreover, the group in which a is 3 (for example, trimethoxy functional group) leads to more rapid curing than the group in which a is 2 (for example, dimethoxy functional group); however, the group in which a is 2 may often be more superior in connection with the storage stability and dynamic physical properties (elongation and the like). In order to provide a good balance between the curability and the physical properties, the group in which a is 2 (for example, dimethoxy functional group) and the group in which a is 3 (for example, trimethoxy functional group) may be used in combination.

Method for Introduction of Crosslinkable Silyl Group

Hereinafter, the method for introduction of the crosslinkable silyl group is explained, but not limited thereto.

First, the method for introducing a crosslinkable silyl group, an alkenyl group, or a hydroxyl group by end functional group transformation is described. As these functional groups can be the precursor to one another, the explanation will follow the order of tracing back starting from the crosslinkable silyl group.

The synthesis method of the vinyl polymer (I) having at least one crosslinkable silyl group may be exemplified as follows:

(A) a method in which a hydrosilane compound having a crosslinkable silyl group is added to a vinyl polymer having at least one alkenyl group in the presence of a hydrosilylation catalyst;

(B) a method in which a compound having a group which can react with a hydroxyl group such as a compound having a crosslinkable silyl group and an isocyanate group in one molecule is allowed to react with a vinyl polymer having at least one hydroxyl group;

(C) a method in which a compound having a polymerizable alkenyl group and a crosslinkable silyl group in combination in one molecule is allowed to react in synthesizing the vinyl polymer by radical polymerization;

(D) a method in which a chain transfer agent having a crosslinkable silyl group is used in synthesizing the vinyl polymer by radical polymerization; and (E) a method in which a compound having a crosslinkable silyl group and a stable carbanion in one molecule is allowed to react with a vinyl polymer having at least one highly reactive carbon-halogen bond; and the like.

The vinyl polymer having at least one alkenyl group used in the method (A) can be obtained by a variety of methods. Illustrative examples of the synthesis method are shown below, but not limited thereto.

(A-a) A method in which, in synthesizing the vinyl polymer by radical polymerization, for example, a compound having a polymerizable alkenyl group and a poorly polymerizable alkenyl group in one molecule in combination as represented by the following general formula (14) is allowed to react as a second monomer.

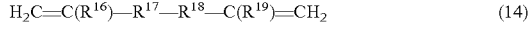

(wherein, $R^{16}$ represents hydrogen or a methyl group, $R^{17}$ represents —C(O)O—, or an o-, m- or p-phenylene group, $R^{18}$ represents a direct bond or a bivalent organic group having 1 to 20 carbon atoms, which may include one or more ether linkage, $R^{19}$ represents hydrogen, or an alkyl group having 1 to 20 carbon atoms, an aryl group having 6 to 20 carbon atoms or an aralkyl group having 7 to 20 carbon atoms).

The time when the compound having a polymerizable alkenyl group and a poorly polymerizable alkenyl group in combination in one molecule is allowed to react is not limited, but particularly in the living radical polymerization, it is preferably allowed to react as the second monomer in the final stage of the polymerization reaction or after completing the reaction of a given monomer, when rubbery properties are expected.

(A-b) A method in which, in synthesizing the vinyl polymer by living radical polymerization, final stage of the polymerization reaction or after completing the reaction of a given monomer, a compound having at least 2 poorly polymerizable alkenyl groups such as e.g., 1,5-hexadiene, 1,7-octadiene, 1,9-decadiene or the like is allowed to react.

(A-c) A method in which any of various types of organic metal compounds having an alkenyl group such as e.g., organic tin such as allyltributyltin, allyltrioctyltin or the like is allowed to react with a vinyl polymer having at least one highly reactive carbon-halogen bond, whereby halogen is substituted.

(A-d) A method in which a stabilized carbanion having an alkenyl group as represented by the general formula (15) is allowed to react with a vinyl polymer having at least one highly reactive carbon-halogen bond, whereby halogen is substituted.

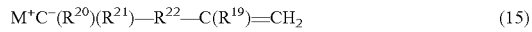

(wherein, $R^{19}$ is as defined above, $R^{20}$ and $R^{21}$ both represent an electron-withdrawing group carbanion that stabilizes $C^-$, or one represents the electron-withdrawing group and another represents hydrogen or an alkyl group having 1 to 10 carbon atoms, or a phenyl group; $R^{22}$ represents a direct bond or a bivalent organic group having 1 to 10 carbon atoms, which may include one or more ether linkage; and $M^+$ represents an alkali metal ion, or a quaternary ammonium ion.)

It is particularly preferred that the electron-withdrawing group of $R^{20}$ and $R^{21}$ has a structure of —$CO_2R$, —C(O)R or —CN.

(A-e) A method in which an elemental metal such as e.g., zinc or an organic metal compound is allowed to act on a vinyl polymer having at least one highly reactive carbon-halogen bond to prepare an enolate anion, followed by allowing a reaction with an electrophilic compound having an alkenyl group such as an alkenyl group-containing compound having a leaving group such as halogen or an acetyl group, a carbonyl compound having an alkenyl group, an isocyanate compound having an alkenyl group, or an acid halide having an alkenyl group.

(A-f) A method in which, for example, an oxy anion or carboxylate anion having an alkenyl group as represented by the general formula (16) or (17) is allowed to react with a vinyl polymer having at least one highly reactive carbon-halogen bond, whereby halogen is substituted.

(wherein, $R^{19}$, and $M^+$ are as defined above, $R^{23}$ represents a bivalent organic group having 1 to 20 carbon atoms and may include one or more ether linkage.)

$$H_2C=C(R^{19})-R^{24}-C(O)O^-M^+ \quad (17)$$

(wherein, $R^{19}$, and $M^+$ are as defined above. $R^{24}$ represents a direct bond or a bivalent organic group having 1 to 20 carbon atoms and may include one or more ether linkage.), and the like.

As the synthesis method of the aforementioned vinyl polymer having at least one highly reactive carbon-halogen bond, an atom transfer radical polymerization process carried out using the organic halide or the like as described above as an initiator, and a transition metal complex as a catalyst may be exemplified, but not limited thereto.

In addition, the vinyl polymer having at least one alkenyl group can be obtained from a vinyl polymer having at least one hydroxyl group, and the methods illustrated in the following can be used but not limited thereto:

(A-g) a method in which an alkenyl group-containing halide such as allyl chloride is allowed to react with the hydroxyl group of a vinyl polymer having at least one hydroxyl group through allowing a base such as sodium methoxide to act thereon;

(A-h) a method in which an alkenyl group-containing isocyanate compound such as allyl isocyanate is allowed to react with the hydroxyl group of a vinyl polymer having at least one hydroxyl group;

(A-i) a method in which an alkenyl group-containing acid halide such as (meth)acrylic acid chloride is allowed to react with the hydroxyl group of a vinyl polymer having at least one hydroxyl group in the presence of a base such as pyridine;

(A-j) a method in which an alkenyl group-containing carboxylic acid such as acrylic acid is allowed to react with the hydroxyl group of a vinyl polymer having at least one hydroxyl group in the presence of an acid catalyst; and the like.

In the present invention, when halogen is not directly involved in the method for introducing an alkenyl group such as methods (A-a) and (A-b), the vinyl polymer is preferably synthesized using the living radical polymerization process. In light of easier control to be enabled, the method (A-b) is more preferred.

When the alkenyl group is introduced by converting the halogen in the vinyl polymer having at least one highly reactive carbon-halogen bond, an organic halide having at least one highly reactive carbon-halogen bond, or a vinyl polymer having at least one highly reactive carbon-halogen bond at the end obtained by radical polymerization of a vinyl monomer using a halogenated sulfonyl compound as an initiator and a transition metal complex as a catalyst (atom transfer radical polymerization process) is preferably used. In light of easier control to be enabled, the method (A-f) is more preferred.

Furthermore, the hydrosilane compound having a crosslinkable silyl group is not particularly limited, and as typical examples, compounds represented by the general formula (18) may be exemplified.

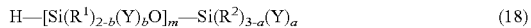

{wherein, $R^1$ and $R^2$ both represent an alkyl group having 1 to 20 carbon atoms, an aryl group having 6 to 20 carbon atoms, an aralkyl group having 7 to 20 carbon atoms, or a triorganosiloxy group represented by $(R')_3SiO$— (R' represents a monovalent hydrocarbon group having 1 to 20 carbon atoms, and R' that is present in the number of 3 may be the same of different); $R^1$ or $R^2$ is present in the number of 2 or more, and they may be the same or different; Y represents a hydroxyl group or a hydrolyzable group, and when Y is present in the number of 2 or more they may be the same or different; a represents 0, 1, 2, or 3; b represents 0, 1, or 2; and m represents an integer of 0 to 19; and wherein, the relational expression of a+mb=1 is satisfied.}

Among these hydrosilane compounds, the compound having the crosslinkable group represented by the general formula) (19):

wherein, $R^2$, and Y are as defined above, and a represents an integer of 1 to 3, is particularly preferred since it is readily *available*.

When the aforementioned hydrosilane compound having a crosslinkable silyl group is added to the alkenyl group, a transition metal catalyst is usually used. As the transition metal catalyst, for example, a platinum solid dispersed in a carrier such as elemental platinum, alumina, silica, or carbon black, platinic chloride, a complex of platinic chloride with alcohol, aldehyde, ketone or the like, a platinum-olefin complex, and a platinum (0)-divinyltetramethyldisiloxane complex may be exemplified. Examples of the catalyst other than platinum compounds include $RhCl(PPh_3)_3$, $RhCl_3$, $RuCl_3$, $IrCl_3$, $FeCl_3$, $AlCl_3$, $PdCl_2 \cdot H_2O$, $NiCl_2$, $TiCl_4$ and the like.

Illustrative method for production of a vinyl polymer having at least one hydroxyl group used in the methods (B) and (A-g) to (A-j) may be the methods as in the following, but not limited to these methods.

(B-a) A method in which, in synthesizing the vinyl polymer by radical polymerization, for example, a compound having a polymerizable alkenyl group and a hydroxyl group in combination in one molecule as represented by the following general formula (20) is allowed to react as the second monomer.

(wherein, $R^{16}$, $R^{17}$, and $R^{18}$ are as defined above)

The time when the compound having a polymerizable alkenyl group and a hydroxyl group in combination in one molecule is allowed to react is not limited, but particularly in living radical polymerization, it is preferably allowed to react as the second monomer in the final stage of the polymerization reaction or after completing the reaction of a given monomer when rubbery properties are expected.

(B-b) A method in which, in synthesizing the vinyl polymer by living radical polymerization, final stage of the polymerization reaction or after completing the reaction of a given monomer, alkenyl alcohol such as e.g., 10-undecenol, 5-hexenol, allyl alcohol is allowed to react.

(B-c) A method in which a vinyl monomer is subjected to radical polymerization using a large amount of a hydroxyl group-containing chain transfer agent such as e.g., hydroxyl group-containing polysulfide disclosed in JP-A-05-262808.

(B-d) A method in which a vinyl monomer is subjected to radical polymerization using hydrogen peroxide or a hydroxyl group-containing initiator as disclosed in, for example, JP-A-06-239912, and JP-A-08-283310.

(B-e) A method in which a vinyl monomer is subjected to radical polymerization using an alcohol in excess as disclosed in for example, JP-A-06-116312.

(B-f) A method in which halogen of a vinyl polymer having at least one highly reactive carbon-halogen bond is allowed to be hydrolyzed or to react with a hydroxyl group-containing compound by a method as disclosed in, for example, JP-A-04-132706 or the like, whereby a hydroxyl group is introduced into the end.

(B-g) A method in which a stabilized carbanion having a hydroxyl group as represented by the general formula (21) is allowed to react with a vinyl polymer having at least one highly reactive carbon-halogen bond, whereby halogen is substituted.

(wherein, $R^{20}$, $R^{21}$, and $R^{22}$, are as defined above)

It is particularly preferred that the electron-withdrawing group of $R^{20}$ and $R^{21}$ has a structure of —$CO_2R$, —C(O)R or —CN.

(B-h) A method in which an elemental metal such as e.g., zinc or an organic metal compound is allowed to act on a vinyl polymer having at least one highly reactive carbon-halogen bond to prepare an enolate anion, followed by allowing a reaction with an aldehyde, or a ketone.

(B-i) A method in which, for example, an oxy anion or carboxylate anion having a hydroxyl group as represented by the general formula (22) or (23) is allowed to react with a vinyl polymer having at least one highly reactive carbon-halogen bond, whereby halogen is substituted.

(wherein, $R^{23}$ and $M^+$ are as defined above)

(wherein, $R^{24}$ and $M^+$ are as defined above)

(B-j) A method in which, in synthesizing the vinyl polymer by living radical polymerization, final stage of the polymerization reaction or after completing the reaction of a given monomer, a compound having a poorly polymerizable alkenyl group and a hydroxyl group in one molecule is allowed to react as the second monomer.

Although such a compound is not particularly limited the compound represented by the general formula (24), and the like may be exemplified.

$$H_2C=C(R^{16})-R^{23}-OH \quad (24)$$

(wherein, $R^{16}$ and $R^{23}$ are as defined above)

Although the compound represented by the above general formula (24) is not particularly limited, alkenyl alcohols such as 10-undecenol, 5-hexenol, and allyl alcohol are preferred since they are readily available.

In the present invention, when halogen is not directly involved in the method for introducing a hydroxyl group such as methods (B-a) to (B-e) and (B-j), the vinyl polymer is preferably synthesized using the living radical polymerization process. In light of easier control to be enabled, the method (B-b) is more preferred.

When the hydroxyl group is introduced by converting the halogen in the vinyl polymer having at least one highly reactive carbon-halogen bond, an organic halide or a vinyl polymer having at least one highly reactive carbon-halogen bond at the end obtained by radical polymerization of a vinyl monomer using a halogenated sulfonyl compound as an initiator and a transition metal complex as a catalyst (atom transfer radical polymerization process) is preferably used. In light of easier control to be enabled, the method (B-i) is more preferred.

Furthermore, as the compound having a crosslinkable silyl group and a group which can react with a hydroxyl group such as an isocyanate group in one molecule, for example, γ-isocyanatepropyltrimethoxysilane, γ-isocyanatepropylmethyldimethoxysilane, γ-isocyanatepropyltriethoxysilane, and the like may be exemplified, and a generally known catalyst for urethanating reaction can be used if necessary.

As the compound having a polymerizable alkenyl group and a crosslinkable silyl group in combination in one molecule used in the method (C), for example, the compounds represented by the following general formula (25) such as trimethoxysilylpropyl (meth)acrylate, and methyldimethoxysilylpropyl (meth)acrylate may be exemplified.

$$H_2C=C(R^{16})-R^{17}-R^{25}-[Si(R^1)_{2-b}(Y)_bO]_m-Si(R^2)_{3-a}(Y)_a \quad (25)$$

(wherein, $R^1$, $R^2$, $R^{16}$, $R^{17}$, Y, a, b, and m are as defined above. $R^{25}$ represents a direct bond, or a bivalent organic group having 1 to 20 carbon atoms, and may include one or more ether linkages.)

The time when the compound having a polymerizable alkenyl group and a crosslinkable silyl group in combination in one molecule is allowed to react is not particularly limited, but particularly in the living radical polymerization, it is preferably allowed to react as the second monomer in the final stage of the polymerization reaction or after completing the reaction of a given monomer when rubbery properties are expected.

(D) As the chain transfer agent having a crosslinkable silyl group used in the chain transfer agent process, for example, mercaptan having a crosslinkable silyl group, hydrosilane having a crosslinkable silyl group disclosed in JP-B-03-14068, and JP-B-04-55444, and the like may be exemplified.

As the synthesis method of the vinyl polymer having at least one highly reactive carbon-halogen bond used in the method (E), an atom transfer radical polymerization process carried out using an organic halide or the like as an initiator, and a transition metal complex as a catalyst as described above, can be employed but not limited thereto. Examples of the compound having a crosslinkable silyl group and a stabilizing carbanion in combination in one molecule include the compounds represented by the general formula (26).)

$$M^+C^-(R^{20}(R^{21})-R^{26}-C(H)(R^{27})-CH_2-[Si(R^1)_{2-b}(Y)_bO]_m-Si(R^2)_{3-a}(Y)_a \quad (26)$$

(wherein, $R^1$, $R^2$, $R^{20}$, $R^{21}$, Y, a, b, and m are as defined above. $R^{26}$ represents a direct bond or a bivalent organic group having 1 to 10 carbon atoms, and may include one or more ether linkages, $R^{27}$ represents hydrogen, or an alkyl group having 1 to 10 carbon atoms, an aryl group having 6 to 10 carbon atoms or an aralkyl group having 7 to 10 carbon atoms.)

As the electron-withdrawing group of $R^{20}$ and $R^{21}$, a group having a structure of —$CO_2R$, —$C(O)R$ or —$CN$ is particularly preferred.

Next, the photo-crosslinkable group ((meth)acryloyl group)) of the vinyl polymer (II) is explained.

Method for Introduction of Photo-Crosslinkable Group

The method for introduction of a photo-crosslinkable group may be any generally known method. As one example, the introduction method of a (meth)acryloyl group is explained in the following.

Method for Introduction of (Meth)acryloyl Group

Although not particularly limited, the vinyl polymer having a reactive functional group is produced by, for example, the method described above, and the reactive functional group is converted into a substituent having a (meth)acryloyl group.

The method for converting the end of the vinyl polymer having a reactive functional group into a group represented by the general formula (2) is now explained below.

Although the method for introducing a (meth)acryloyl group into the vinyl polymer at the end is not particularly limited, for example, the following method may be exemplified.

Introduction Method 1: Method by a reaction of a vinyl polymer having a halogen group (halogen atom) at the end, with a compound represented by the general formula (3):

$$M^+-OC(O)C(R^a)=CH_2 \quad (3)$$

(wherein, $R^a$ represents a hydrogen atom, or an organic group having 1 to 20 carbon atoms, and $M^+$ represents an alkali metal ion or a quaternary ammonium ion).

As the vinyl polymer having a halogen group at the end, those having a terminal group represented by the general formula (4):

$$-CR^3R^4X \quad (4)$$

(wherein, $R^3$ and $R^4$ represent a group bound to an ethylenic unsaturated group of the vinyl monomer; and X represents a chlorine atom, a bromine atom or an iodine atom) are preferred.

Introduction Method 2: Method by a reaction of a vinyl polymer having a hydroxyl group at the end, with a compound represented by the general formula (5):

$$X^1C(O)C(R^a)=CH_2 \quad (5)$$

(wherein, $R^a$ represents a hydrogen atom, or an organic group having 1 to 20 carbon atoms, and $X^1$ represents a chlorine atom, a bromine atom or a hydroxyl group).

Introduction Method 3: Method by a reaction of a vinyl polymer having a hydroxyl group at the end with a diisocyanate compound, followed by a reaction of the remaining isocyanate group with a compound represented by the general formula (6):

$$HO-R'-OC(O)C(R^a)=CH_2 \quad (6)$$

(wherein, $R^a$ represents a hydrogen atom, or an organic group having 1 to 20 carbon atoms, and R' represents a bivalent organic group having 2 to 20 carbon atoms).

Each of the methods is explained in detail below.

Introduction Method 1

In the introduction method 1, a vinyl polymer having a halogen group at the end is allowed to react with a compound represented by the general formula (3). Although the vinyl polymer having a halogen group at the end is not particularly limited, those having a terminal group represented by the general formula (4) are preferred.

Examples of the group bound to the ethylenic unsaturated group of the vinyl monomer in $R^3$ and $R^4$ of the general formula (4) include a hydrogen atom; a methyl group, a carbonyl group, a carboxylate group, a toluoyl group, a fluoro group, a chloro group, a trialkoxysilyl group, a phenylsulfonic acid group, a carboxylic acid imide group, a cyano group, and the like.

The vinyl polymer having a halogen group at the end, particularly the vinyl polymer having a terminal group represented by the general formula (4) is produced by: a method including polymerizing the vinyl monomer using the organic halide or the halogenated sulfonyl compound as an initiator, and the transition metal complex as a catalyst; or a method including polymerizing the vinyl monomer using a halogen compound as a chain transfer agent. Preferably, the former method is carried out.

The compound represented by the general formula (3) is not particularly limited. As the organic group having 1 to 20 carbon atoms in $R^a$ in the general formula (3), similar ones to those described above may be exemplified, and the specific examples may be similarly illustrated. $M^+$ in the general formula (3) represents a counter cation of oxyanion, and the type thereof may fall within alkali metal ions, quaternary ammonium ions, and the like.

The alkali metal ion may include, for example, a lithium ion, a sodium ion, a potassium ion, and the like. The quaternary ammonium ion may include, for example, a tetramethylammonium ion, a tetraethylammonium ion, a tetrabenzylammonium ion, a trimethyldodecylammonium ion, a tetrabutylammonium ion, a dimethylpiperidinium ion, and the like. Of these, alkali metal ions are preferred, and a sodium ion, and a potassium ion are more preferred.

The amount of the compound represented by the general formula (3) used is preferably 1 to 5 equivalents, and more preferably 1.0 to 1.2 equivalents based on the equivalence of the terminal group represented by the general formula (4).

Although the solvent for carrying out the reaction is not particularly limited, a polar solvent is preferred since a nucleophilic substitution reaction proceeds. For example, tetrahydrofuran, dioxane, diethyl ether, acetone, dimethyl sulfoxide, dimethyl formamide, dimethylacetamide, hexamethylphosphoric triamide, acetonitrile or the like is preferably used. The reaction temperature is not particularly limited, but is preferably 0 to 150° C., and more preferably 10 to 100° C.

Introduction Method 2

In the introduction method 2, a vinyl polymer having a hydroxyl group at the end is allowed to react with a compound represented by the general formula (5). The compound represented by the general formula (5) is not particularly limited. As the organic group having 1 to 20 carbon atoms in $R^a$ in the general formula (5), similar ones to those described above may be exemplified, and the specific examples may be similarly illustrated.

The vinyl polymer having a hydroxyl group at the end is produced by: a method including polymerizing the vinyl monomer using the organic halide or the halogenated sulfonyl compound as an initiator, and the transition metal complex as a catalyst; or a method including polymerizing the vinyl monomer using a compound having a hydroxyl group as a chain transfer agent. Preferably, the former method is carried out.

Although the method for producing the vinyl polymer having a hydroxyl group at the end is not particularly limited, for example, the following methods may be exemplified.

(a) A method in which, in synthesizing the vinyl polymer by living radical polymerization, a compound having a polymerizable alkenyl group and a hydroxyl group in one molecule represented by the general formula (27):

$$H_2C=C(R^{28})-R^{29}-R^{30}-OH \qquad (27)$$

(wherein, $R^{28}$ represents a hydrogen atom, or an organic group having 1 to 20 carbon atoms, $R^{29}$ represents —C(O)O- (ester group) or a o-, m- or p-phenylene group, $R^{30}$ represents a direct bond or a bivalent organic group having 1 to 20 carbon atoms which may include one or more ether linkage) or the like is allowed to react as the second monomer.

The $R^{28}$ is preferably a hydrogen atom, or a methyl group. Further, $R^{29}$ is an ester group in (meth)acrylate compounds, and $R^{29}$ is a phenylene group in styrene compounds. Specific examples of $R^{30}$ are identical to the specific examples of $R^{11}$. The time when the compound having a polymerizable alkenyl group and a hydroxyl group in combination in one molecule is allowed to react is not limited, but it is preferably allowed to react as the second monomer in the final stage of the polymerization reaction or after completing the reaction of a given monomer, when rubbery properties are particularly expected.

(b) A method in which, in synthesizing the vinyl polymer by living radical polymerization, a compound having a poorly polymerizable alkenyl group and a hydroxyl group in one molecule is allowed to react as the second monomer in the final stage of the polymerization reaction or after completing the reaction of a given monomer.

Although the compound is not particularly limited, for example, the compound represented by the general formula (28):

$$H_2C=C(R^{28})-R^{31}-OH \qquad (28)$$

(wherein, $R^{28}$ is as defined above, $R^{31}$ represents a bivalent organic group having 1 to 20 carbon atoms which may include one or more ether linkage), and the like may be exemplified. Specific examples of the $R^{31}$ are identical to the specific examples of $R^{11}$.

Although the compound represented by the general formula (28) is not particularly limited, alkenyl alcohols such as 10-undecenol, 5-hexenol, and allyl alcohol are preferred since they are readily available.

(c) A method in which halogen of a vinyl polymer having at least one highly reactive carbon-halogen bond obtained by atom transfer radical polymerization and represented by the general formula (4) is allowed to be hydrolyzed or to react with a hydroxyl group-containing compound by a method as disclosed in JP-A-04-132706, whereby a hydroxyl group is introduced into the end.

(d) A method in which a stabilized carbanion having a hydroxyl group represented by the general formula (29):

$$M^+C^-(R^{32})(R^{33})-R^{31}-OH \qquad (29)$$

(wherein, $R^{31}$ and $M^+$ are as defined above; $R^{32}$ and $R^{33}$ both represent an electron-withdrawing group carbanion that stabilizes $C^-$, or one represents the electron-withdrawing group and another represents a hydrogen atom, an alkyl group having 1 to 10 carbon atoms or a phenyl group) is allowed to react with a vinyl polymer having at least one carbon-halogen bond obtained by atom transfer radical polymerization and represented by the general formula (4), whereby the halogen atom is substituted.

Examples of the electron-withdrawing group include —$CO_2R$ (ester group), —C(O)R (keto group), —$CON(R_2)$ (amide group), —COSR (thioester group), —CN (nitrile group), —$NO_2$ (nitro group), and the like, and —$CO_2R$, —C(O)R, and —CN are particularly preferred. The substituent R is an alkyl group having 1 to 20 carbon atoms, an aryl group having 6 to 20 carbon atoms or an aralkyl group having 7 to 20 carbon atoms, and is preferably an alkyl group having 1 to 10 carbon atoms or a phenyl group.

(e) A method in which an elemental metal such as e.g., zinc or an organic metal compound is allowed to act on a vinyl polymer having at least one highly reactive carbon-halogen bond obtained by atom transfer radical polymerization and represented by the general formula (4) to prepare an enolate anion, followed by allowing a reaction with an aldehyde, or a ketone.

(f) A method in which a halogen atom at the end of a polymer, preferably a vinyl polymer having at least one halogen atom represented by the general formula (4) is allowed to react with a hydroxyl group-containing compound represented by the general formula (30):

$$HO—R^{31}—C(O)O^-M^+ \quad (30)$$

(wherein, $R^{31}$ and $M^+$ are as defined above) or the like, or a hydroxyl group-containing compound represented by the general formula (31):

$$HO—R^{31}—C(O)O^-H^+ \quad (31)$$

(wherein, $R^{31}$ and $M^+$ are as defined above) or the like, whereby the halogen atom is substituted with a hydroxyl group-containing substituent.

When a halogen atom does not directly participate in the method for introducing a hydroxyl group as in the methods (a) to (b), in light of easier control to be enabled, the method (b) is more preferred. Moreover, when a hydroxyl group is introduced by converting the halogen atom of the vinyl polymer having at least one carbon-halogen bond as in the methods (c) to (f), in light of easier control to be enabled, the method (f) is more preferred.

The amount of the compound represented by the general formula (5) used is preferably 1 to 10 equivalents, and more preferably 1 to 5 equivalents based on the equivalence of the terminal hydroxyl group of the vinyl polymer.

Although the solvent for carrying out the reaction is not particularly limited, a polar solvent is preferred since a nucleophilic substitution reaction proceeds. For example, tetrahydrofuran, dioxane, diethyl ether, acetone, dimethyl sulfoxide, dimethyl formamide, dimethylacetamide, hexamethylphosphoric triamide, acetonitrile or the like is preferably used. The reaction temperature is not particularly limited, but is preferably 0 to 150° C., and more preferably 10 to 100° C.

Introduction Method 3

In the introduction method 3, a vinyl polymer having a hydroxyl group at the end is allowed to react with a diisocyanate compound, and the remaining isocyanate group is allowed to react with a compound represented by the general formula (6):

$$HO—R'—OC(O)C(R^a)=CH_2 \quad (6)$$

(wherein, $R^a$ represents a hydrogen atom, or an organic group having 1 to 20 carbon atoms, and R' represents a bivalent organic group having 2 to 20 carbon atoms.).

As the organic group having 1 to 20 carbon atoms in $R^a$ in the general formula (6), similar ones to those described above may be exemplified, and the specific examples may be similarly illustrated. Examples of the bivalent organic group having 2 to 20 carbon atoms in R' in the general formula (6) include e.g., alkylene groups having 2 to 20 carbon atoms (ethylene group, propylene group, butylene group, etc.), arylene groups having 6 to 20 carbon atoms, aralkylene groups having 7 to 20 carbon atoms, and the like. Although the compound represented by the general formula (6) is not particularly limited, particularly preferable compounds may be methacrylate, 2-hydroxypropyl and the like. The vinyl polymer having a hydroxyl group at the end is as described in the foregoing.

The diisocyanate compound is not particularly limited, and any of conventionally known products can be used. Specific examples include e.g., toluoylene diisocyanate, 4,4'-diphenylmethane diisocyanate, hexamethylene diisocyanate, xylylene diisocyanate, metaxylylene diisocyanate, 1,5-naphthalene diisocyanate, hydrogenated diphenylmethane diisocyanate, hydrogenated toluoylene diisocyanate, hydrogenated xylylene diisocyanate, isophorone diisocyanate, and the like. These may be used alone, or two or more thereof may be used in combination. Also, block isocyanate may be used. Since more superior weather resistance may be achieved, a diisocyanate compound not having an aromatic ring such as hexamethylene diisocyanate or hydrogenated diphenylmethane diisocyanate is preferably used.

The amount of the diisocyanate compound used is preferably 1 to 10 equivalents, and more preferably 1 to 5 equivalents based on the equivalence of the terminal hydroxyl group of the vinyl polymer.

The amount of the compound represented by the general formula (6) used is preferably 1 to 10 equivalents, and more preferably 1 to 5 equivalents based on the equivalence of the remaining isocyanate group.

In addition, although the reaction solvent is not particularly limited, aprotic solvent and the like are preferred. The reaction temperature is not particularly limited, but is preferably 0 to 250° C., and more preferably 20 to 200° C.

Amount of Vinyl Polymer (I) and Vinyl Polymer (II) Used

The amount of the vinyl polymer (II) used may be arbitrarily determined, but is preferably no less than 20% and no greater than 80%, and more preferably no less than 30% and no greater than 70% based on the total amount of the vinyl polymer (I) and the vinyl polymer (II) by weight ratio. When the ratio of the blended vinyl polymer (II) is low, rapid curability with light, which is one of the effects of the present invention, may be hardly achieved, while too high blend ratio may result in deterioration of the mechanical physical properties.

Use of Multiple Vinyl Polymer

The vinyl polymers (I) and (II) of the present invention can be each used just alone, and two or more kinds of the vinyl polymers can be used also in combination. When only one kind of the polymer is used, the vinyl polymer having a molecular weight of 6,000 to 50,000, and having the number of the crosslinkable functional group being 1.2 to 3.5 is preferably used. In the case in which two or more kinds of the vinyl polymers are used in combination, when the first polymer is a vinyl polymer having a molecular weight of 6,000 to 50,000 and the number of the crosslinkable functional group being 1.3 to 3.5, and the second polymer is a polymer having less number of the crosslinkable functional group, a cured product having higher elongation at break, lower bleeding properties and lower surface staining possibility can be obtained. In addition, by predetermining the molecular weight of the second polymer to be smaller, the viscosity of the composition can be lowered. Preferable molecular weight of the polymer to be a low molecular weight component is less than 10,000, and more preferably less than 6,000. Preferable number of the crosslinkable functional group is no greater than 1.3, and more preferably no greater than 1. In addition, since the viscosity can be further lowered, the molecular weight distribution is preferably less than 1.8. A marked effect of lowering of viscosity can be exhibited when the vinyl polymer having a crosslinkable functional group and having a molecular weight distribution of no less than 1.8, and a vinyl polymer having a crosslinkable functional group at one end are added.

To use the vinyl polymer having a crosslinkable functional group at one end obtained by the production method as follows, as such a polymer having a low molecular weight and having a small number of the crosslinkable functional group is preferred since the crosslinkable functional group can be introduced without fail.

The vinyl polymer having a crosslinkable functional group at one end has approximately one crosslinkable functional group per 1 molecule at the end of the polymer. To employ the living radical polymerization process, particularly the atom transfer radical polymerization process is preferred since a vinyl polymer having a crosslinkable functional group at the end of the molecular chain, having a molecular weight distribution of less than 1.8, with small molecular weight distribution, and low viscosity can be obtained at a higher ratio.

As the method for introducing the crosslinkable functional group at one end, similar method to the aforementioned method for introduction may be exemplified.

In the second embodiment in which two or more kinds of the vinyl polymers are used in combination, the vinyl polymer having a molecular weight distribution of no less than 1.8, and the vinyl polymer having a molecular weight distribution of less than 1.8 can be used in combination. The vinyl polymer having a molecular weight distribution of no less than 1.8 may not have a crosslinkable functional group, but such a vinyl polymer having a crosslinkable functional group is preferred since the weather resistance as well as adhesion strength, strength at break can be further improved. In addition, improvement of the tear strength of the cured product of the composition can be expected. As the main chain of the vinyl polymer having a molecular weight distribution of no less than 1.8 used as the first polymer, and the vinyl polymer having a molecular weight distribution of less than 1.8 used as the second polymer, the polymer resulting from the vinyl monomer described in the foregoing can be used, and both polymers are preferably an acrylate ester polymer.

The vinyl polymer having a molecular weight distribution of no less than 1.8 can be obtained by a common method for vinyl polymerization, for example, a solution polymerization process by way of a radical reaction. The polymerization is carried out, in general, by adding the monomer as well as the radical initiator, the chain transfer agent and the like to allow the reaction at 50 to 150° C. In this instance, the product having a molecular weight distribution of no less than 1.8 can be obtained generally.

The vinyl polymer having a crosslinkable functional group and having a molecular weight distribution of no less than 1.8 preferably has a number average molecular weight in terms of the polystyrene equivalent determined by GPC being 500 to 100,000 in light of ease in handling. Furthermore, the vinyl polymer having such a number average molecular weight of 1,500 to 30,000 is more preferable since the cured product will have favorable weather resistance and workability.

Photopolymerization Initiator (III)

Although the photopolymerization initiator (III) of the present invention is not particularly limited, examples thereof include photoradical initiator, photoanion initiator, near-infrared photopolymerization initiator, and the like. The photoradical initiator, and the photoanion initiator are preferred, and the photoradical initiator is particularly preferred.

Examples of the photoradical initiator include e.g., acetophenone, propiophenone, benzophenone, xanthol, fluoreine, benzaldehyde, anthraquinone, triphenylamine, carbazole, 3-methylacetophenone, 4-methylacetophenone, 3-pentylacetophenone, 2,2-diethoxyacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, benzoin, benzoinmethyl ether, benzoinbutyl ether, bis(4-dimethylaminophenyl)ketone, benzylmethoxyketal, 2-chlorothioxanthone, 2,2-dimethoxy-1,2-diphenyl ethane-1-one, 1-hydroxy-cyclohexyl-phenyl-ketone, 2-hydroxy-2-methyl-1-phenyl-propane-1-one, 2-methyl-1-[4-(methylthio)phenyl]-2-morpholinopropane-1-one, 2-benzyl-2-dimethylamino-1-(4-morpholinophenyl)-butanone-1, dibenzoyl, and the like.

Of these, a-hydroxyketone compounds (for example, benzoin, benzoinmethyl ether, benzoinbutyl ether, 1-hydroxy-cyclohexyl-phenyl-ketone, etc.), phenyl ketone derivatives (for example, acetophenone, propiophenone, benzophenone, 3-methylacetophenone, 4-methylacetophenone, 3-pentylacetophenone, 2,2-diethoxyacetophenone, 4-methoxyacetophenone, 3-bromoacetophenone, 4-allylacetophenone, 3-methoxybenzophenone, 4-methylbenzophenone, 4-chlorobenzophenone, 4,4'-dimethoxybenzophenone, 4-chloro-4'-benzylbenzophenone, bis(4-dimethylaminophenyl)ketone, etc.) are preferred.

Examples of the photoanion initiator include e.g., 1,10-diaminodecane, 4,4'-trimethylene dipiperazine, carbamates and derivatives of the same, cobalt-amine complexes, aminooxyiminos, ammonium borates, and the like.

As the near-infrared photopolymerization initiator, a near-infrared light absorbing cationic dye or the like may be used. The near-infrared light absorbing cationic dye which may be preferably used is a near-infrared light absorbing cationic dye-borate anion complex or the like which is excited with light energy in the range of 650 to 1,500 nm, for example, those disclosed in JP-A-03-111402, JP-A-05-194619 and the like, and to use in combination with a boron sensitizer is more preferred.

In the curable composition of the present invention, the photopolymerization initiator (III) may be used alone, or as a mixture of two or more thereof. Alternatively, to use in combination with other compound is also acceptable.

As the combination with other compound, specifically, combination with an amine such as diethanol/methylamine, dimethylethanolamine or triethanolamine, combination further including an iodonium salt such as diphenyliodonium chloride therein, combination with a dye stuff such as methylene blue and amine, and the like may be exemplified.

To the curable composition of the present invention, a polymerization inhibitor such as hydroquinone, hydroquinonemonomethyl ether, benzoquinone or para-tertiary butylcatechol may be added as needed.

The amount of the photopolymerization initiator (III) added is not particularly limited, but in light of the curability and storage stability, the amount is preferably 0.001 to 10 parts by weight, and more preferably 0.005 to 5 parts by weight based on 100 parts by weight of the vinyl polymer (II).

In the curable composition of the present invention, in addition to the photopolymerization initiator, a thermal polymerization initiator, a redox initiator or the like may be used in combination.

Although the thermal polymerization initiator which can be used in the curable composition of the present invention is not particularly limited, azo initiators, peroxide initiators, persulfate initiators, and the like may be exemplified.

Although appropriate azo initiator is not limited, 2,2'-azobis(4-methoxy-2,4-dimethylvaleronitrile) (VAZO 33), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64), 2,2'-azobis-2-methylbutyronitrile (VAZO 67), 1,1-azobis(1-cyclohexanecarbonitrile) (VAZO 88) (all available from DuPont Chemical), 2,2'-azobis(2-cyclopropyl propionitrile), and 2,2'-azobis(methylisobutyrate) (V-601) (available from Wako Pure Chemical Industries, Ltd.), and the like may be exemplified.

Although appropriate peroxide initiator is not limited, benzoyl peroxide, acetyl peroxide, lauroyl peroxide, decanoyl peroxide, dicetyl peroxydicarbonate, di(4-t-butylcyclohexyl) peroxydicarbonate (Perkadox 16S) (available from Akzo Nobel), di(2-ethylhexyl)peroxydicarbonate, t-butylperoxypivalate (Lupersol 11) (available from Elf Atochem), t-butylperoxy-2-ethylhexanoate (Trigonox 21-050) (available from Akzo Nobel), and dicumyl peroxide, and the like may be exemplified.

Although appropriate persulfate initiator is not limited, potassium persulfate, sodium persulfate, and ammonium persulfate, and the like may be exemplified.

Preferable thermal polymerization initiator is selected from the group consisting of azo initiators and peroxide initiators. Further preferable polymerization initiators include 2,2'-azobis(methylisobutyrate), t-butylperoxypivalate, di(4-t-butylcyclohexyl)peroxydicarbonate, and mixtures of the same.

The redox (oxidation-reduction) initiator is advantageous in that it can be used in a wide temperature range. Particularly, the following initiator species are advantageous since it can be used at ordinary temperatures.

Although appropriate redox initiator is not limited, combination of the persulfate initiator with a reducing agent (sodium hydrogen metasulfite, sodium hydrogen sulfite, etc.); combination of an organic peroxide with tertiary amine, for example, combination of benzoyl peroxide with dimethyl aniline, combination of cumene hydroperoxide with aniline; combination of organic peroxide with a transition metal, for example, combination of cumene hydroperoxide with cobalt naphtate, and the like may be exemplified.

The redox initiator is preferably a combination of organic peroxide with tertiary amine, or a combination of organic peroxide with a transition metal, and more preferably, a combination of cumene hydroperoxide with aniline, and a combination of cumene hydroperoxide with cobalt naphtate.

The thermal polymerization initiator and redox initiator may be used alone, or in combination of two or more thereof.

When a thermal polymerization initiator and/or redox initiator is used in the curable composition of the present invention, the initiator may be present in a catalytically effective amount, and the amount of addition is not particularly limited. However, the amount is preferably about 0.01 to 5 parts by weight, and more preferably about 0.025 to 2 parts by weight based on 100 parts by weight of the vinyl polymer of the present invention (II).

Polymerizable Monomer and/or Oligomer

In the curable composition of the present invention, for the purpose of improving the surface curability, imparting the toughness, and improving the workability resulting from lowering of the viscosity, and the like, a polymerizable monomer and/or an oligomer may be used in combination.

As the polymerizable monomer and/or oligomer, a monomer and/or an oligomer having a radical polymerizable group, or a monomer and/or an oligomer having an anionic polymerizable group are preferred in light of the curability.

Examples of the radical polymerizable group include (meth)acryloyl groups such as (meth)acryl groups, a styrene group, an acrylonitrile group, vinyl ester groups, an N-vinylpyrrolidone group, an acrylamide group, conjugated diene groups, vinyl ketone groups, a vinyl chloride group, and the like. Among them, those having a (meth)acryloyl group which are similar to the vinyl polymer used in the present invention are preferred.

Examples of the anion polymerizable group include (meth)acryloyl groups such as (meth)acryl groups, a styrene group, an acrylonitrile group, an N-vinylpyrrolidone group, an acrylamide group, conjugated diene groups, vinyl ketone groups, and the like. Among them, those having a (meth)acryloyl group which are similar to the vinyl polymer used in the present invention are preferred.

Specific examples of the monomer include (meth)acrylate monomers, cyclic acrylate, styrene monomers, acrylonitrile, vinyl ester monomers, N-vinylpyrrolidone, acrylamide monomers, conjugated diene monomers, vinyl ketone monomers, halogenated vinyl-halogenated vinylidene monomers, polyfunctional monomers, and the like.

Examples of the (meth)acrylate monomer include methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth) acrylate, n-hexyl (meth)acrylate, cyclohexyl (meth)acrylate, n-heptyl (meth)acrylate, n-octyl (meth)acrylate, isooctyl (meth)acrylate, 2-ethylhexyl (meth)acrylate, nonyl (meth) acrylate, isononyl (meth)acrylate, decyl (meth)acrylate, dodecyl (meth)acrylate, phenyl (meth)acrylate, toluoyl (meth)acrylate, benzyl (meth)acrylate, 2-methoxyethyl (meth)acrylate, 3-methoxybutyl (meth)acrylate, 2-hydroxyethyl(meth)acrylate, 2-hydroxypropyl (meth)acrylate, stearyl(meth)acrylate, glycidyl(meth)acrylate, 2-aminoethyl (meth)acrylate, γ-(methacryloyloxypropyl)trimethoxysilane, ethylene oxide adducts of (meth)acrylate, trifluoromethylmethyl (meth)acrylate, 2trifluoromethylethyl (meth)acrylate, 2-perfluoroethylethyl (meth)acrylate, 2-perfluoroethyl-2-perfluorobutylethyl (meth)acrylate, 2-perfluoroethyl (meth) acrylate, perfluoromethyl (meth)acrylate, Diperfluoromethylmethyl (meth)acrylate, 2-perfluoromethyl-2-perfluoroethylethyl (meth)acrylate, 2-perfluorohexylethyl (meth)acrylate, 2-perfluorodecylethyl (meth)acrylate, 2-perfluorohexadecylethyl (meth)acrylate, and the like. In addition, the compounds represented by the following formulae may be also included. In the following formulae, n represents an integer of 0 to 20.

[chemical formula 7]

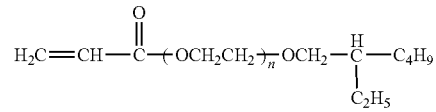

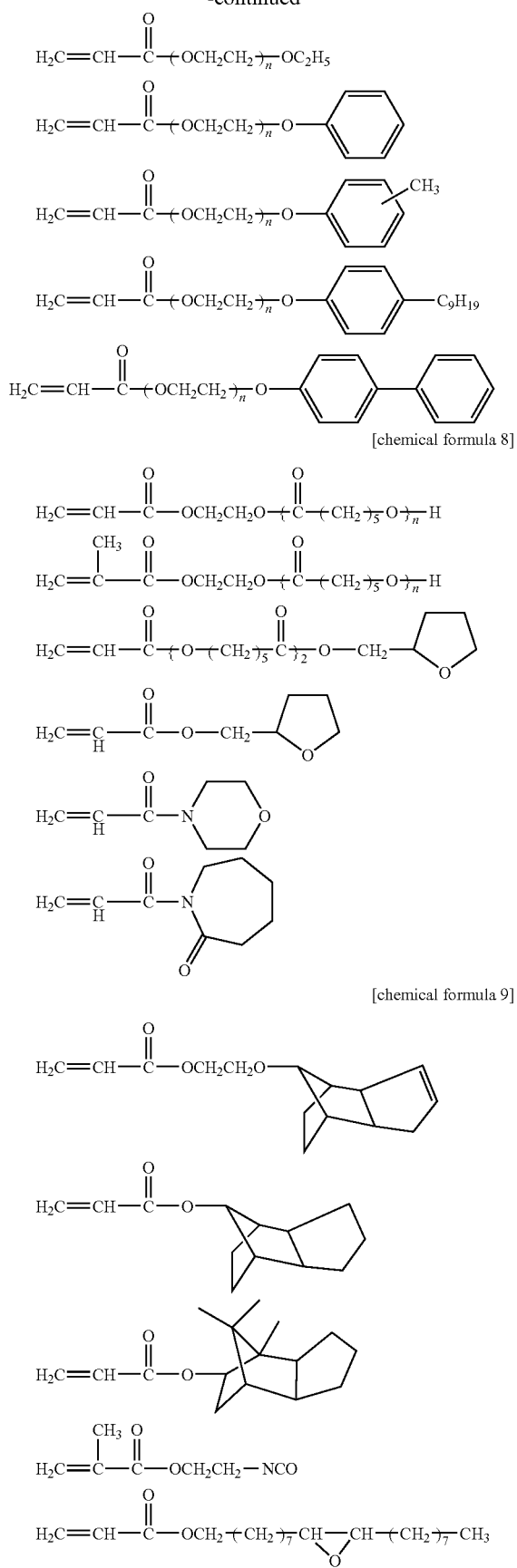

[chemical formula 8]

[chemical formula 9]

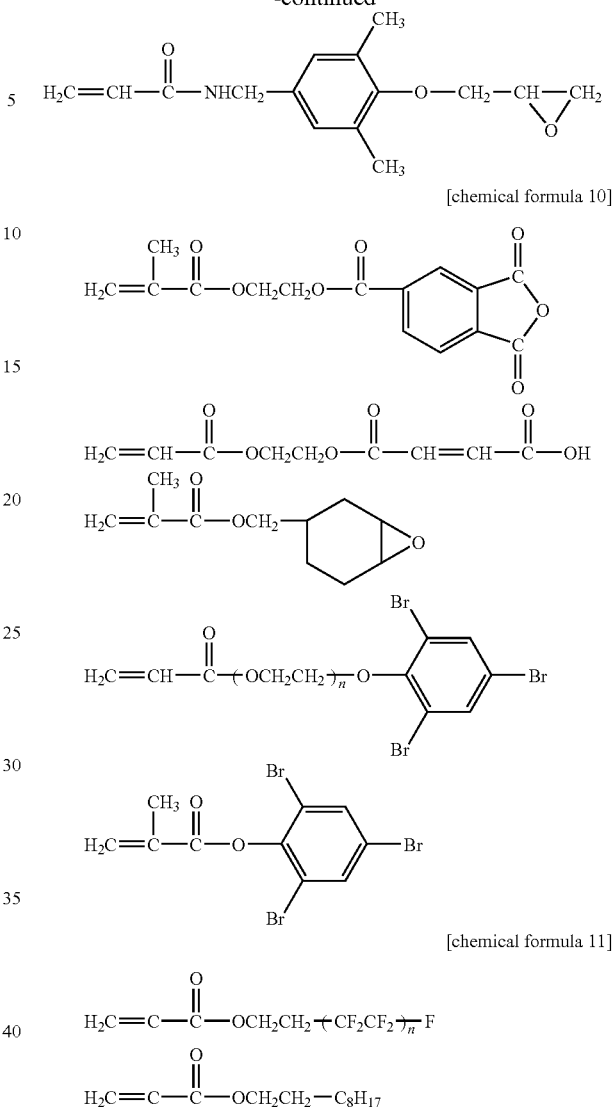

[chemical formula 10]

[chemical formula 11]

As the styrene monomer, styrene, a-methylstyrene, and the like may be exemplified.

As the vinyl ester monomer, vinyl acetate, vinyl propionate, vinyl butyrate, and the like may be exemplified.

As the acrylamide monomer, acrylamide, N,N-dimethyl acrylamide, and the like may be exemplified.

As the conjugated diene monomer, butadiene, isoprene, and the like may be exemplified. As the vinyl ketone monomer, methyl vinyl ketone, and the like may be exemplified.

As the halogenated vinyl-halogenated vinylidene monomer, vinyl chloride, vinyl bromide, vinyl iodide, vinylidene chloride, vinylidene bromide, and the like may be exemplified.

As the polyfunctional monomer, trimethylolpropane triacrylate, neopentylglycolpolypropoxy diacrylate, trimethylolpropanepolyethoxy triacrylate, bisphenol F polyethoxy diacrylate, bisphenol A polyethoxy diacrylate, dipentaerythritolpolyhexanolide hexacrylate, tris(hydroxyethyl)isocyanuratepolyhexanolide triacrylate, tricyclodecanedimethylol diacrylate 2-(2-acryloyloxy-1,1-dimethyl)-5-ethyl-5-acryloyloxymethyl-1,3-dioxane, tetrabromobisphenol A diethoxy diacrylate, 4,4-dimercaptodiphenyl sulfide dimethacrylate, polytetraethylene glycol diacrylate, 1,9-nonanediol diacrylate, ditrimethylolpropane tetraacrylate, and the like may be exemplified.

As the oligomer, epoxy acrylate resins such as bisphenol A type epoxy acrylate resins, phenol novolak type epoxy acrylate resins, cresol novolak type epoxy acrylate resins, and COOH group-modified epoxy acrylate resins; urethane acrylate resins obtained by allowing hydroxyl group-containing (meth)acrylate {hydroxyethyl (meth)acrylate, hydroxypropyl (meth)acrylate, hydroxybutyl (meth)acrylate, pentaerythritol triacrylate, etc.} to react with an urethane resin obtained from a polyol (polytetramethylene glycol, polyester diol of ethylene glycol and adipic acid, e-caprolactone-modified polyester diol, polypropylene glycol, polyethylene glycol, polycarbonate diol, hydroxyl group-terminated hydrogenated polyisoprene, hydroxyl group-terminated polybutadiene, hydroxyl group-terminated polyisobutylene, etc.) and an organic isocyanate (tolylene diisocyanate, isophorone diisocyanate, diphenylmethane diisocyanate, hexamethylene diisocyanate, xylylene diisocyanate, etc.); resins produced by introducing a (meth)acryl group into the polyol via an ester bond; polyester acrylate resins, poly(meth)acryl acrylate resins (poly(meth)acrylic ester resins having a polymerizable reactive group), and the like may be exemplified.

Among the above illustrative compounds, monomers and/or oligomers having a (meth)acryloyl group are preferred. In addition, the monomer and/or oligomer having a (meth)acryloyl group preferably has a number average molecular weight of no greater than 5,000. Moreover, in order to improve the surface curability, and to lower the viscosity for improving the workability, the molecular weight is more preferably no greater than 1,000 when a monomer is used, on the ground that favorable compatibility is achieved.

The amount of the polymerizable monomer and/or oligomer used is preferably 1 to 200 parts by weight, and more preferably 5 to 100 parts by weight based on 100 parts by weight of the vinyl polymer (II) in light of improvement of the surface curability, possibility of imparting toughness, and workability attained by lowering of the viscosity.

Polyether Polymer (IV)

In the curable composition of the present invention, a polyether polymer (IV) can be further used.

Main Chain

The main chain of the polyether polymer is not particularly limited, and for example, polyethylene oxide, polypropylene oxide, polybutylene oxide, polyphenylene oxide, and the like may be exemplified. Of these, substantially polyoxyalkylene is preferred, and substantially polypropylene oxide is more preferred, which may also include ethylene oxide, butylene oxide, phenylene oxide and the like in addition to propylene oxide. Also, the polyether polymer may or may not include an urethane bond in the main chain. The term "main chain being substantially polypropylene oxide" refers to the state of the propylene oxide unit accounting for no less than 50%, preferably no less than 70%, and more preferably no less than 90% in the recurring units that constitute the main chain. The polypropylene oxide polymer has a molecular weight distribution (Mw/Mn) of more preferably no greater than 1.5 since lower viscosity results in favorable handlability.

Crosslinkable Functional Group

In the present invention, the polyether polymer (IV) may have a crosslinkable functional group, and the crosslinkable functional group in the polyether polymer is not particularly limited. Preferable examples of the crosslinkable functional group include crosslinkable silyl groups, alkenyl groups, a hydroxyl group, amino groups, groups having a polymerizable carbon-carbon double bond, and epoxy groups. Particularly, crosslinkable silyl groups are preferred.

The number of the crosslinkable functional group included in the polyether polymer is preferably at least one on average, but may be no greater than 1. In light of the curability of the composition, the number is preferably greater than 1, more preferably 1.1 to 4.0 on average, and more preferably 1.5 to 2.5 on average. In addition, the crosslinkable functional group is positioned preferably at the end of the polyether polymer, in light of the rubber elasticity of the cured product. The functional group is more preferably positioned at both ends of the polymer.

Molecular Weight

The polyether polymer (IV) has a number average molecular weight of preferably no less than 7,500, but the number average molecular weight of no greater than 7,500 is also acceptable. In particular, the number average molecular weight is more preferably 7,500 to 25,000. When the polyether polymer has a number average molecular weight of less than 7,500, the cured product may be too hard, and the elongation is likely to be inferior. In contrast, when the number average molecular weight exceeds 25,000, the adhesiveness of the polymer itself may be significantly deteriorated, whereby practical applicability may be impaired although the satisfactory flexibility and elongation of the cured product may be achieved. However, even though the molecular weight is low, the flexibility and elongation can be improved with the lower number of the crosslinkable functional group. To the contrary, even though the molecular weight is high, the adhesiveness can be improved with the greater number of the crosslinkable functional group. Although the number average molecular weight is particularly preferably 8,000 to 20,000 in light of the viscosity, it may be no greater than 8,000, or may be no less than 20,000.

Amount

The amount of the polyether polymer (IV) when added may be arbitrarily determined, but falls within the range of preferably 100/1 to 1/100, more preferably 100/5 to 5/100, and still more preferably 100/10 to 10/100 by weight ratio with respect to the vinyl polymer (I). The amount may be predetermined to meet each application, and object. However, when the amount is too large, superior heat resistance and weather resistance, one of the effects achieved by the present invention, may be deteriorated.

As the curable composition of the present invention, a composition prepared by blending a (meth)acrylic polymer produced by a general radical polymerization process in the aforementioned polyether polymer, or a composition prepared by mixing a high-temperature continuous block polymer (for example, SGO oligomer manufactured by Toagosei Chemical Industry Co., Ltd. or a silylate thereof) and the aforementioned polyether polymer beforehand may be used.

Polyether Polymer Having Crosslinkable Silyl Group

As the polyether polymer (IV) of the present invention, a polyether polymer having a crosslinkable silyl group that is included in preferable embodiments is now explained.

Main Chain

The main chain structure of the polyether polymer having a crosslinkable silyl group is similar to the structure described above. The main chain may be either straight or branched, or these may be mixed. Of these, particularly preferable main chain results from polyoxypropylene diol, polyoxypropylene triol, or any mixture of these. Moreover, other monomer unit and the like may be included, but no less than 50% by weight, and preferably no less than 80% by weight of the monomer unit represented by the above formula is present in the polymer.

The main chain may or may not include an urethane bond, or an urea bond.

The molecular structure of the polyether polymer may vary depending on the intended applications and characteristics, and the structure disclosed in JP-A-63-112642 may be used. Such polyoxyalkylene can be obtained by any common polymerization process (anion polymerization process carried out using caustic alkali), as well as any method in which a cesium metal catalyst, a porphyrin/aluminum complex catalyst illustrated in JP-A-61-197631, JP-A-61-215622, JP-A-61-215623, JP-A-61-218632 and the like, a conjugated metal cyanide complex catalyst illustrated in JP-B-46-27250 and JP-B-59-15336, or a catalyst constituted with a polyphosphazene salt disclosed in JP-A-10-273512 is used, and the like.

According to the method in which a porphyrin/aluminum complex catalyst, a conjugated metal cyanide complex catalyst or a catalyst constituted with a polyphosphazene salt is used, oxyalkylene polymers having a small molecular weight distribution (Mw/Mn), i.e., no greater than 1.6, still further, no greater than 1.5 can be obtained. The small molecular weight distribution is advantageous in that the composition viscosity can be minimized while keeping low modulus of the cured product and great elongation.

Crosslinkable Silyl Group

Similarly to the vinyl polymer (I), the group represented by the general formula (1) may be used as the crosslinkable silyl group, and the group represented by the general formula (7) is preferred. Explanations made in connection with the groups represented by the general formula (1) and the general formula (7) can be applied similarly to the polyether polymer having a crosslinkable silyl group. The crosslinkable silyl group in the polyether polymer may have the same or different structure as/from the structure of the crosslinkable silyl group in the vinyl polymer having a crosslinkable silyl group.

Since the binding site between the crosslinkable silyl group and the polyether moiety is resistant to hydrolysis, the position preferably includes an alkylene group to provide trimethylene, tetramethylene such that at least 3 carbon atoms are present between the silicon atom of the silyl group and the ether oxygen atom of the polyether moiety.

Number and Position of Crosslinkable Silyl Group

The number of the included crosslinkable silyl group is preferably at least 1.2 or more, more preferably 1.2 or more and 4.0 or less, and still more preferably 1.5 or more and 2.5 or less, in light of the curability and the like of the composition. In addition, the crosslinkable silyl group of the polyether polymer is preferably positioned at the end of the molecular chain, and more preferably the functional group at both ends of the polymer, in light of the rubber elasticity of the cured product.

Also, a polyether polymer having less than 1.2 crosslinkable silyl groups on average can be used. In this case, a cured product having higher elongation at break, lower bleeding properties, lower surface staining possibility and superior paint adhesiveness can be obtained. In addition, by predetermining the molecular weight of this polymer to be smaller, the viscosity of the composition can be lowered. The lower limit of the number of the crosslinkable silyl group is preferably at least 0.1 or more, more preferably no less than 0.3, and still more preferably no less than 0.5. The crosslinkable silyl group is preferably positioned at the end of the molecular chain. Furthermore, it is preferred that the crosslinkable silyl group of this polyether polymer be present in the main chain at only one end, while not be present on another end, but not particularly limited thereto as long as the number is no greater than 1.2 on average. In an attempt to lower the viscosity using the polyether polymer having less than 1.2 crosslinkable silyl groups on average, the molecular weight is preferably less than 10,000, and more preferably less than 5,000.

Method For Introduction Of The Crosslinkable Silyl Group

The crosslinkable silyl group may be introduced by any known method. More specifically, for example, the following methods may be involved. For example, a method for an oxyalkylene polymer obtained using a conjugated metal cyanide complex catalyst is disclosed in JP-A-03-72527, while a method for an oxyalkylene polymer obtained using a polyphosphazene salt and active hydrogen as a catalyst is disclosed in JP-A-11-60723.

(1) An unsaturated group-containing oxyalkylene polymer is obtained by allowing an oxyalkylene polymer having a functional group such as a hydroxyl group at the end to react with an organic compound having an active group reactive to this functional group and an unsaturated group, or by copolymerization with an unsaturated group-containing epoxy compound. Next, hydrosilane having a crosslinkable silyl group is allowed to act on thus resulting reaction product, whereby hydrosilylation is permitted.

(2) An unsaturated group-containing oxyalkylene polymer obtained in a similar manner to the process in (1) is allowed to react with a compound having a mercapto group and a crosslinkable silyl group.

(3) An oxyalkylene polymer having a functional group such as a hydroxyl group, an epoxy group or an isocyanate group (hereinafter, may be referred to as Y functional group) at the end is allowed to react with a compound having a functional group that is reactive to this Y functional group (hereinafter, may be referred to as Y' functional group) and a crosslinkable silyl group.

Specifically, illustrative examples of this silicon compound having Y' functional group include amino group-containing silanes such as γ-(2-aminoethyl)aminopropyltrimethoxysilane, γ-(2-aminoethyl)aminopropylmethyldimethoxysilane, γ-aminopropyltriethoxysilane, 3-amino,2-methylpropyltrimethoxysilane, N-ethyl-3-amino,2-methylpropyltrimethoxysilane, 4-amino,3-methylpropyltrimethoxysilane, 4-amino,3-methylpropylmethyldimethoxysilane, N-phenyl-3-aminopropyltrimethoxysilane, as well as partial Michael addition reaction products of various types of amino group-containing silane with a maleic acid ester or an acrylate compound; mercapto group-containing silanes such as γ-mercaptopropyltrimethoxysilane and γ-mercaptopropylmethyldimethoxysilane; epoxysilanes such as γ-glycidoxypropyltrimethoxysilane, and β-(3,4-epoxycyclohexyl)ethyltrimethoxysilane; vinyl type unsaturated group-containing silanes such as vinyltriethoxysilane, γ-methacryloyloxypropyltrimethoxysilane, and γ-acryloyloxypropylmethyldimethoxysilane; chlorine atom-containing silanes γ-chloropropyltrimethoxysilane; isocyanate-containing silanes such as γ-isocyanatepropyltriethoxysilane, γ-isocyanatepropylmethyldimethoxysilane, and γ-isocyanatepropyltrimethoxysilane; hydrosilanes such as methyldimethoxysilane, trimethoxysilane, methyldiethoxysilane, and triethoxysilane, but not limited thereto.

Furthermore, there are: a method in which, when a polymer having the number of the crosslinkable silyl group being no greater than 1.2 on average is to be produced, a polyether polymer having only one functional group in the molecule is used to allow for a reaction with a compound having a crosslinkable silyl group in an amount less than the equivalent of the functional group of the polyether polymer in introducing a crosslinkable silyl group, whereby a polyether polymer having no greater than 1.2 crosslinkable silyl groups on average is obtained; and a method in which a polyether polymer having one or more functional group in the molecule on average is used to allow for a reaction with a compound having a crosslinkable silyl group in an amount further less than the functional group, whereby a polyether polymer having no greater than 1.2 crosslinkable silyl groups on average is obtained consequently.

When the polyether polymer having a crosslinkable silyl group is used as the polyether polymer (IV) of the present invention, the amount may be identical to the amount of the polyether polymer (IV) described above. Additionally, when a polyether polymer having no greater than 1.2 crosslinkable silyl group on average is used, the amount is preferably no less than 1 part by weight and no greater than 200 parts by weight, more preferably no less than 3 parts by weight and no greater than 100 parts by weight, and further preferably no less than 5 parts by weight and no greater than 80 parts by weight based on 100 parts by weight of the vinyl polymer (I). When the amount is less than 1 part by weight, the effect of addition is less likely to be achieved, while the amount beyond 200 parts by weight is likely to lead to unstable the physical properties of the cured product.

Vinyl Polymer (V) Having a Number Average Molecular Weight of no greater than 5,000

To the curable composition of the present invention may be further added a vinyl polymer (V) having a number average molecular weight of no greater than 5,000. By adding the vinyl polymer (V) having a number average molecular weight of no greater than 5,000, the viscosity of the curable composition of the present invention can be lowered. Also, even with the composition structure in which the vinyl polymer (I) and the vinyl polymer (II) are hardly compatible, the effect of improving the compatibility can be expected by the addition of this vinyl polymer (V) having a comparatively low molecular weight.

The vinyl polymer (V) having a number average molecular weight of no greater than 5,000 is not particularly limited as long as the number average molecular weight is no greater than 5,000. The monomer species constituting the polymer, and the production method are similar to those of the vinyl polymer (I) and the vinyl polymer (II).

The functional group may or may not be present, and the type may be any one, but in general, to include no functional group is preferred due to advantages in terms of the cost.

Furthermore, the production method may be as illustrated above, and a vinyl polymer produced by a high-temperature continuous polymerization process using an acryl polymer of a solvent free type without using a solvent and a chain transfer agent (U.S. Pat. No. 4,414,370, JP-A-59-6207, JP-B-05-58005, JP-A-01-313522, U.S. Pat. No. 5,010,166) is more preferred to achieve the object of the present invention. Although not particularly limited, the examples include ARUFON UP Series (UP-1000, UP-1020, UP-1110, UP-2000, UP-2130) (referred to as SGO), products manufactured by Toagosei Chemical Industry Co., Ltd., and the like (see, Waterproofing Journal, 2002, June). As a matter of course, the living radical polymerization process described above as other synthesis method is also preferred in light of small molecular weight distribution of the resulting polymer, and capability of lowering the viscosity. Furthermore, the atom transfer radical polymerization process is more preferred, but not limited thereto.

In the curable composition of the present invention, the amount of the vinyl polymer (V) having a number average molecular weight of no greater than 5,000 used is not particularly limited, preferably 5 to 500 parts by weight, more preferably 10 to 200 parts by weight, and still more preferably 20 to 100 parts by weight based on 100 parts by weight of the total amount of the vinyl polymer (I) and the vinyl polymer (II).

Polymer Optional Component Having Various Types of Crosslinkable Functional Group To the curable composition of the present invention, a polymer having various types of crosslinkable functional groups may be added as an optional component. Typical polymers having a crosslinkable functional group may include (i) polyisobutylene polymers having a crosslinkable functional group, particularly polyisobutylene polymers having a crosslinkable silyl group, and (ii) polysiloxane. These polymers may be added alone or in combination of two or more thereof.

Compatibility Accelerator

To the curable composition of the present invention may be added a compatibility accelerator. For example, when the polyether polymer (IV) as described above is to be added, it may not be compatible with the vinyl polymer of the present invention. Specific examples of the additive which can be used in such a case include e.g., copolymers and the like of multiple vinyl monomers disclosed in the specification of JP-A-2001-329025.

Curable Composition

To the curable composition of the present invention, various types of compounding agents may be added to meet the intended physical properties.

Curing Catalyst•Curing Agent of Vinyl Polymer (I)

The vinyl polymer of the present invention (I) is crosslinked and hardened by forming a siloxane bond in the presence or absence of a conventionally known various types of condensation catalyst (curing catalyst, may be also referred to as "curing agent"). The cured product can be produced to have a large variety of natures such as rubbery, resinous and the like depending on the molecular weight and the main chain skeleton of the polymer.

In the curable composition of the present invention, any of a conventionally known various types of condensation catalysts which are used in polymers having a crosslinkable silyl group may be used.

Examples of such condensation catalyst include: quadrivalent tin compounds such as dialkyltin dicarboxylates such as e.g., dibutyltin dilaurate, dibutyltin diacetate, dibutyltin diethyl hexanoate, dibutyltin dioctate, dibutyltin dimethyl maleate, dibutyltin diethyl maleate, dibutyltin dibutyl maleate, dibutyltin diisooctyl maleate, dibutyltin ditridecyl maleate, dibutyltin dibenzyl maleate, dibutyltin maleate, dioctyltin diacetate, dioctyltin distearate, dioctyltin dilaurate, dioctyltin diethyl maleate, and dioctyltin diisooctyl maleate, dialkyltin alkoxides such as e.g., dibutyltin dimethoxide, and dibutyltin diphenoxide, intramolecular coordinating derivatives of dialkyltin such as e.g., dibutyltin diacetylacetonato, and dibutyltin diethylacetoacetate, reaction products of dialkyltin oxide such as e.g., dibutyltin oxide or dioctyltin oxide and an ester compound such as e.g., dioctyl phthalate, diisodecyl phthalate, or methyl maleate, tin compounds obtained a reaction of dialkyltin oxide, carboxylic acid and an alcohol compound, reaction products of, for example, dialkyltin oxide such as dibutyltin bistriethoxysilicate, or dioctyltin bistriethoxysilicate with a silicate compound, and oxy derivatives of these dialkyltin compounds (stanoxane compounds); bivalent tin compounds such as e.g., tin octoate, tin naphthenate, tin stearate, or tin versatate, or reaction products and mixtures of these bivalent tin compounds and an amine compound such as laurylamine described later; monobutyltin compounds such as e.g., monobutyltin trisoctoate and monobutyltin triisopropoxide, and monooctyltin compounds such as monoalkyltin; titanic acid esters such as e.g., tetrabutyl titanate, tetrapropyl titanate, tetra(2-ethylhexyl)titanate, and isopropoxytitaniumbis(ethylacetoacetate); organic aluminum compounds aluminum trisacetylacetonato, aluminum trisethylacetoacetate, and diisopropoxy aluminum ethylacetoacetate; carboxylic acid (2-ethylhexaneacid, neodecanoic acid, versatic acid, oleic acid, naphthenic acid, etc.) metal salts such as bismuth carboxylate, iron carboxylate, titanium carboxylate, lead carboxylate, vanadium carboxylate, zirconium carboxylate, calcium carboxylate, potassium carboxylate, barium carboxylate, manganese carboxylate, cerium carboxylate, nickel carboxylate, cobalt carboxylate, zinc carboxylate, and aluminum carboxylate, or reaction products and mixtures of metal salts with an amine compound such as laurylamine described later; chelate compounds such as zirconium tetraacetylacetonato, zirconium tributoxyacetylacetonato, dibutoxy zirconium diacetylacetonato, zirconium acetylacetonatobis(ethylacetoacetate), and titanium tetraacetylacetonato; aliphatic primary amines such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine, and cyclohexylamine; aliphatic secondary amines such as dimethylamine, diethylamine, dipropylamine, diisopropylamine, dibutylamine, diamylamine, dioctylamine, di(2-ethylhexyl)amine, didecylamine, dilaurylamine, dicetylamine, distearylamine, methylstearylamine, ethylstearylamine, and butylstearylamine; aliphatic tertiary amines such as triamylamine, trihexylamine, and trioctylamine; aliphatic unsaturated amines such as triallylamine, and oleylamine; aromatic amines such as laurylaniline, stearylaniline, and triphenylamine; and, as other amines, amine compound such as monoethanolamine, diethanolamine, triethanolamine, diethylenetriamine, triethylenetetramine, oleylamine, cyclohexylamine, benzylamine, diethylaminopropylamine, xylylenediamine, ethylenediamine, hexamethylenediamine, triethylenediamine, guanidine, diphenylguanidine, 2,4,6-tris(dimethylaminomethyl)phenol, morpholine, N-methylmorpholine, 2-ethyl-4-methylimidazole, and 1,8-diazabicyclo(5,4,0)undecene-7 (DBU), or salts of these amine compounds with a carboxylic acid or the like; reaction products and mixtures of an amine compound and an organic tin compound such as a reaction product or a mixture of laurylamine and octyl acid tin; low molecular weight polyamide resins obtained from excess polyamine and a polybasic acid; reaction products of excess polyamine and an epoxy compound; γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, N-(β-aminoethyl)aminopropyltrimethoxysilane, N-(β-aminoethyl)aminopropylmethyldimethoxysilane, N-(β-aminoethyl)aminopropyltriethoxysilane, N-(β-aminoethyl)aminopropylmethyldiethoxysilane, N-(β-aminoethyl)aminopropyltriisopropoxysilane, γ-ureidepropyltrimethoxysilane, N-phenyl-γ-aminopropyltrimethoxysilane, N-benzyl-γ-aminopropyltrimethoxysilane, N-vinylbenzyl-γ-aminopropyltriethoxysilane, and the like. Moreover, derivatives prepared by modification of these, i.e., silane coupling agents having an amino group such as aminomodified silyl polymers, silylated amino polymers, unsaturated aminosilane complexes, phenylamino long chain alkylsilanes, and aminosilylated silicone; silanol condensation catalysts, as well as other acidic catalysts such as fatty acids like ferzatic acid and organo acidic phosphoric acid ester compounds, and known silanol condensation catalyst such as basic catalysts may be exemplified.

Illustrative examples of the organo acidic phosphoric acid ester compound as acidic catalyst include $(CH_3O)_2-P(=O)(-OH)$, $(CH_3O)-P(=O)(-OH)_2$, $(C_2H_5O)_2-P(=O)(-OH)$, $(C_2H_5O)-P(=O)(-OH)_2$, $(C_3H_7O)_2-P(=O)(-OH)$, $(C_3H_7O)-P(=O)(-OH)_2$, $(C_4H_9O)_2-P(=O)(-OH)$, $(C_4H_9O)-P(=O)(-OH)_2$, $(C_8H_{17}O)_2-P(=O)(-OH)$, $(C_8H_{17}O)-P(=O)(-OH)_2$, $(C_{10}H_{21}O)_2-P(=O)(-OH)$, $(C_{30}H_{23}O)-P(=O)(-OH)_2$, $(C_{13}H_{27}O)_2-P(=O)(-OH)$, $(C_{13}H_{27}O)-P(=O)(-OH)_2$, $(C_{16}H_{33}O)_2-P(=O)(-OH)$ $(C_{16}H_{33}O)-P(=O)(-OH)_2$, $(HO-C_6H_{12}O)_2-P(=O)(-OH)$, $(HO-C_6H_{12}O)-P(=O)(-OH)_2$, $(HO-C_8H_{16}O)-P(=O)(-OH)$, $(HO-C_8H_{16}O)-P(=O)(-OH)_2$, $[(CH_2OH)(CHOH)O]_2-P(=O)(-OH)$, $[(CH_2OH)(CHOH)O]-P(=O)(-OH)_2$, $[(CH_2OH)(CHOH)C_2H_4O]_2-P(=O)(-OH)$, $[(CH_2OH)(CHOH)C_2H_4O]-P(=O)(-OH)_2$, and the like, but not limited to these illustrative substances.

The system in which such an organic acid is used in combination with an amine is more preferred since the amount used can be reduced due to the elevated catalyst activity. Among the combined systems of the organic acid and the amine, the combined system of an acidic phosphoric acid ester and an amine, an organic carboxylic acid and an amine, particularly those of an organo acidic phosphoric acid ester and an amine, and an aliphatic carboxylic acid and an amine can achieve a higher catalyst activity, and thus preferred in light of the rapid curability. Details are demonstrated below.

These catalysts may be used alone, and two or more may be used in combination.

When a condensation catalyst is used in the curable composition of the present invention, the amount used is not particularly limited, and is preferably 0.01 to 20 parts by weight, and more preferably 0.5 to 5 parts by weight based on 100 parts by weight of the vinyl polymer (I).

Amine Compound

In the curable composition of the present invention, an amine compound may be added in order to improve the activity of the condensation catalyst.

Examples of the amine compound include aliphatic primary amines such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine, and cyclohexylamine; aliphatic secondary amines such as dimethylamine, diethylamine, dipropylamine, diisopropylamine, dibutylamine, diamylamine, dioctylamine, di(2-ethylhexyl)amine, didecylamine, dilaurylamine, dicetylamine, distearylamine, methylstearylamine, ethylstearylamine, and butylstearylamine; aliphatic third amines such as triamylamine, trihexylamine, and trioctylamine; aliphatic unsaturated amines such as triallylamine, and oleylamine; aromatic amines such as laurylaniline, stearylaniline, and triphenylamine; and, as other amines, amine compounds such as monoethanolamine, diethanolamine, triethanolamine, diethylenetriamine, triethylenetetramine, oleylamine, cyclohexylamine, benzylamine, diethylaminopropylamine, xylylenediamine, ethylenediamine, hexamethylenediamine, triethylenediamine, guanidine, diphenylguanidine, 2,4,6-tris(dimethylaminomethyl)phenol, morpholine, N-methylmorpholine, 2-ethyl-4-methylimidazole, and 1,8-diazabicyclo(5,4,0)undecene-7 (DBU), polyamine compounds, γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, N-(β-aminoethyl)aminopropyltrimethoxysilane, N-(β-aminoethyl)aminopropylmethyldimethoxysilane, N-(β-aminoethyl)aminopropyltriethoxysilane, N-(β-aminoethyl)aminopropylmethyldiethoxysilane, N-(β-aminoethyl)aminopropyltriisopropoxysilane, γ-ureidepropyltrimethoxysilane, N-phenyl-γ-aminopropyltrimethoxysilane, N-benzyl-γ-aminopropyltrimethoxysilane, N-vinylbenzyl-γ-aminopropyltriethoxysilane, and the like. In addition, derivatives obtained by modifying these substances, aminosilane compounds having an amino group such as silane coupling agents having an amino group such as amino-modified silyl polymers, silylated amino polymers, unsaturated aminosilane complexes, phenylamino long chain alkylsilane, and aminosilylated silicone; and the like, but not limited to the illustrated substances.

Further, among the aminosilane compounds, a methoxy group, an ethoxy group and the like are preferred in light of the hydrolysis rate. The number of the hydrolyzable group is preferably no less than 2, and particularly no less than 3.

These amine compounds may be used alone, or two or more may be used as a mixture.

The amount of the blended amine compound when added is preferably 0.01 to 50 parts by weight, and more preferably 0.1 to 20 parts by weight based on 100 parts by weight of the vinyl polymer (I). When the amount of the blended amine compound is less than 0.01 parts by weight, the curing speed may be retarded, and satisfactory progress of the curing reaction may not be executed. To the contrary, the amount of the blended amine compound exceeding 50 parts by weight is not preferred in light of the workability since the pot life may be too short.

When this amine compound is added, it may be mixed with the curing catalyst beforehand to allow the reaction, and may be added afterwards. When the amine compound is mixed beforehand to permit the reaction, the higher catalyst activity may be achieved, whereby it is probable to achieve rapid curability.

In addition, in order to further enhance the activity of the condensation catalyst, the silane coupling agent having an amino group can be used also as a catalytic promoter in the curable composition of the present invention, similarly to the amine compound. This amino group-containing silane coupling agent is a compound having a group including a silicon atom to which a hydrolyzable group is bound (hereinafter, referred to as hydrolyzable silyl group), and an amino group. This hydrolyzable group may include the groups illustrated above in the foregoing, and a methoxy group, an ethoxy group and the like are preferred in light of the hydrolysis rate. The number of the hydrolyzable group is preferably no less than 2, and particularly preferably no less than 3.

The amount of the blended amine compound is preferably approximately 0.05 to 10 times, and more preferably 0.1 to 3 parts by weight in terms of the weight ratio with respect to the curing catalyst. Too small or too large amount of the blended amine compound is not preferred in light of the workability, since the curing speed may be retarded, and difficulty in proceeding sufficient curing reaction and too short pot life may be resulted.

These amine compounds may be used alone, or two or more may be used as a mixture.

To use the amine compound in combination with an organic acid is more preferred since the amount can be reduced due to the catalyst activity enhanced. As the system of the organic acid in combination with the amine, combinations of an acidic phosphoric acid ester and amine, or a carboxylic acid and amine may be exemplified. Further, combination systems of carboxylic acid and amine are preferred in light of rapid curability resulting from the enhanced catalyst activity, and yet, combination systems with organic carboxylic acid, particularly combination systems of aliphatic carboxylic acid and amine are preferred.

In addition, a silicon compound not having an amino group or a silanol group may also be added as a catalytic promoter. Although these silicon compounds are not limited, phenyltrimethoxysilane, phenylmethyldimethoxysilane, phenyldimethylmethoxysilane, diphenyldimethoxysilane, diphenyldiethoxysilane, triphenylmethoxysilane and the like are preferred. In particular, diphenyldimethoxysilane and diphenyldiethoxysilane are most preferred since they serve in reduction of the cost, and are readily available.

The amount of this silicon compound blended is preferably approximately 0.01 to 20 parts by weight, and more preferably 0.1 to 10 parts by weight based on 100 parts by weight of the vinyl polymer (I). When the amount of the blended silicon compound is below this range, the effect of accelerating the curing reaction may be deteriorated. To the contrary, when the amount of the blended silicon compound is beyond the aforementioned range, the hardness and the tensile strength of the cured product may be reduced.

The curability, mechanical physical properties and the like according to the present invention can be controlled to meet the object and applications with the type of the curing catalyst•curing agent, and the amount of addition. Moreover, the type and the and the amount of addition of the curing catalyst•curing agent can be changed also depending on the reactivity of the crosslinkable silyl group of the vinyl polymer (I). More specifically, the range of a smaller amount such as 0.01 to 1 parts by weight enables satisfactory curing when the reactivity is high enough.

The type and the amount of addition of the curing catalyst•curing agent can be selected depending on, for example, the crosslinkable silyl group of the vinyl polymer of the present invention (I), the type of Y and the number of "a" in the general formula (1), and thus the curability and the mechanical physical properties and the like of the present invention can be controlled to meet the objects and applications. When Y is an alkoxy group, higher reactivity is achieved as the number of carbon atoms is smaller, while the greater "a" leads to enhanced reactivity, thereby enabling sufficient curing in a smaller amount.

Dehydration Agent

According to the curable composition, thickening and gelation may proceed during its storage by means of the moisture and the like included in production, whereby the workability in use may be inferior. In addition, by using thus thickened and gelated curable composition, the physical properties of the cured product after hardening may be deteriorated, which may lead to problems of deterioration of the sealing properties and the like involved in the primary objects. In other words, problems of the storage stability of the curable composition may be raised.

In order to improve the storage stability of this curable composition, a method or reducing the moisture content of the curable composition by azeotropic dehydration may be carried out. For example, a method may be exemplified in which: a volatile organic compound having a minimum azeotropic point with respect to water is added in an amount of approximately 0.1 to 10 parts by weight based on 100 parts by weight of the total amount of the vinyl polymer (I) and the vinyl polymer (II), and homogenously mixed; and thereafter the azeotropic composition of the water-organic compound is taken off outside the system while heating at about 50 to 90° C. and aspirating with a vacuum pump. Illustrative examples of the volatile organic compound having a minimum azeotropic point with respect to water include halides such as methylene chloride, chloroform, carbon tetrachloride, and trichloroethylene; alcohols such as ethanol, allyl alcohol, 1-propanol, and butanol; esters such as ethyl acetate, and methyl propionate; ketones such as methylethyl ketone, and 3-methyl-2-butanone; ethers such as ethyl ether, and isopropyl ether; hydrocarbons such as benzene, toluene, xylene, and hexane, and the like. However, since this method involves a devolatilization operation, ingenious consideration for the other volatile compounding agent, as well as a treatment and recovery and the like of the volatile organic compound subject to the azeotrope may be required. Therefore, in some cases, addition of the dehydration agent described below may be more preferred.

As described above, a dehydration agent for removing the moisture in the curable composition may be added to the curable composition of the present invention in order to improve the storage stability. The dehydration agent may be, for example, an inorganic solid such as phosphorus pentoxide, as well as sodium bicarbonate, sodium sulfate (mirabilite anhydride), molecular sieves, or the like. Although any of these solid dehydration agents may be used, since the liquid following the addition may be extremely acidic or basic, whereby the storage stability may be deteriorated due to ease in condensation that may rather occur, and the workability may be impaired because elimination of the solid later on may be necessary. Therefore, the liquid hydrolyzable ester compound described later would be preferred. The hydrolyzable ester compound may be selected from the group consisting of trialkyl orthoformate such as trimethyl orthoformate, triethyl orthoformate, tripropyl orthoformate, and tributyl orthoformate, trialkyl orthoacetate such as trimethyl orthoacetate, triethyl orthoacetate, tripropyl orthoacetate, and tributyl orthoacetate, and the like, and compounds thereof.

As the other hydrolyzable ester compound, hydrolyzable organic silicon compounds represented by the formula $R_{4-n}SiY_n$ (wherein, Y represents a hydrolyzable group, and R represents an organic group which may or may not include a functional group, n represents an integer of 1 to 4, and preferably 3 or 4) may be further exemplified, and specific examples thereof include silane compounds or partially hydrolyzed condensates thereof such as vinyltrimethoxysilane, vinyltriethoxysilane, methyltrimethoxysilane, methyltriethoxysilane, ethyltriethoxysilane, phenyltriethoxysilane, methyltriacetoxysilane, tetramethyl orthosilicate (tetramethoxysilane or methylsilicate), tetraethyl orthosilicate (tetraethoxysilane or ethylsilicate), tetrapropyl orthosilicate, and tetrabutyl orthosilicate; silane coupling agents or partially hydrolyzed condensates thereof such as γ-aminopropyltrimethoxysilane, γ-glycidoxypropyltriethoxysilane, N-(β-aminoethyl)-γ-aminopropyltrimethoxysilane, γ-acryloxypropyltrimethoxysilane, γ-methacryloxypropyltrimethoxysilane, γ-glycidoxypropyltrimethoxysilane, γ-mercaptopropyltrimethoxysilane, and N-(β-aminoethyl)-γ-aminopropylmethyldimethoxysilane, and the like. Of these, one, or two or more in combination as a blend may be used.

The amount of the storage stability improving agent used is preferably 0.1 to 30 parts by weight, more preferably 0.3 to 20 parts by weight, and more preferably 0.5 to 10 parts by weight based on 100 parts by weight of the vinyl polymer (I).

When such a storage stability improving agent is added, the procedure is preferably conducted after the curable composition is turned into an anhydrous state, but it may be added in the state as the composition includes moisture.

Adhesion Promoter

To the composition of the present invention may be added a silane coupling agent, and an adhesion promoter other than the silane coupling agent. When an adhesion promoter is added, risks of detachment of the sealant from the adherend of the siding board and the like can be further reduced through alteration of the joint width by the external force. Alternatively, as the case may be, a primer for use in improving the adhesiveness may not be necessary, and simplification of the working operation can be expected. Specifically, illustrative examples of the silane coupling agent include silane coupling agents having a functional group such as a mercapto group, an epoxy group, a carboxyl group, a vinyl group, an isocyanate group, isocyanurate, halogen, or an amino group, and specific examples thereof include isocyanate group-containing silanes such as γ-isocyanatepropyltrimethoxysilane, γ-isocyanatepropyltriethoxysilane, γ-isocyanatepropylmethyldiethoxysilane, and γ-isocyanatepropylmethyldimethoxysilane; amino group-containing silanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-ureidepropyltrimethoxysilane, N-phenyl-γ-aminopropyltrimethoxysilane, N-benzyl-γ-aminopropyltrimethoxysilane, and N-vinylbenzyl-γ-aminopropyltriethoxysilane; mercapto group-containing silanes such as γ-mercaptopropyltrimethoxysilane, γ-mercaptopropyltriethoxysilane, γ-mercaptopropylmethyldimethoxysilane, and γ-mercaptopropylmethyldiethoxysilane; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane; carboxysilanes such as β-carboxyethyltriethoxysilane, β-carboxyethylphenyl bis (2-methoxyethoxy)silane, and N-β-(carboxymethyl)aminoethyl-γ-aminopropyltrimethoxysilane; vinyl type unsaturated group-containing silanes such as vinyltrimethoxysilane, vinyltriethoxysilane, γ-methacryloyloxypropylmethyldimethoxysilane, and γ-acroyloxypropylmethyltriethoxysilane; halogen-containing silanes such as γ-chloropropyltrimethoxysilane; isocyanurate silanes such as tris(trimethoxysilyl)isocyanurate, polysulfanes such as bis(3-triethoxysilylpropyl)tetrasulfane, and the like. Also, reaction products of the aforementioned amino group-containing silane with an epoxy group-containing silane, reaction products of the amino group-containing silane with an acroyloxy group-containing silane, and reaction products of the amino group-containing silanes and an isocyanate group-containing silane can be used. In addition, derivatives obtained by modification of these, i.e., amino-modified silyl polymers, silylated amino polymers, unsaturated aminosilane complexes, phenylamino long chain alkylsilane, aminosilylated silicone, block isocyanate silane, silylated polyesters, and the like, can be also used as the silane coupling agent. Furthermore, ketimine compounds obtained by a reaction of the aforementioned amino group-containing silane with, for example, a ketone compound such as methylisobutyl ketone, and the like can be also used as the silane coupling agent.

In the curable composition of the present invention, the silane coupling agent may be used in an amount falling within the range of preferably 0.1 to 20 parts by weight based on 100 parts by weight of the total amount of the vinyl polymer (I) and the vinyl polymer (II). Particularly, to use in the range of 0.5 to 10 parts by weight is more preferred. With respect to the effects of the silane coupling agent added to the curable composition of the present invention, when used in inorganic base materials such as various types of adherends, i.e., glass, aluminum, stainless, zinc, copper, mortar and the like, and in organic base materials such as polyvinyl chloride, acryl, polyester, polyethylene, polypropylene, polycarbonate and the like, marked effects of improving the adhesiveness can be exhibited under non-primer conditions or primer processing conditions. When used under the non-primer condition, particularly prominent effect of improving the adhesiveness to various types of adherend is exhibited. Further, when the amount is approximately 1 part by weight based on 100 parts by weight of the total amount of the vinyl polymer (I) and the vinyl polymer (II), almost no influence is exerted on the transparency of the cured product.

Specific examples of the agent other than the silane coupling agent include generally known tackifying resins, and the like. Although not particularly limited, the examples include phenol resins, modified phenol resins, cyclopentadiene-phenol resins, xylene resins, coumarone resins, petroleum resins, terpene resins, terpene phenol resins, rhodine ester resins and the like, as well as epoxy resins, straight or branched block copolymers such as polystyrene-polybutadiene-polystyrene, polystyrene-polyisoprene-polystyrene, polystyrene-polyisoprene/butadiene copolymer-polystyrene, polystyrene-polyethylene/propylene copolymer-polystyrene, polystyrene-polyethylene/butylene copolymer-polystyrene, and polystyrene-polyisobutene-polystyrene, alkylsulfonic acid esters, sulfur, alkyl titanates, aromatic polyisocyanate, and the like. The epoxy resin can be used after allowing reacting with the aforementioned amino group-containing silanes. The amount of the tackifying resin used is preferably 0.1 to 100 parts by weight based on 100 parts by weight of the total amount of the vinyl polymer (I) and the vinyl polymer (II) in light of the balance of the mechanical physical properties, heat resistance, oil resistance and adhesiveness.

The foregoing adhesion promoters may be used alone, and two or more may be used as a mixture. By adding the adhesion promoter, adhesiveness to the adherends can be improved. Although not particularly limited, in order to improve the adhesiveness, particularly adhesiveness to the surface for adhesion of metal such as oil pan, to use the silane coupling agent among the adhesion promoters in an amount of 0.1 to 20 parts by weight in combination is preferred.

Plasticizer

Various types of plasticizers may be used in the curable composition of the present invention as necessary. To use a plasticizer in combination with the filler described later is more advantageous since the elongation of the cured product can be increased, and a larger amount of the filler can be admixed. However, the plasticizer may not necessarily be added. Although the plasticizer is not particularly limited, for the purpose of adjusting the physical properties, regulation of the nature, and the like, examples thereof include: phthalate esters such as dibutyl phthalate, diheptyl phthalate, di(2-ethylhexyl)phthalate, diisodecyl phthalate, and butylbenzyl phthalate; nonaromatic dibasic acid esters such as dioctyl adipate, dioctyl sebacate, dibutyl sebacate, and isodecyl succinate; aliphatic esters such as butyl oleate, and methylacetyl ricilinolate; esters of polyalkylene glycol such as diethylene glycol dibenzoate, triethylene glycol dibenzoate, and pentaerythritol ester; phosphoric acid esters such as tricresyl phosphate, and tributyl phosphate; trimellitic acid esters; polystyrenes such as polystyrene and poly-a-methylstyrene; polybutadiene, polybutene, polyisobutylene, butadiene-acrylonitrile, and polychloroprene; chlorinated paraffins; hydrocarbon oils such as alkyldiphenyl, and partially hydrogenated terphenyl; process oils; polyether polyols such as polyethylene glycol, polypropylene glycol, ethylene oxide-propylene oxide copolymers and polytetramethylene glycol, and polyethers such as alkyl derivatives obtained by converting one end or both two ends or all ends of hydroxyl groups of these polyether polyols into an alkyl ester group, an alkyl ether group or the like; epoxy group-containing plasticizers such as epoxydized soybean oil, benzylepoxy stearate, and E-PS; polyester plasticizers obtained from a dibasic acid such as sebacic acid, adipic acid, azelaic acid or phthalic acid, and dihydric alcohol such as ethylene glycol, diethylene glycol, triethylene glycol, propylene glycol or dipropylene glycol; vinyl polymers obtained by polymerization of a vinyl monomer by a variety of methods, such as an acrylic plasticizer, and the like.

Among these, when the polymeric plasticizer that is a polymer having a number average molecular weight of 500 to 15,000 is added, the viscosity and slumping properties of the curable composition, and mechanical properties such as tensile strength and elongation of the cured product obtained by hardening the composition can be adjusted, and also, as compared with the case in which a low molecular plasticizer which does not include a polymer component in the molecule is used, initial physical properties can be kept for a long period of time, and the drying characteristics (also referred to as painting performance) exhibited when an alkyd paint is coated on the cured product can be improved. Without limitation, this polymeric plasticizer may or may not have a functional group.

Although the number average molecular weight of the polymeric plasticizer was referred to as 500 to 15,000 in the foregoing, it is preferably 800 to 10,000, and more preferably 1,000 to 8,000. When the molecular weight is too low, outflow of the plasticizer may be caused in a time dependent manner owing to the heat and rainfall, the initial physical properties cannot be kept for a long period of time, and the alkyd painting performance cannot be improved. In addition, too high molecular weight may lead to too high viscosity, whereby the workability is deteriorated.

Among these polymeric plasticizers, polyether plasticizers and (meth)acrylic polymeric plasticizers are preferred in light of great elongation characteristics or superior weather resistance. It should be noted that the aforementioned vinyl polymer of the present invention (V) can also act as an acrylic polymeric plasticizer, and similar substance can be used.

Although the molecular weight distribution of the polymeric plasticizer is not particularly limited, it is desirably narrow in light of the viscosity, and less than 1.8 is preferred. The molecular weight distribution is more preferably no greater than 1.7, still more preferably no greater than 1.6, even more preferably no greater than 1.5, particularly preferably no greater than 1.4, and most preferably no greater than 1.3.

Moreover, in light of the viscosity, the main chain preferably has a branched structure, since lower viscosity is exhibited with the identical molecular weight. The aforementioned high-temperature continuous polymerization process may demonstrate this embodiment.

The plasticizer including the polymeric plasticizer described above may be used alone, or two or more may be used in combination, but this plasticizer may not be necessarily used. Also, if necessary, a low molecular plasticizer may be further used in combination with the polymeric plasticizer, in the range not to adversely affect the physical properties. Moreover, for example, in the case of the composition prepared by mixing the vinyl polymer of the present invention with a polyether polymer which is one of the polymer optional components having a crosslinkable functional group, phthalate esters, and acrylic polymers are particularly preferred in light of the compatibility of the mixture.

These plasticizers can be also blended during production of the polymer.

Although the amount of the plasticizer when incorporated is not limited, it is preferably 5 to 500 parts by weight, more preferably 10 to 200 parts by weight, and more preferably 20 to 100 parts by weight based on 100 parts by weight of the total amount of the vinyl polymer (I) and the vinyl polymer (II). When the amount is less than 5 parts by weight, the effect as a plasticizer can hardly be exhibited, while the mechanical physical properties of the cured product are likely to be deteriorated when the amount exceeds 500 parts by weight.

Filler

In the curable composition of the present invention, various types of fillers may be used as needed in the range not to impair the effect of the present invention. Although the filler is not particularly limited, examples include reinforcing fillers such as wood powder, pulp, cotton chip, asbestos, glass fiber, carbon fiber, mica, walnut shell flour, rice hull flour, graphite, diatomaceous earth, white earth, silica (fumed silica, precipitated silica, crystalline silica, fused silica, dolomite, anhydrous silicic acid, hydrous silicic acid, amorphous spherical silica, etc.), and carbon black; fillers such as heavy calcium carbonate, colloidal calcium carbonate, magnesium carbonate, diatomaceous earth, baked clay, clay, talc, titanium oxide, bentonite, organic bentonite, ferric oxide, aluminum fine powder, flint powder, zinc oxide, active zinc oxide, zinc powder, zinc carbonate and Shirasu balloon, glass micro balloon, organic microballoon of a phenol resin or a vinylidene chloride resin, resin powders such as PVC powder and PMMA powder; fibrous fillers such as asbestos, glass fiber and glass filament, carbon fiber, Kevlar fiber, and polyethylene fiber, and the like.

Among these fillers, precipitated silica, fumed silica, crystalline silica, fused silica, dolomite, carbon black, calcium carbonate, titanium oxide, talc and the like are preferred.

Particularly, to obtain the cured products having high transparency or strength is intended with these fillers, a filler selected predominantly from fumed silica, precipitated silica, anhydrous silicic acid, hydrous silicic acid, carbon black, surface-treated fine calcium carbonate, crystalline silica, fused silica, baked clay, clay, active zinc oxide and the like may be added. These are suitable for transparent sealants for architectures, transparent DIY adhesives, and the like. Among them, ultra fine powder silica having a specific surface area (determined according to BET adsorption process) of no less than 10 m$^2$/g, usually 50 to 400 m$^2$/g, and preferably approximately 100 to 300 m$^2$/g is preferred. Furthermore, silica subjected to a hydrophobilizing treatment of the surface beforehand with an organic silicon compound such as organosilane, organosilazane, diorganocyclopolysiloxane or the like is more preferred.

More specific examples of the silica based filler having high reinforcing ability include, although not particularly limited, one of the fumed silica, Aerosil manufactured by NIPPON AEROSIL CO., LTD., one of precipitated silica, Nipsil manufactured by Nippon Silica Industries Co., and the like. The silica having a mean particle diameter of 1 nm or greater and 30μ or less can be used. With respect to the fumed silica, in particular, the fumed silica including primary particles having a mean particle diameter of 1 nm or greater and 50 nm or less is more preferably used since particularly great reinforcing effect can be exhibited. The mean particle diameter in the present invention is determined according to sieve analyses. Specifically, the powders are classified with sieves having various mesh opening size (micro sieves, etc.), and the mean particle diameter is defined in terms of the value corresponding to the mesh opening size of the sieve through which 50% by weight of total weight of the powder subjected to the measurement passed (weight average particle diameter). The composition reinforced with the filler is excellent in immediate fixability, therefore, it is suitable for automobile glass glazing adhesion.

The transparency can be achieved also by using a resin powder such as PMMA powder as a filler or the like.

Moreover, when to obtain a cured product having high strength and great elongation is intended, a filler predominantly selected from titanium oxide, calcium carbonate, talc, ferric oxide, zinc oxide and Shirasu balloon and the like may be added. In general, calcium carbonate may achieve insufficient effects of improving the fracture strength, the elongation upon fracture, the adhesiveness and the weather resistant adhesiveness of the cured product when the specific surface area is small. The larger the value of the specific surface area becomes, the greater the effects of improving the fracture strength, the elongation upon fracture, the adhesiveness and the weather resistant adhesiveness of the cured product can be achieved. The shape of calcium carbonate which can be used may be of various types such as cubic, noncubic, irregular shape, and the like.

In addition, it is more preferred that calcium carbonate be subjected to a surface treatment using a surface treating agent. When the surface-treated calcium carbonate is used, it is believed that the workability of the composition of the present invention is improved, and the effects of improving the adhesiveness and weather resistant adhesiveness of the curable composition can be further improved as compared with the case in which surface-untreated calcium carbonate is used. As the surface treating agent, various types of surfactants and organic matters such as fatty acid, fatty acid soap and fatty acid ester, and various types of coupling agents such as silane coupling agents and titanate coupling agents have been used. Specific examples include fatty acids such as caproic acid, caprylic acid, pelargonic acid, capric acid, undecanoic acid, lauric acid, myristic acid, palmitic acid, stearic acid, behenic acid and oleic acid, and salts of sodium, potassium and the like of these fatty acids, as well as alkyl esters of these fatty acids, although not limited thereto. Specific examples of the surfactant include sulfuric acid ester type anionic surfactants such as polyoxyethylenealkyl ether sulfuric acid esters, long chain alcohol sulfuric acid esters and the like, and salts of sodium, potassium and the like of the same, as well as sulfonic acid type nonionic surfactants such as alkylbenzenesulfonic acid, alkylnaphthalenesulfonic acid, paraffinsulfonic acid, a-olefinsulfonic acid and alkylsulfosuccinic acid, and sodium salts, potassium salts and the like of the same, and the like. In regard to the amount of the treatment with this surface treating agent, the treatment is carried out with the amount of the surface treating agent in the range of preferably 0.1 to 20% by weight, and more preferably in the range of 1 to 5% by weight, based on calcium carbonate. When the amount is less than 0.1% by weight, the effects of improving the workability, the adhesiveness and the weather resistant adhesiveness may be insufficient, while the amount exceeding 20% by weight may lead to deterioration of the storage stability of the curable composition.

Although not particularly limited, when calcium carbonate is used, when the effects of improving the thixotropy of the blend, and the fracture strength, the elongation upon fracture, the adhesiveness and the weather resistant adhesiveness of the cured product and the like are particularly expected, to use colloidal calcium carbonate is preferred.

On the other hand, heavy calcium carbonate may be added for the purpose of lowering of the viscosity of the blend and bulking, reduction of the cost, and the like. When the heavy calcium carbonate is used, the following may be used as needed.

The heavy calcium carbonate is obtained by mechanical pulverizing and processing of natural chalk (whiting chalk), marble stone, limestone and the like. The pulverization method may include dry process and wet process. The pulverized products obtained by the wet process are often unfavorable since they are likely to deteriorate the storage stability of the curable composition of the present invention. The heavy calcium carbonate yields products having varying mean particle size by carrying out classification. Although not particularly limited, when the effects of improving the fracture strength, the elongation upon fracture, the adhesiveness and the weather resistant adhesiveness of the cured product are expected, the value of the specific surface area is preferably no less than 1.5 $m^2/g$ and no greater than 50 $m^2/g$, more preferably no less than 2 $m^2/g$ and no greater than 50 $m^2/g$, still more preferably no less than 2.4 $m^2/g$ and no greater than 50 $m^2/g$, and particularly preferably no less than 3 $m^2/g$ and no greater than 50 $m^2/g$. When the specific surface area is less than 1.5 $m^2/g$, the improving effects may not be sufficient. As a matter of course, such restriction may not be imposed when just lowering of the viscosity or only bulking is intended.

The value of the specific surface area refers to the measurement derived according to an air permeability method carried out according to JIS K5101 as the measuring method (method in which the specific surface area is determined from the transmittivity in the air with respect to the powder-filled layer). As the measurement equipment, specific surface area measuring apparatus model SS-100 manufactured by Shimadzu Corporation is preferably used.

These fillers may be used alone, or two or more thereof may be used in combination to meet the objects and needs. Although not particularly limited, for example, when heavy calcium carbonate having a specific surface area of no less than 1.5 $m^2/g$ is combined with colloidal calcium carbonate as needed, elevation of the viscosity of the blend can be suppressed favorably, and the effects of improving the fracture strength, the elongation upon fracture, the adhesiveness and the weather resistant adhesiveness of the cured product can be expected greatly.

When the filler is used, the amount of the added filler falls within the range of preferably 5 to 1,000 parts by weight, more preferably 20 to 500 parts by weight, and particularly preferably 40 to 300 parts by weight based on 100 parts by weight of the total amount of the vinyl polymer (I) and the vinyl polymer (II). When the amount blended is less than 5 parts by weight, the effects of improving the fracture strength, the elongation upon fracture, the adhesiveness and the weather resistant adhesiveness of the cured product may not be sufficient, while the workability of the curable composition may be deteriorated when the amount is beyond 1,000 parts by weight. The filler may be used alone, or two or more may be used in combination.

Dolomite, carbon black, calcium carbonate, titanium oxide, talc and the like must be carefully added when used in large quantities, since the favorable heat resistance, the weather resistance, and the oil resistance according to the present invention may be impaired.

<Silica Based Filler>

To the curable composition of the present invention may be added the silica based filler as described above, although not particularly limited. By adding the silica based filler, the strength, the heat resistance, the weather resistance, the oil resistance and the like of the cured product after hardening can be improved. The details are presented below In general, silica is classified into synthetic silica and naturally occurring silica. The synthetic silica is further classified according to the production method into: dry process silica produced by carrying out deposition of the silica by a gas phase reaction at high temperatures (further, classified roughly into combustion process and arc process); wet process silica produced by carrying out deposition of the silica by a neutralizing or degradative reaction of an aqueous sodium silicate solution with acid or an alkali metal salt (further, classified roughly into precipitation process and gel process); and fused silica produced by allowing for fusion completely at high temperatures to yield amorphous, and the like. Whereas, naturally occurring silica may include crystalline silica, anhydrous silicic acid, hydrous silicic acid, and the like.

Among the synthetic silica, illustrative dry process silica may include, for example, Aerosil Series 130, 200, 200V, 200CF, 300, 300CF, R972, R972V, R972CF, R974, RX200, RY200, R812, R812S, etc. (manufactured by NIPPON AEROSIL CO., LTD.), Rheoloseal Series QS-10, QS-102, CP-102, MT-10C, DM-10, etc. (manufactured by Tokuyama Corporation), and the like.

Illustrative wet process silica may include, for example, Tokuseal Series U, UR, GU, USA, USG, etc. (manufactured by Tokuyama Corporation), Nipseal Series SS-10, SS-20, LP, NS-P, VN3, ER, NS-T, NS-K, NA, L300, N300A, K300, G300, etc. (manufactured by Nippon Silica Industries Co.), and the like. Further, illustrative wet process silica produced by a gel process may include Sylysia Series 310, 250N, 430, 770, 470, etc. (manufactured by Fuji Silysia Chemical Ltd.), Nipgel Series (manufactured by Nippon Silica Industries Co.), and the like.

Illustrative fused silica may include, for example, FUSELEX Series E-1, E-2, RD-8, RD-120, MCF-200, Y-60, ZA-30, etc. (manufactured by Tatsumori Ltd.), and the like.

Examples of the naturally occurring silica include crystalline silica, anhydrous silicic acid, hydrous silicic acid, and the like.

Illustrative crystalline silica among the naturally occurring silica may include IMSIL Series A-25, A-15, A-10, A-8, etc. (manufactured by Tatsumori Ltd.), CRYSTALITE Series CMC-12, A-2, 5X, VX-S, AA, 3K-S, MCC-4, etc. (manufactured by Tatsumori Ltd.), and the like.

Of the foregoings, when to obtain the cured product with high transparency or strength is particularly intended with these fillers, ultrafine powdery silica based filler having a specific surface area (according to BET adsorption process) of no less than 10 $m^2/g$, usually 50 to 400 $m^2/g$, and yet approximately 100 to 300 $m^2/g$ may be preferably selected. To use silica having a mean particle diameter of no, less than 1 nm and no greater than 30 μm, particularly, fumed silica including primary particles having a mean particle diameter of no less than 1 nm and no greater than 50 nm is more preferred, since particularly superior reinforcing effect can be achieved. In addition, silica which had been subjected to a hydrophobilizing treatment beforehand with an organic silicon compound such as organosilane, organosilazane, or diorganocyclopolysiloxane on the surface thereof is more preferred.

Of these, Aerosil Series (manufactured by NIPPON AEROSIL CO., LTD.) that is dry process silica produced by a combustion process, Nipseal Series (manufactured by Nippon Silica Industries Co.) that is wet process silica produced by a precipitation process, and the like can be more readily dispersed to give approximately primary particles by searing in compounding, whereby substantial reinforcing effects, thickening effects, and thixotropic effect are exhibited in small quantities. Accordingly, for the purpose of achieving the bulking effect and reduction of the costs for the curable composition, silica having a greater particle size may also be added. However, since too large particle size may adversely affect the workability, the mechanical physical properties, durability and the like, the mean particle diameter is preferably no less than 1 μm and no greater than 500 μm. Combination of these enables elevation of the viscosity of the curable composition to be appropriately suppressed, whereby the reinforcing effect of the thixotropy of the curable composition, and the fracture strength, the elongation upon fracture and the like of the cured product, as well as the improving effect of the adhesiveness and the weather resistant adhesiveness and the like can be expected greatly.

These are suitable for transparent sealants for architectures, transparent adhesives for DIY, and the like. In addition, the composition reinforced with the filler is excellent in immediate fixability, therefore, it is suitable also for automobile glass glazing adhesion.

The silica in the present invention is not particularly limited, and any type of the above illustrated one may be used. However, to use dry process silica is preferable in some cases since it is probable that thickening or gelation of the curable composition may occur during storage, or curing inactivation of catalyst or side reaction may be caused during the reaction when a large amount of the moisture is included. On similar grounds, surface-treated and hydrophobilized silica may also be preferable in some cases. In the surface treatment method, to carry out a hydrophobilizing treatment with an organic silicon compound such as organosilane, organosilazane, or diorganopolysiloxane beforehand is preferred.

Although the amount of the silica based filler added according to the present invention is not particularly limited, 0.1 to 300 parts by weight, preferably 0.5 to 200 parts by weight, and particularly preferably 1 to 100 parts by weight may be used based on 100 parts by weight of the total amount of the vinyl polymer (I) and the vinyl polymer (II). When the blending amount is less than 0.1 parts by weight, the effect of improving the fracture strength of the cured product may not be sufficient, while the amount exceeding 300 parts by weight may lead to inferior workability of the curable composition, or to deteriorated physical properties of the cured product. As compared with the silica such as one having a large particle size, i.e., mean particle diameter of no less than 1 µm and no greater than 500 µm, the silica having a small particle size such as fumed silica has more potent thickening effect; therefore, when too large amount of such silica is added, the kneading can be hardly effected, and thus production of the intended curable composition may fail.

The silica in the present invention may be used alone, or two or more thereof may be used in combination.

The mean particle diameter in the present invention is determined according to sieve analyses. Specifically, the powders are classified with sieves having various mesh opening size (micro sieves, etc.), and the mean particle diameter is defined in terms of the value corresponding to the mesh opening size of the sieve through which 50% by weight of total weight of the powder subjected to the measurement passed (weight average particle diameter).

Hollow Microsphere

In addition, for the purpose of achieving weight saving, and reduction of the costs without significant deterioration of the physical properties, hollow microspheres may be further used in combination with the reinforcing filler.

Although such hollow microsphere (hereinafter, referred to as balloon) is not particularly limited, hollow body composed of an inorganic or organic material having a diameter of no greater than 1 mm, preferably no greater than 500 µm, and more preferably no greater than 200 µm may be included as reported in "Kinosei Fira no Saishin Gijutsu (Latest Technology of Functional Fillers)" (CMC Publishing CO., LTD). In particular, to use microhollow body having a true specific gravity of no greater than 1.0 g/cm³ is preferred, and further, a microhollow body of no greater than 0.5 g/cm³ may be preferably used.

Illustrative examples of the inorganic balloon include silicic balloons and non-silicic balloons. More specifically, illustrative examples of the silicic balloon include Shirasu balloons, perlite, glass (silica) balloons, fly ash balloons and the like, and illustrative examples the non-silicic balloon include alumina balloons, zirconia balloons, carbon balloons and the like. Specific examples of commercially available inorganic balloon include: Winlite manufactured by Idichi Kasei, Sankilite manufactured by Sanki Kogyo Co., Ltd., (Shirasu balloons); Fuji balloon manufactured by Fuji Silysia Chemical Ltd., Calloon manufactured by Nippon Sheet Glass Co., Ltd., Cel-Star Z-28 manufactured by Sumitomo 3M Limited, MICRO BALLOON manufactured by Emerson & Cuming Company, CELAMIC GLASSMODULES manufactured by Pittsburgh Corning Corporation, GLASS BUBBLES manufactured by Sumitomo 3M Limited, Q-CEL manufactured by Asahi Glass Co., Ltd., E-Spheres manufactured by Taiheiyo Cement Corporation (glass (silica) balloons); CEROSPHERES manufactured by Pfamarketing, FILLITE manufactured by Fillite U.S.A (fly ash balloons); BW manufactured by Showa Denko K. K. (alumina balloons); Hollow Zirconium Spheres manufactured by Zircoa Inc. (zirconia balloons); and Kurekasphere manufactured by Kureha Chemical Industry, Carbosphere manufactured by General Technologies Inc. (carbon balloons).

Illustrative organic balloons include thermosetting resin balloons and thermoplastic resin balloons. Examples of the thermosetting balloons include phenol balloons, epoxy balloons and urea balloons, while thermoplastic balloons include saran balloons, polystyrene balloons, polymethacrylate balloons, polyvinyl alcohol balloons and styrene-acrylic balloons. Moreover, crosslinked thermoplastic resin balloons can be also used. The balloon referred to herein may be balloons after subjecting to expansion, or balloons produced by expansion following incorporation of a blowing agent-containing resin.

Specific examples of commercially available such organic balloons include: UCAR and PHENOLIC MICROBALLOONS manufactured by Union Carbide Corporation (phenol balloons); ECCOSPHERES manufactured by Emerson & Cuming Company (epoxy balloons); ECCOSPHERES VF-O manufactured by Emerson & Cuming Company (urea balloons); SARAN MICROSPHERES manufactured by Dow Chemical Company, Expancel manufactured by Japan Fillite Co., Ltd., and Matsumoto Microspheres manufactured by Matsumoto Yushi Seiyaku Co., Ltd. (saran balloons); DYLITE EXPANDABLE POLYSTYRENE manufactured by Arco Polymers Inc., EXPANDABLE POLYSTYRENE BEADS manufactured by BASF-Wyandotte (polystyrene balloon); and SX863(P) manufactured by Japan Synthetic Rubber Co., Ltd (crosslinked styrene-acrylic acid balloon).

The aforementioned balloon may be used alone, or two or more may be used as a mixture. Furthermore, these balloons subjected to a surface treatment with fatty acid, a fatty acid ester, rhodine, resin acid lignin, a silane coupling agent, a titanium coupling agent, an aluminum coupling agent, polypropylene glycol or the like can be also used in order to improve the dispersibility the workability of the blend. These balloons may be used for improving workability such as anti-sagging property before the blend is hardened, and following the hardening, for reduction of the cost by weight saving without deteriorating the flexibility and elongation/strength, as well as, imparting designability such as matting of the surface and sputtering, and the like.

Although the content of the balloon is not particularly limited, it may be used in the scope of preferably 0.1 to 50 parts by weight, and more preferably 0.1 to 30 parts by weight based on 100 parts by weight of the total amount of the vinyl polymer (I) and the vinyl polymer (II). When this amount is less than 0.1 parts, the effect of weight saving may be inferior, while the amount of no less than 50 parts by weight may lead to lowering of the tensile strength among the mechanical properties when this blend is cured. When the balloon has a specific gravity of no less than 0.1, the amount is preferably 3 to 50 parts by weight, and more preferably 5 to 30 parts by weight.

Physical Property Adjustor

To the curable composition of the present invention may be added a physical property adjustor which adjusts the tensile characteristics of the resulting cured product, as needed.

Although the physical property adjustor is not particularly limited, for example, alkylalkoxysilanes such as methyltrimethoxysilane, dimethyldimethoxysilane, trimethylmethoxysilane, and n-propyltrimethoxysilane; alkylisopropenoxysilane such as dimethyldiisopropenoxysilane, methyltriisopropenoxysilane and γ-glycidoxypropylmethyldiisopropenoxysilane, and alkoxysilanes having a functional group such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane, and γ-mercaptopropylmethyldimethoxysilane; silicone varnishes; polysiloxanes and the like. By using the physical property adjustor, the hardness can be increased or decreased in hardening of the composition of the present invention, or the elongation can be elicited. The aforementioned physical property adjustor may be used alone, or two or more thereof may be used in combination.

Silanol-Containing Compound

To the curable composition of the present invention may be added a silanol-containing compound to meet needs such as alteration of the physical property of the cured product. The silanol-containing compound refers to a compound having one silanol group in the molecule, and/or a compound which can generate a compound having one silanol group in the molecule by reacting with moisture. These may be used alone, or both compounds may be concurrently used.

Although the compound having one silanol group in the molecule that is one of the silanol-containing compounds is not particularly limited, illustrative examples include compounds which can be represented by $(R'')_3SiOH$ (wherein, $R''$ represents the same or different substituted or unsubstituted alkyl group or aryl group) such as the following compounds:

$(CH_3)_3SiOH$, $(CH_3CH_2)_3SiOH$, $(CH_3CH_2CH_2)_3SiOH$, $(n\text{-}Bu)_3SiOH$, $(sec\text{-}Bu)_3SiOH$, $(t\text{-}Bu)_3SiOH$, $(t\text{-}Bu)Si(CH_3)_2OH$, $(C_5H_{11})_3SiOH$, $(C_6H_{13})_3SiOH$, $(C_6H_5)_3SiOH$, $(C_6H_5)_2Si(CH_3)OH$, $(C_6H_5)Si(CH_3)_2OH$, $(C_6H_5)_2Si(C_2H_5)OH$, $C_6H_5Si(C_2H_5)_2OH$, $C_6H_5CH_2Si(C_2H_5)_2OH$, $C_{10}H_7Si(CH_3)_2OH$ (wherein, $C_6H_5$ represents a phenyl group, and $C_{10}H_7$ represents a naphthyl group.) and the like, cyclic polysiloxane compounds having a silanol group such as:

[chemical formula 12]

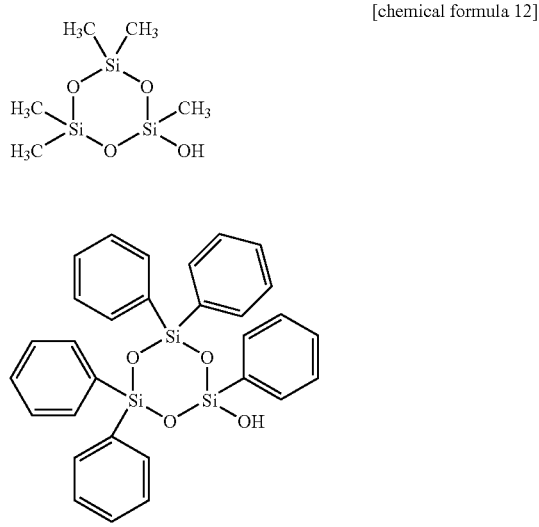

-continued

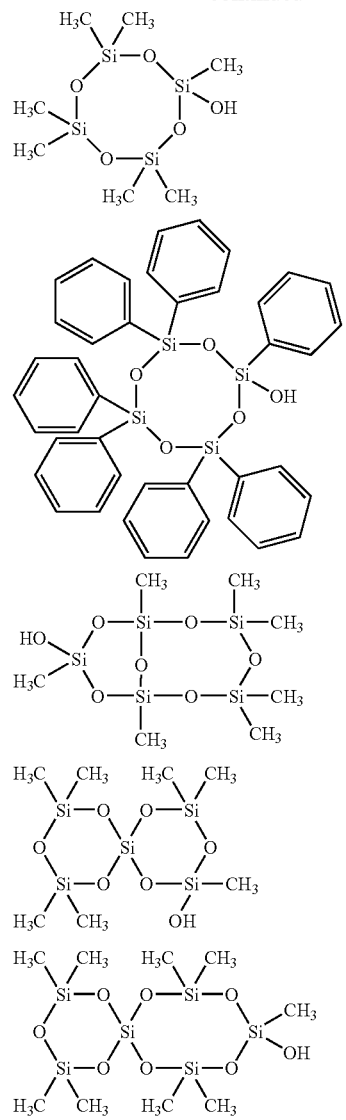

and the like, chain polysiloxane compounds having a silanol group such as:

[chemical formula 13]

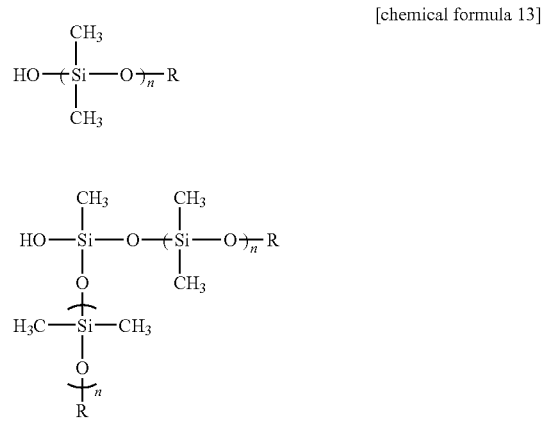

-continued

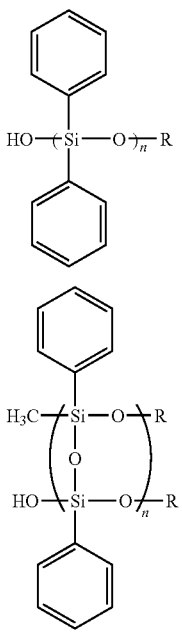
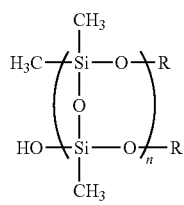
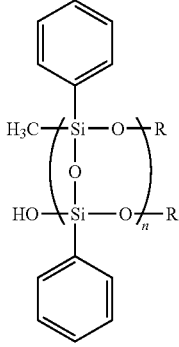

(wherein, R represents a hydrocarbon group having 1 to 10 carbon atoms, and n represents an integer of 1 to 20) and the like, compounds having the main chain composed of silicon and carbon, to which a silanol group is bound at the polymer end such as:

[chemical formula 14]

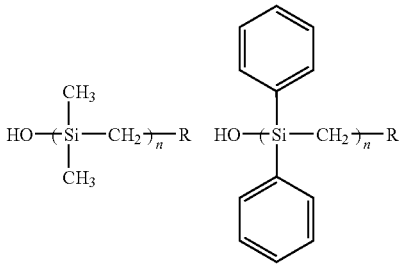

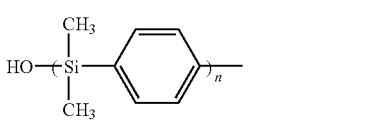

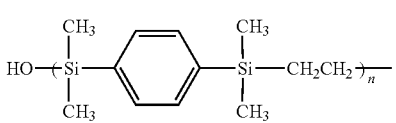

(wherein, R represents a hydrocarbon group having 1 to 10 carbon atoms, and n represents an integer of 1 to 20) and the like, compounds having a silanol group bound to the end of the polysilane main chain such as:

[chemical formula 15]

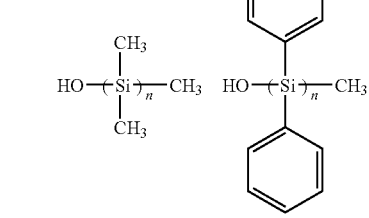

(wherein, R represents a hydrocarbon group having 1 to 10 carbon atoms, and n represents an integer of 1 to 20) and the like, compounds having the main chain composed of silicon, carbon and oxygen, to which a silanol group is bound at the polymer end such as:

[chemical formula 16]

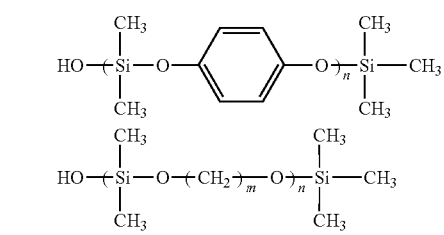

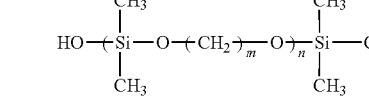

(wherein, n represents an integer of 1 to 20, and m represents an integer of 1 to 20.), and the like. Of these, in light of the availability and the effects which can be achieved, $(CH_3)_3SiOH$ and the like having a smaller molecular weight are preferred.

The compound having one silanol group in the molecule serves in reducing the number of the crosslinking points by reacting with the crosslinkable silyl group of the polymer having a crosslinkable silyl group, or with a siloxane bond produced by crosslinking, thereby imparting flexibility to the cured product, and providing a composition that is favorable in low surface tack and dust adhesion resistance.

In addition, the compound which can generate a compound having one silanol group in the molecule by reacting with moisture, which is one of the components in the present invention, is not particularly limited, but N,O-bis(trimethylsilyflacetamide, N-(trimethylsilyl)acetamide, bis(trimethylsilyl)trifluoroacetamide, N-methyl-N-trimethylsilyltrifluoroacetamide, bistrimethylsilylurea, N-(t-butyldimethylsilyl)N-methyltrifluoroacetamide, (N,N-dimethylamino)trimethylsilane, (N,N-diethylamino) trimethylsilane, hexamethyldisilazane, 1,1,3,3-tetramethyldisilazane, N-(trimethylsilyflimidazole, trimethylsilyltrifluoromethane sulfonate, trimethylsilylphenoxide, trimethylsilylate of n-octanol, trimethylsilylate of 2-ethylhexanol, tris(trimethylsilylate) of glycerin, tris(trimethylsilylate) of trimethylolpropane, tris(trimethylsilylate) of pentaerythritol, tetra(trimethylsilylate) of pentaerythritol, $(CH_3)_3SiNHSi(CH_3)_3$, $(CH_3)_3SiNSi(CH_3)_2$, allyloxytrimethylsilane, N,O-bis(trimethylsilyl)acetamide, N-(trimethylsilyl)acetamide, bis(trimethylsilyl)trifluoroacetamide, N-methyl-N-trimethylsilyltrifluoroacetamide, bistrimethylsilylurea, N-(t-butyldimethylsilyl)N-methyltrifluoroacetamide, (N,N-dimethylamino)trimethylsilane, (N,N-diethylamino)trimethylsilane, hexamethyldisilazane, 1,1,3,3-tetramethyldisilazane, N-(trimethylsilyl)imidazole, trimethylsilyltrifluoromethane sulfonate, trimethylsilylphenoxide, trimethylsilylate of n-octanol, trimethylsilylate of 2-ethylhexanol, tris(trimethylsilylate) of glycerin, tris(trimethylsilylate) of trimethylolpropane, tris(trimethylsilylate) of pentaerythritol, tetra(trimethylsilylate) of pentaerythritol, $(CH_3)_3SiNHSi(CH_3)_3$, $(CH_3)_3SiNSi(CH_3)_2$.

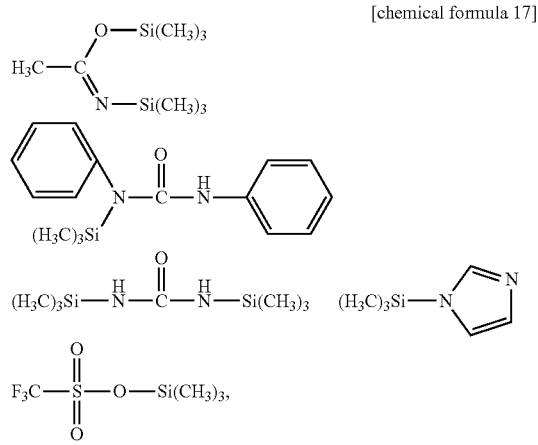

[chemical formula 17]

and the like can be suitably used. However, in light of the amount of the silanol group included in the hydrolysis product, $(CH_3)_3SiNHSi(CH_3)_3$ is particularly preferred.

In addition, the compound which can generate a compound having one silanol group in the molecule by reacting with moisture, which is one of the components of the present invention, is not particularly limited, but in addition to the compounds described above, the compounds represented by the following general formula (32) are preferred.

$$((R^{34})_3SiO)_nR^{35} \quad (32)$$

(wherein, $R^{34}$ is not particularly limited, but may represent the same or different substituted or unsubstituted alkyl group, aryl group or vinyl group, n represents a positive integer, and $R^{35}$ represents a group yielded by removing a part or all active hydrogens from an active hydrogen-containing compound).

$R^{34}$ is preferably a methyl group, an ethyl group, a vinyl group, a t-butyl group, or a phenyl group, and a methyl group is preferred.

As the $(R^{34})_3Si$ group, a trimethylsilyl group in which three $R^{34}$ all represent a methyl group is particularly preferred. Further, n is preferably 1 to 5.

Although the active hydrogen-containing compound from which the $R^{35}$ is derived is not particularly limited, for example, alcohols such as methanol, ethanol, n-butanol, butanol, t-butanol, n-octanol, 2-ethylhexanol, benzyl alcohol, ethylene glycol, diethylene glycol, polyethylene glycol, propylene glycol, dipropylene glycol, polypropylene glycol, propane diol, tetramethylene glycol, polytetramethylene glycol, glycerin, trimethylolpropane and pentaerythritol; phenols such as phenol, cresol, bisphenol A and hydroquinone; carboxylic acids such as formic acid, acetic acid, propionic acid, lauric acid, palmitic acid, stearic acid, behenic acid, acrylic acid, methacrylic acid, oleic acid, linoleic acid, linolenic acid, sorbic acid, oxalic acid, malonic acid, succinic acid, adipic acid, maleic acid, benzoic acid, phthalic acid, terephthalic acid and trimellitic acid; ammonia; amines such as methylamine, dimethylamine, ethylamine, diethylamine, n-butylamine and imidazole; acid amides such as acetamide and benzamide, ureas such as urea and N,N'-diphenyl urea; ketones such as acetone, acetyl acetone and 2,4-heptadione, and the like may be exemplified.

The compound which enables a compound having one silanol group in the molecule to generate by reacting with moisture represented by the above general formula (32) can be obtained by allowing, for example, the aforementioned active hydrogen-containing compound or the like to react with a compound having a $(R^{34})_3Si$ group together with a group that can react with active hydrogen such as a halogen group, also referred to as a silylating agent such as trimethylsilyl chloride or dimethyl(t-butyl)chloride, but not limited thereto (wherein, $R^{34}$ is similar to those as defined above.).

Specifically, illustrative examples of the compound represented by the above general formula (32) include allyloxytrimethylsilane, N,O-bis(trimethylsilyl)acetamide, N-(trimethylsilyl)acetamide, bis(trimethylsilyl)trifluoroacetamide, N-methyl-N-trimethylsilyltrifluoroacetamide, bistrimethylsilylurea, N-(t-butyldimethylsilyl)N-methyltrifluoroacetamide, (N,N-dimethylamino)trimethylsilane, (N,N-diethylamino)trimethylsilane, hexamethyldisilazane, 1,1,3,3-tetramethyldisilazane, N-(trimethylsilyl)imidazole, trimethylsilyltrifluoromethane sulfonate, trimethylsilylphenoxide, trimethylsilylate of n-octanol, trimethylsilylate of 2-ethylhexanol, trimethylsilylate of polyether polyols such as tris(trimethylsilylate) of glycerin, tris(trimethylsilylate) of trimethylolpropane, tris(trimethylsilylate) of pentaerythritol, tetra(trimethylsilylate) of pentaerythritol, trimethylsilylate of polypropylene glycol, and trimethylsilylate of polypropylenetriol, trimethylsilylate of polypropylenetetraol, trimethylsilylate of acryl polyol, and the like, but not limited thereto. These may be used alone, or two or more may be used in combination.

In addition, a compound represented by the general formula $(((R^{36})_3SiO)(R^{37}O)_s)_tZ$ such as $CH_3O(CH_2CH(CH_3)O)_5Si(CH_3)_3$, $CH_2\!=\!CHCH_2(CH_2CH(CH_3)O)_5Si(CH_3)_3$, $(CH_3)_3SiO\,CH_2CH(CH_3)O)_5Si(CH_3)_3$, $(CH_3)_3SiO(CH_2CH(CH_3)O)_7Si(CH_3)_3$ (wherein, $R^{36}$ represents the same or different substituted or unsubstituted monovalent hydrocarbon group or a hydrogen atom; $R^{37}$ represents a bivalent hydrocarbon group having 1 to 8 carbon atoms; s and t represent a positive integer, s is 1 to 6, and s multiplied by t is no less than 5; and Z represents a monovalent to hexavalent organic group) and the like can be suitably used. These may be used alone, or two or more may be used in combination.

Among the compounds which can generate a compound having one silanol group in the molecule by reacting with moisture, the active hydrogen compounds generated following the hydrolysis are preferably phenols, acid amides and alcohols, in terms of not adversely affecting the storage stability, weather resistance and the like, and more preferably such active hydrogen compounds are phenols and alcohols having a hydroxyl group.

Of the compounds presented above, N,O-bis(trimethylsilyl)acetamide, N-(trimethylsilyl)acetamide, trimethylsilylphenoxide, trimethylsilylate of n-octanol, trimethylsilylate of 2-ethylhexanol, tris(trimethylsilylate) of glycerin, tris(trimethylsilylate) of trimethylolpropane, tris(trimethylsilylate) of pentaerythritol, tetra(trimethylsilylate) of pentaerythritol, and the like are preferred.

This compound which can generate a compound having one silanol group in the molecule by reacting with moisture generates a compound having one silanol group in the molecule by reacting with moisture during storage, or during curing or following curing. Thus generated compound having one silanol group in the molecule is presumed to decrease the number of crosslinking points by reacting with the crosslinkable silyl group of the vinyl polymer, or with the siloxane bond generated by crosslinking as described above, thereby imparting flexibility to the cured product.

The silanol-containing compound may be used in combination with the air oxidation-curable substance described later, and the use in combination is preferred since curability and dust adhesion of an alkyd paint applied on the surface can be improved while keeping the modulus of the cured product low.

The amount of the silanol-containing compound added may be adjusted ad libitum depending on the physical properties expected for the cured product. The silanol-containing compound may be added in an amount of preferably 0.1 to 50 parts by weight, more preferably 0.3 to 20 parts by weight, and more preferably 0.5 to 10 parts by weight based on 100 parts by weight of the vinyl polymer (I). When the amount is less than 0.1 parts by weight, the effect of such addition may not be achieved, while the amount exceeding 50 parts by weight may lead to insufficient crosslinking, whereby the strength or the gel fraction of the cured product is likely to be too low.

Moreover, the time for adding the silanol-containing compound is not particularly limited, and it may be added during manufacturing the polymer, or during producing the curable composition.

Thixotropic Agent (Anti-Sagging Agent)

A thixotropic agent (anti-sagging agent) may be added to the curable composition of the present invention as needed in order to prevent sagging and to improve the workability.

The thixotropic agent (anti-sagging agent) is also referred to as "thixotropy-imparting agent". To impart thixotropy means that a property of exhibiting a flow performance during strong force is applied such as in: extruding from the cartridge to give beads shape; coating with a spatula or the like; blowing by spraying or the like, but being capable of preventing sagging during coating or hardening following application to complete curing is provided.

Although the thixotropic agent (anti-sagging agent) is not particularly limited, for example, amide waxes typified by Dispalon (manufactured by Kusumoto Kasei K.K.), hydrogenated castor oil, hydrogenated castor oil derivatives, fatty acid derivatives, metal soaps such as calcium stearate, aluminum stearate, and barium stearate, organic compounds such as 1,3,5-tris(trialkoxysilylalkyl)isocyanurate, calcium carbonate, fine powder silica subjected to a surface treat with a fatty acid or a resin acid, inorganic compounds such as carbon black may be exemplified.

The fine powder silica means a natural or artificial inorganic filler including silicon dioxide as a principal component. Specifically, illustrative examples include kaolin, clay, active white earth, silica sand, quartzite, diatomaceous earth, anhydrous aluminum silicate, hydrous magnesium silicate, talc, perlite, white carbon, mica fine powder, bentonite, organic bentonite, and the like.

Of these, ultrafine particulate anhydrous silica produced by allowing a volatile compound including silicon to react in a gas phase, and organic bentonite are preferred. It is preferred that the specific surface area be at least 50 m$^2$/g, and still 50 to 400 m$^2$/g. Also, any of hydrophilic silica, and hydrophobic silica can be used. Although the surface treatment may or may not be carried out, hydrophobic silica subjected to a hydrophobilizing treatment on the surface with silazane, chlorosilane, alkoxysilane or polysiloxane having only a methyl group as the organic substituent bound to the silicon atom is preferred.

Specifically, illustrative examples of the aforementioned surface treating agent include silazanes such as hexamethyldisilazane; halogenated silanes such as trimethylchlorosilane, dimethyldichlorosilane, and methyltrichlorosilane; alkoxysilanes such as trimethylalkoxysilane, dimethyldialkoxysilane, and methyltrialkoxysilane (wherein, the alkoxy group may be a methoxy group, an ethoxy group, a propoxy group, a butoxy group, or the like); siloxanes such as cyclic or straight polydimethylsiloxane, and the like, which may be used alone, or two or more thereof may be used in combination. Among these, hydrophobic fine powder silica subjected to a surface treatment with a siloxane (dimethyl silicone oil) is preferred in terms of the thixotropy-imparting effect.

Furthermore, when fine powder silica is used in combination with a polyether compounds such as diethylene glycol, triethylene glycol or polyethylene glycol, a reaction product of a polyether compound and functional silane, or a nonionic surfactant having an ethylene oxide chain, thixotropy can be increased. One, or two or more of the nonionic surfactant may be used.

Specific examples of the fine powder silica include commercial products such as e.g., trade name Aerosil R974, R972, R972V, R972CF, R805, R812, R812S, RY200, RX200, RY200S, #130, #200, #300, R202, etc. manufactured by NIPPON AEROSIL CO., LTD., trade name Nipsil SS Series manufactured by Nippon Silica Industries Co., trade name Rheorosil MT-10, MT-30, QS-102 and QS-103 manufactured by Tokuyama Corporation, trade name CAB-O-SIL TS-720, MS-5 and MS-7 manufactured by Cabot Corporation, S-BEN, ORGANITE, etc. manufactured by Hojun Yoko Co, Ltd.

In addition, organic bentonite is a powdery substance produced by finely pulverizing predominantly a montmorillonite ore, and subjected to a surface treatment with any of various types of organic substances. As the organic compound, aliphatic primary amine, aliphatic quaternary amine (these amines all preferably having a carbon atoms of no greater than 20) or the like may be used. Specific examples of the organic bentonite include e.g., trade name Orben D, New D Orben manufactured by Shiraishi Kogyo Kaisha, Ltd., trade name Hardsil manufactured by Tsuchiya Kaolin Industry Co., Ltd., Clay #30 manufactured by Burgess Pigment Company, Clay #33 manufactured by Southern Clay, Inc., "Bentone 34" (dimethyloctadecyl ammonium bentonite) manufactured by National Lead Co., USA and the like.

Moreover, compounds such as amide waxes, hydrogenated castor oils, hydrogenated castor oil derivatives, fatty acid derivatives and the like are also preferred since they are readily available, can thicken the blend appropriately, and can impart the thixotropy at comparatively low costs.

Thixotropy marker herein referred to means an apparent viscosity ratio of a low rotation rate (for example, 0.5 to 12 rpm) and a high rotation rate (for example, 2.5 to 60 rpm), as determined by measurement of the viscosity with a rotatory viscometer. The ratio of the high rotation rate and the low rotation rate is preferably at least 5, and still within the range of 5 to 10.

These thixotropic agents (anti-sagging agents) may be used alone, or two or more thereof may be used in combination.

Air Oxidation-Curable Substance

To the curable composition of the present invention may be also added an air oxidation-curable substance as needed. The air oxidation-curable substance is a compound having an unsaturated group which enables curing through crosslinking by the oxygen in air. By adding this air oxidation-curable substance, tackiness of the surface of the cured product exhibited in hardening the curable composition (also referred to as remnant tack) can be reduced. The air oxidation-curable substance in the present invention can be hardened by bringing into contact with air, and more specifically, has a property to be hardened by a reaction with oxygen in air. Typical air oxidation-curable substance can be hardened by, for example, allowing to stand still in the air in a room for 1 day.

Specific examples of the air oxidation-curable substance include e.g., drying oils such as china wood oil, and linseed oil; various types of alkyd resins obtained by modifying such drying oil; acrylic polymers, epoxy resins, silicone resins, and urethane resins modified with a drying oil; polymers and copolymers of 1,2-polybutadiene, 1,4-polybutadiene, and C5 to C8 diene, as well as various types of modified products of the polymer and the copolymer (maleinated modification products, boiled oil modification products, etc.), and the like. Among these, liquid matters of the china wood oil, and the diene polymer (liquid diene polymers) as well as modification products thereof are particularly preferred.

Specific examples of the liquid diene polymer include liquid polymers obtained by polymerizing or copolymerizing a diene compound such as butadiene, chloroprene, isoprene, or 1,3-pentadiene; polymers such as NBR, SBR and the like obtained by copolymerize the aforementioned diene compound with a copolymerize monomer such as acrylonitrile, or styrene with a ratio to give the diene compound as a principal component; as well as various types of modification product (maleinated modification products, boiled oil modification products, etc.) of the same, and the like. These may be used alone, or two or more may be used in combination. Among these liquid diene compounds, liquid polybutadiene is preferred.

The air oxidation-curable substance may be used alone, or two or more may be used in combination. Furthermore, when a catalyst that accelerates an oxidative curing reaction or a metal dryer is concurrently used in combination with the air oxidation-curable substance, the effect can be enhanced as the case may be. Illustrative examples of (these catalyst and metal dryer include metal salts such as cobalt naphthenate, lead naphthenate, zirconium naphthenate, cobalt octylate, and zirconium octylate, as well as amine compounds, and the like.

The air oxidation-curable substance may be used in combination with the aforementioned photocurable substance, and also may be used in combination with the aforementioned silanol-containing compound. Such combination of 2 components or 3 components is particularly preferred since the effect can be further enhanced, and in particular, a prominent pollution preventive effect may be exhibited even in the case in which long term exposure is obliged, or in the areas of severe conditions accompanied by staining possibility due to a large amount of dust, and fine earth and sand.

The air oxidation-curable substance is preferably added in an amount of 0.01 to 20 parts by weight based on 100 parts by weight of the total amount of the vinyl polymer (I) and the vinyl polymer (II). When the amount is less than 0.01 parts by weight, the effect may be inferior, while the amount exceeding 20 parts by weight may adversely influence on the physical properties.

Antioxidant

To the curable composition of the present invention may be added an antioxidant as needed. Various types of antioxidants have been known, and, for example, a variety of products such as those described in "Antioxidant Handbook" published by TAISEISHA Ltd., "Deterioration and Stabilization of Polymer Materials" (235 to 242) published by CMC Publishing CO., LTD and the like may be included, but not limited thereto. Examples of the antioxidant include thioether ones such as MARK PEP-36, and MARK AO-23 (all in the foregoing, manufactured by Asahi Denka Co., Ltd.), and phosphorus antioxidants such as Irgafos 38, Irgafos 168, and Irgafos P-EPQ (all in the foregoing, manufactured by Ciba Specialty Chemicals Inc.), and the like. Of these, the hindered phenolic compounds as listed below are preferred.

Specifically, illustrative hindered phenolic compounds are as in the following: 2,6-di-tert-butyl-4-methylphenol, 2,6-di-tert-butyl-4-ethylphenol, mono (or di- or tri-)(a-methylbenzyl)phenol, 2,2'-methylenebis(4-ethyl-6-tert-butylphenol), 2,2'-methylenebis(4-methyl-6-tert-butylphenol), 4,4'-butylidenebis(3-methyl-6-tert-butylphenol), 4,4'-thiobis(3-methyl-6-tert-butylphenol), 2,5-di-tert-butylhydroquinone, 2,5-di-tert-amylhydroquinone, triethylene glycol-bis-[3-(3-t-butyl-5-methyl-4-hydroxyphenyl)propionate], 1,6-hexanediol-bis[3-(3,5-di-t-butyl-4-hydroxyphenyl) propionate], 2,4-bis-(n-octylthio)-6-(4-hydroxy-3,5-di-t-butylanilino)-1,3,5-triazine, pentaerythrithyl-tetrakis[3-(3,5-di-t-butyl-4-hydroxyphenyl)propionate], 2,2-thiodiethylenebis[3-(3,5-di-t-butyl-4-hydroxyphenyl) propionate], octadecyl-3-(3,5-di-t-butyl-4-hydroxyphenyl) propionate, N,N'-hexamethylenebis(3,5-di-t-butyl-4-hydroxy-hydrocinnamide), 3,5-di-t-butyl-4-hydroxybenzylphosphonate-diethyl ester, 1,3,5-trimethyl-2,4,6-tris(3,5-di-t-butyl-4-hydroxybenzyl)benzene, bis(3,5-di-t-butyl-4-hydroxybenzylphosphonate ethyl)calcium, tris-(3,5-di-t-butyl-4-hydroxybenzyl)isocyanurate, 2,4-2,4-bis[(Octylthio)methyl]o-cresol, N,N'-bis[3-(3,5-di-t-butyl-4-hydroxyphenyl)propionyl]hydrazine, tris(2,4-di-t-butylphenyl)phosphite, 2-(5-methyl-2-hydroxyphenyl)benzotriazole, 2-[2-hydroxy-3,5-bis(a,a-dimethylbenzyl)phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl)benzotriazole, 2-(2'-hydroxy-5'-t-octylphenyl)-benzotriazole, condensates with methyl-3-[3-t-butyl-5-(2H-benzotriazole-2-yl)-4-hydroxyphenyl] propionate-polyethylene glycol (molecular weight: about 300), hydroxyphenylbenzotriazole derivatives, 2-(3,5-di-t-butyl-4-hydroxybenzyl)-2-n-butylmalonate bis(1,2,2,6,6-pentamethyl-4-piperidyl), 2,4-di-t-butylphenyl-3,5-di-t-butyl-4-hydroxybenzoate, and the like.

Illustrative examples under the trade names include NOCRAC 200, NOCRAC M-17, NOCRAC SP, NOCRAC SP-N, NOCRAC NS-5, NOCRAC NS-6, NOCRAC NS-30, NOCRAC 300, NOCRAC NS-7, and NOCRAC DAH (all in the foregoing, manufactured by Ouchi Shinko Chemical Industry Co., Ltd.), MARK AO-30, MARK AO-40, MARK AO-50, MARK AO-60, MARK AO-616, MARK AO-635, MARK AO-658, MARK AO-80, MARK AO-15, MARK AO-18, MARK 328, and MARK AO-37 (all in the foregoing, manufactured by Asahi Denka Co., Ltd.), IRGANOX-245, IRGANOX-259, IRGANOX-565, IRGANOX-1010, IRGANOX-1024, IRGANOX-1035, IRGANOX-1076, IRGANOX-1081, IRGANOX-1098, IRGANOX-1222, IRGANOX-1330, and IRGANOX-1425WL (all in the foregoing, manufactured by Ciba Specialty Chemicals Inc.), Sumilizer GM, and Sumilizer GA-80 (all in the foregoing, manufactured by Sumitomo Chemical Co., Ltd.), and the like, but not limited thereto.

The antioxidant may be used in combination with the light stabilizer described later, and such use in combination is particularly preferred since the effect is further enhanced, and in particular, heat resistance can be improved. Products of an antioxidant and a light stabilizer mixed beforehand such as TINUVIN C353, TINUVIN B75 (all in the foregoing, manufactured by Ciba Specialty Chemicals Inc.) may be also used.

The amount of the antioxidant used preferably falls within the range of 0.1 to 10 parts by weight based on 100 parts by weight of the total amount of the vinyl polymer (I) and the vinyl polymer (II). When the amount is less than 0.1 parts by weight, the effect of improving the weather resistance may be inferior, while the amount exceeding 10 parts by weight may lead to economical disadvantages since significantly improved effect cannot be achieved.

Light Resistant Stabilizer

To the curable composition of the present invention may be added a light resistant stabilizer as needed in the range not to impair the effect of the present invention. Various types of light resistant stabilizers have been known, and, for example, a variety of products such as those described in "Antioxidant Handbook" published by TAISEISHA Ltd., "Deterioration and Stabilization of Polymer Materials" (235 to 242) published by CMC Publishing CO., LTD and the like may be included. As the light resistant stabilizer, although not limited thereto, ultraviolet ray absorbing agents and hindered amine light stabilizer compounds are preferred. Specifically, illustrative examples include benzotriazole compounds such as TINUVIN P, TINUVIN 234, TINUVIN 320, TINUVIN 326, TINUVIN 327, TINUVIN 329, and TINUVIN 213 (all in the foregoing, manufactured by Ciba Specialty Chemicals Inc.), triazine compounds such as TINUVIN 1577, benzophenone compounds such as CHIMASSORB 81, benzoate compounds such as TINUVIN 120 (manufactured by Ciba Specialty Chemicals Inc.), and the like.

Moreover, hindered amine compounds are also preferred, and examples of such compounds are listed below. Succinate dimethyl-1-(2-hydroxyethyl)-4-hydroxy-2,2,6,6-tetramethylpiperidine polycondensates, poly[{6-(1,1,3,3-tetramethylbutyl)amino-1,3,5-triazine-2,4-diyl}{(2,2,6,6-tetramethyl-4-piperidyl)imino}], N,N'-bis(3-aminopropyl)ethylenediamine-2,4-bis[N-butyl-N-(1,2,2,6,6-pentamethyl-4-piperidyl)amino]-6-chloro-1,3,5-triazinecondensate, bis(2,2,6,6-tetramethyl-4-piperidyl) sebacate, succinate-bis(2,2,6,6-tetramethyl-4-piperidinyl)esters and the like.

Illustrative examples under the trade names include TINUVIN 622LD, TINUVIN 144, CHIMASSORB 944LD, CHIMASSORB 119FL, and Irgafos 168, (all in the foregoing, manufactured by Ciba Specialty Chemicals Inc.), MARK LA-52, MARK LA-57, MARK LA-62, MARK LA-67, MARK LA-63, MARK LA-68, MARK LA-82, MARK LA-87, (all in the foregoing, manufactured by Asahi Denka Co., Ltd.), Sanol LS-770, Sanol LS-765, Sanol LS-292, Sanol LS-2626, Sanol LS-1114, Sanol LS-744, Sanol LS-440 (all in the foregoing, manufactured by Sankyo Co., Ltd.) and the like, but not limited thereto.

The light resistant stabilizer may be used in combination with the antioxidant described above, and such use in combination is particularly preferred since the effect is further enhanced, and in particular, weather resistance can be improved. Although the combination is not particularly limited, combinations of the aforementioned hindered phenolic antioxidant with, for example, a benzotriazole ultraviolet ray absorbing agent, the aforementioned hindered phenolic antioxidant with a hindered amine light stabilizer compound are preferred. Alternatively, combinations of the aforementioned hindered phenolic antioxidant with, for example, a benzotriazole ultraviolet ray absorbing agent and a hindered amine light stabilizer compound are preferred. Products of a light stabilizer and an antioxidant mixed beforehand such as TINUVIN C353, TINUVIN B75 (all in the foregoing, manufactured by Ciba Specialty Chemicals Inc.) may be also used.

The hindered amine light stabilizer may be used in combination with the aforementioned photocurable substance, and such use in combination is particularly preferred since the effect is further enhanced, and in particular, weather resistance can be improved. Although the combination is not particularly limited, in this case, a tertiary amine-containing hindered amine light stabilizer is preferred since elevation of the viscosity during storage is suppressed, and favorable storage stability is achieved.

The amount of the light stabilizer used preferably falls within the range of 0.1 to 10 parts by weight based on 100 parts by weight of the total amount of the vinyl polymer (I) and the vinyl polymer (II). When the amount is less than 0.1 parts by weight, the effect of improving the weather resistance may be inferior, while the amount exceeding 10 parts by weight may lead to economical disadvantages since significantly improved effect cannot be achieved.

It should be noted that the light stabilizer must be used carefully since curing of the vinyl polymer (II) having a photo-crosslinkable group may be inhibited depending on the type and amount of addition.

Other Additives

To the curable composition of the present invention may be added various types of additives for the purpose of adjusting various physical properties of the curable composition or cured product as needed. Examples of such an additive include e.g., a fire retardant, a curability adjustor, a metal inactivator, an ozone antidegradant, a phosphorus peroxide decomposer, a lubricant, a pigment, a foaming agent, and the like. These various types of additives may be used alone, or two or more may be used in combination.

Specific examples of the additive are disclosed in, for example, each specification of JP-B-04-69659, JP-B-07-108928, JP-A-63-254149, JP-A-64-22904, and the like.

The curable composition of the present invention can be used in a substantially solvent free system. Although a solvent may be used in light of the workability and the like, to avoid use of a solvent is desired taking into consideration the influences on the environment.

All the components to be blended may be compounded, packed and air-tightly sealed beforehand, whereby the curable composition can be produced as one pack type. Alternatively, a two-pack type can be also prepared that is composed of "liquid A" which contains the materials excluding only the initiator and the curing catalyst, and "liquid B" prepared by mixing an initiator and a curing catalyst with a filler, a plasticizer, a solvent and the like, which liquids to be mixed immediately before the molding.

Also in the case in which the curable composition of the present invention was prepared in the two-pack type, the resulting cured product exhibits favorable heat resistance, oil resistance, and weather resistance, similarly to the single component system.

Curing Method of Vinyl Polymer (II)

Although the method for curing the vinyl polymer of the present invention (II) is not particularly limited, when a photopolymerization initiator is used, curing can be effected by irradiating a light or an electron ray from an active energy radiation source. Although the active energy radiation source is not particularly limited, for example, a high pressure mercury lamp, a low pressure mercury lamp, an electronic beam irradiation apparatus, a halogen lamp, a light emitting diode, a semiconductor laser, a metal halide and the like may be exemplified to meet the properties of the photopolymerization initiator employed. In addition, the curing temperature is preferably 0° C. to 150° C., and more preferably 5° C. to 120° C.

Applications

Although not being limited, the curable composition of the invention is usable for various applications such as: sealants for buildings and constructions and for industry such as elastic sealants for buildings and constructions, sealants for siding boards, sealants for insulating glass, sealants for self-cleansing glass and self-cleansing polycarbonate and for self-cleansing tiles, and sealants for vehicles; materials for electric and electronic parts such as sealants for rear faces of solar cells; resist applications such as permanent resist applications, solder resist applications, dry film resist applications, and electrodeposition resist applications; insulating materials such as insulating coating materials for electric wires and cables; agglutinants, adhesives, elastic adhesives, contact adhesives, adhesives for tiles, reactive hot melt adhesives, paints, powdery paints, coating materials, sealants for foams and can lids, radiation sheets, electric and electronic potting agents; films, gaskets, marine deck caukings, casting materials, various kinds of molding materials, artificial marbles, rustproof and waterproof sealants for end faces (cut sections) of net glass or laminated glass; vibration isolating, damping, soundproofing, quake absorbing materials for use in automobiles, marine vessels, household electric appliances, etc.; liquid sealants and waterproofing agents for use in automobile parts, electric parts, and various types of mechanical parts, and the like.

Furthermore, the molded product showing rubber elasticity and obtained from the curable composition of the invention can be used widely and mainly for gaskets and packing. For example, in an automobile field, for vehicle body parts, it can be used for seal materials for keeping air-tightness, vibration-absorption materials for glass, vibration-absorption materials for vehicle body parts, and especially for window seal gaskets and gaskets for door glass. For chassis parts, it can be used as engine and suspension rubber for vibration absorption/noise reduction, particularly for engine mounting rubber. For engine parts, it can be used for hoses for cooling, fuel supply, exhaust control or the like, sealing materials for engine oil, and the like. Further, it can be used for parts of exhaust gas-cleaning apparatus and brake parts. In a household electrical appliance field, it can be used for packing, O-rings, belts and the like. More particularly, it can be used ornaments, water-proof packing, vibration-absorption rubber and anti-insect packing for lighting and illuminating appliances, vibration absorption/noise reduction/air seal materials for cleaners, dripping covers, water-proof packing, heater packing, electrode part packing and safety valve diaphragms for electric water heating apparatus, hoses, water-proof packing and electromagnetic valves for sake-heating apparatus, water-proof packing, water supply tank-packing, water-absorbing valves, water-receiving packing, connection hose, belts, heat-insulating heater-packing, steam outlet-sealants and the like for steam oven microwave and jar-type rice cookers, oil packing, O-rings, drain packing, pressure tubes, air blow-tubes, air suction-/blow-packing, vibration-absorption rubber, oil supply port-packing, oil meter-packing, oil sending-pipes, diaphragm valves, gas tubes and the like for combustion apparatuses, speaker gaskets, speaker edge, turn table sheets, belts, pulleys and the like for acoustic appliances, and the like. In a building and construction field, it can be used for gaskets for structures (zipper gaskets), pneumatic-structure roofings, water-proof materials, shaped sealants, vibration-absorption materials, noise-reduction materials, setting blocks, slide member and the like. In a sporting field, it can be used for all-weather paving materials, gymnasium floor materials and the like sport floor applications, shoe bottom materials, bottom inserts and the like sport shoes applications, golf balls and the like balls for ball games applications, and the like. In a field of vibration-absorption rubber, it can be used for vibration-absorption rubber for automobiles, vibration-absorption rubber for railway cars, vibration-absorption rubber for aircrafts, fenders and the like. In a marine and civil engineering field, it can be used for construction materials such as rubber expansive joints, journals, water-stopping plates, water-proof sheets, rubber dams, elastic paving materials, vibration-absorption pads, and protectors; for sub-materials for working such as rubber frames, rubber packers, rubber skirts, sponge mats, mortar hoses, and mortar strainers; for auxiliary materials for working such as rubber sheets and air hoses; for safety products such as rubber buoyant and wave-absorbing materials; for environment preservation products such as oil fences, silt fences, anti-pollution materials, marine hoses, dredging hoses, and oil skimmers; and the like. In addition, it can also be used for rubber plates, mats, foam plates and the like.

Among all, the curable composition of the present invention is useful as cohesive/adhesive compositions, and particularly useful as sealants, adhesives, agglutinants, potting agents and coating agents. Further, the curable composition of the present invention is also useful in applications that require weather resistance or heat resistance, and applications that require transparency. In addition, since the curable composition of the present invention is superior in weather resistance and adhesiveness, it can be used in fixing of tiles of outer walls by adhesion without joint filling. Moreover, it is also useful in adhesion of materials having different coefficients of linear expansion, applications of elastic adhesives for use in adhering members subject to repeated displacement that results from a heat cycle, applications as coating agents in applications taking advantage of transparency with the substrate being visible, adhesive applications for use in pasting transparent materials such as glass, polycarbonate and methacryl resin, and the like. In addition, taking advantage of its favorable heat resistance and oil resistance, it can be also used suitably as a liquid sealant for use in applications for formed in place gaskets, also referred to as FIPG, as well as, liquid sealants for use in generally, automobile parts, electric parts, and various kinds of mechanical parts.

EXAMPLES

Hereinafter, specific Example of the present invention will be explained with reference to Comparative Examples, but the present invention is not limited to the following Examples.

In the following Synthesis Examples, Examples and Comparative Examples, "parts" and "%" represent "parts by weight" and "% by weight" respectively.

Synthesis Examples of the polymer according to the present invention are shown below.

In the following Synthesis Examples, "number average molecular weight" and "molecular weight distribution (ratio of weight average molecular weight and number average molecular weight)" were determined by a standard polystyrene conversion process using gel permeation chromatography (GPC). In this process, the GPC column employed was packed with polystyrene crosslinked gel (Shodex GPC K-804; manufactured by Showa Denko K.K.), and chloroform was used as the GPC solvent.

Synthesis Example of Poly(n-butyl acrylate)
Polymer Having Crosslinkable Silyl Group Synthesis Example 1

Oxygen in a stainless reaction vessel equipped with a stirrer was eliminated, and cuprous bromide and a part of entire butyl acrylate (initial charge monomer) were charged thereto, followed by heating with stirring. Acetonitrile, and diethyl 2,5-dibromoadipate as an initiator were added and mixed. When the temperature of the mixture was adjusted to about 80° C., pentamethyldiethylenetriamine (hereinafter, may be abbreviated as triamine) was added thereto, whereby a polymerization reaction was started. The residual butyl acrylate was sequentially added to allow the polymerization reaction to proceed. During the polymerization, triamine was added appropriately to regulate the polymerization rate. As the polymerization proceeds, the internal temperature is elevated due to the heat of polymerization. Therefore, the polymerization was allowed to proceed while adjusting the internal temperature to be about 80° C. to about 90° C. When the monomer conversion rate (polymerization reaction rate) reached to no less than about 95%, the volatile matter content was removed by devolatilization under reduced pressure to give a polymer concentrate.

Materials used: initiator: 3.51 kg, n-butyl acrylate (deoxygenated): 100 kg, initial charge monomer: 40 kg, additional monomer: 60 kg, CuBr: 0.84 kg, triamine (total amount): 0.15 kg, and acetonitrile: 8.79 kg To the aforementioned concentrate were added 1,7-octadiene (hereinafter, abbreviated as diene or octadiene) and acetonitrile, and further added triamine. The mixture was heated with stirring while adjusting the internal temperature to be about 80° C. to about 90° C., whereby octadiene was allowed to react at the polymer end. Acetonitrile and unreacted octadiene were removed by devolatilization under reduced pressure to give a concentrate that contains a polymer having an alkenyl group at the end.

Materials used: acetonitrile: 35 kg, octadiene: 21 kg, and triamine: 0.68 kg

Thus resulting concentrate was diluted with toluene, and thereto were added a filtration aid, an adsorbing agent (Kyowaad® 700SEN: manufactured by Kyowa Chemical Industry Co., Ltd.), and hydrotalcite (Kyowaad® 500SH: manufactured by Kyowa Chemical Industry Co., Ltd.)). After the mixture was heated with stirring at approximately 80 to 100° C., the solid content was filtered off. The filtrate was concentrated to give a crude polymer product.

A heat stabilizer (Sumilizer GS: manufactured by Sumitomo Chemical Co., Ltd.), and adsorbing agents (Kyowaad® 700SEN, Kyowaad® 500SH) were added to the crude polymer product, and subjected to devolatilization under reduced pressure. The mixture was heated with stirring to elevate the temperature, and then heated with stirring while keeping a high temperature of about 170° C. to about 200° C. for several hours, followed by devolatilization under reduced pressure. The adsorbing agents (Kyowaad® 700SEN, Kyowaad® 500SH) were added thereto, and about 10 parts by weight of toluene based on the polymer was added. Furthermore, the mixture was heated with stirring at a high temperature of about 170° C. to about 200° C. for additional several hours.

Moreover, the treatment liquid was diluted with toluene, and the adsorbing agent was filtered off. The filtrate was concentrated to give a polymer having an alkenyl group at both ends.

The polymer having an alkenyl group obtained by the aforementioned process, dimethoxymethylsilane (hereinafter, referred to as DMS: 2.0 molar equivalent of the alkenyl group), methyl orthoformate (1.0 molar equivalent of the alkenyl group), a platinum catalyst (isopropanol solution of a bis(1,3-divinyl-1,1,3,3-tetramethyldisiloxane)platinum complex catalyst: hereinafter, referred to as platinum catalyst, 10 mg platinum per 1 kg of the polymer) were mixed, and the mixture was heated with stirring in a nitrogen atmosphere at 100° C. After heating with stirring for about 1 hour, volatile matter content such as unreacted DMS was distilled off under reduced pressure, whereby a poly(n-butyl acrylate) polymer [P1] having a dimethoxysilyl group at both ends was obtained. Thus resulting polymer[P1] had a number average molecular weight of about 14,000, with a molecular weight distribution of 1.3. The average number of the silyl groups introduced per polymer molecule as determined by $^1$H-NMR spectrometry was about 1.8.

Synthesis Example of Poly(n-butyl acrylate) Polymer Having Photo-Crosslinkable Group Synthesis Example 2

Oxygen in a stainless reaction vessel equipped with a stirrer was eliminated, and cuprous bromide and a part of entire butyl acrylate (initial charge monomer) were charged thereto, followed by heating with stirring. Acetonitrile, and diethyl 2,5-dibromoadipate as an initiator were added and mixed. When the temperature of the mixture was adjusted to about 80° C., pentamethyldiethylenetriamine (hereinafter, may be abbreviated as triamine) was added thereto, whereby a polymerization reaction was started. The residual butyl acrylate was sequentially added to allow the polymerization reaction to proceed. During the polymerization, triamine was added appropriately to regulate the polymerization rate. As the polymerization proceeds, the internal temperature is elevated due to the heat of polymerization. Therefore, the polymerization was allowed to proceed while adjusting the internal temperature to be about 80° C. to about 90° C.

Materials used: initiator: 1.76 kg, n-butyl acrylate (deoxygenated): 100 kg, initial charge monomer: 20 kg, additional monomer: 80 kg, CuBr: 0.84 kg, triamine (total amount): 0.14 kg, acetonitrile: 8.79 kg When the monomer conversion rate (polymerization reaction rate) reached no less than about 95%, a mixed gas of oxygen-nitrogen was introduced into the gas phase part of the reaction vessel. The reaction mixture was heated with stirring while keeping the internal temperature to be about 80° C. to about 90° C. for several hours, the polymerization catalyst in the reaction mixture was brought into contact with oxygen. Acetonitrile and unreacted monomer were removed by devolatilization under reduced pressure to give a concentrate that contains a polymer. The concentrate was significantly colored.

This concentrate was diluted with about 100 to 150 parts by weight of toluene, and thereto were added a filtration aid, and adsorbing agents (Kyowaad® 700SEN, Kyowaad® 500SH). After a mixed gas of oxygen-nitrogen was introduced into the gas phase part of the reaction vessel, the mixture was heated with stirring at about 80° C. for several hours. The insoluble catalyst component was removed by filtration. The filtrate exhibited coloring and some turbidity due to the residue of the polymerization catalyst.

The filtrate was charged in a stainless reaction vessel equipped with a stirrer, and adsorbing agents (Kyowaad® 700SEN, Kyowaad® 500SH) were added thereto. After a mixed gas of oxygen-nitrogen was introduced into the gas phase part and heated with stirring at about 100° C. for several hours, the insoluble components of the adsorbing agent and the like were removed by filtration. The filtrate was an almost colorless and transparent clear liquid. The filtrate was concentrated to give an almost colorless and transparent polymer.

The polymer obtained by the aforementioned process was dissolved in about 100 parts by weight of N,N-dimethyl acetamide (DMAC) based on the weight of the polymer, and thereto were added potassium acrylate (about 2 molar equivalent of Br groups at the end), a heat stabilizer (H-TEMPO: 4-hydroxy-2,2,6,6-tetramethylpiperidine-n-oxyl), and an adsorbing agent (Kyowaad® 700SEN), followed by heating with stirring at about 70° C. for several hours. DMAC was distilled off under reduced pressure, and the polymer concentrate was diluted with about 100 parts by weight of toluene based on the polymer. The filtration aid was added, and the solid content was filtered off. The filtrate was concentrated to give a poly(n-butyl acrylate) polymer [P2] having an acryloyl group at both ends. Thus resulting polymer [P2] had a number average molecular weight of about 23,000, with a molecular weight distribution of 1.3. The average number of the acryloyl groups introduced per polymer molecule as determined by $^1$H-NMR spectrometry was about 1.9.

Examples 1 to 5 and Comparatives Examples 1 to 2

Curable compositions were prepared by mixing according to the blend composition shown in Table 1: polymers obtained in the aforementioned Synthesis Example 1 and Synthesis Example 2 [polymers P1 and P2], DAROCURE 1173 (2-hydroxy-2-methyl-1-phenyl-1-propane-1-one (manufactured by Ciba Specialty Chemicals Inc.) as a photoradical initiator, IRGACURE819 (bis(2,4,6-trimethyl benzoyl(manufactured by Ciba Specialty Chemicals Inc.), and further #918 as a curing catalyst of the polymer P1 (quadrivalent tin catalyst: reaction product of dibutyltin oxide and dioctyl phthalate manufactured by Sankyo Organic Chemicals Co., Ltd.) with stirring sufficiently by hand. After this curable composition was applied to give a sheet form having a thickness of about 2 mm, irradiation was carried out using an UV irradiation apparatus (Light Hammer 6: manufactured by Fusion UV systems Japan KK) at a integral luminous energy of 3,000 mJ/cm². Thus, curability achieved by UV irradiation was evaluated. The results are shown in Table 1 altogether.

ing of the composition when only the UV irradiation was carried out.

Furthermore, the cured products obtained in Examples 3 to 5 and Comparative Examples 1 to 2 by UV irradiation were aged for curing at room temperature (23° C.×55% R.H.) for 3 days, and at 50° C. for 4 days. Dumbbell No. 3 test pieces as provided for in JIS K 7113 were punched out of the cured products after aging, respectively, and subjected to a tensile test (using Autograph manufactured by Shimadzu Corporation, measurement temperature: 23° C., pulling rate: 200 mm/sec), whereby mechanical physical properties were evaluated. The results are shown in Table 2.

TABLE 2

| | Mechanical physical properties | | | |
|---|---|---|---|---|
| | M30 (MPa) | M50 (MPa) | Tb (MPa) | Eb (%) |
| Example 3 | 0.08 | 0.12 | 0.19 | 92 |
| Example 4 | 0.07 | 0.10 | 0.23 | 116 |
| Example 5 | 0.08 | 0.13 | 0.21 | 84 |
| Compar. Example 1 | 0.13 | 0.20 | 0.24 | 59 |
| Compar. Example 2 | 0.12 | 0.19 | 0.25 | 74 |

As shown in Table 2, the cured products of the curable compositions each including only the polymer P1 or P2 (Comparative Examples 1-2) exhibited approximate modulus values (M30 and 50), and elongation did not differ greatly. Thus, cured products having approximate physical properties were obtained. To the contrary, the cured products of the curable compositions each including the polymers P1 and P2 (Examples 3-5) exhibited lower modulus and increased elongation (Eb value), suggesting improved mechanical physical properties, as compared with the cured products of the cur-

TABLE 1

| Blend composition (parts added) | Polymer | | P2 proportion based on total amount of polymer | Curing catalyst | | | Curability after UV irradiation |
|---|---|---|---|---|---|---|---|
| | P1 | P2 | | #918 | DAROCURE 1173 | IRGACURE 819 | |
| Example 1 | 20 | 180 | 90% | 0.2 | 0.04 | 0.02 | A |
| Example 2 | 40 | 160 | 80% | 0.4 | 0.08 | 0.04 | A |
| Example 3 | 60 | 140 | 70% | 0.6 | 0.12 | 0.06 | A |
| Example 4 | 100 | 100 | 50% | 1.0 | 0.2 | 0.1 | A |
| Example 5 | 140 | 60 | 30% | 1.4 | 0.28 | 0.14 | B |
| Compar. Example 1 | 200 | — | 0% | 2.0 | 0.40 | 0.20 | C |
| Compar. Example 2 | — | 200 | 100% | — | — | — | A |

Curability;
A: the curable composition not being flown even when inclined
B: the curable composition not being flown even when inclined but being significantly tacky
C: the curable composition being flown when inclined When the vinyl polymer having a photo-crosslinkable group is present accounting for no less than 20% of the total amount of the vinyl polymer having a photo-crosslinkable group and the vinyl polymer having a crosslinkable silyl group, favorable curability with no flowing of the composition was exhibited although UV was irradiated for a short time, suggesting to have rapid curability. To the contrary, the curable composition including the vinyl polymer having a crosslinkable silyl group alone, without including the vinyl polymer having a photo-crosslinkable group resulted in flowable compositions each including only the same polymer P1 or P2 (Comparative Examples 1-2). It is revealed that the cured products of the curable composition composed of the vinyl polymer (II) having a photo-crosslinkable group and the vinyl polymer (I) having a crosslinkable silyl group achieve the effect of providing favorable mechanical physical properties, specifically low modulus and great elongation, as compared with each of the cured products of the curable composition composed of the vinyl polymer (II) having a photo-crosslinkable group, and the curable composition composed of the vinyl polymer (I) having a crosslinkable silyl group.

Example 6

The curable composition similar to that of Example 4 was prepared, and applied to give a sheet form. Thereafter, aging was allowed without irradiating light, i.e., while shielding the light, at room temperature (23° C.×55% R.H.) for 3 days, and further at 50° C. for 4 days. Consequently, a substantive cured product could be obtained without flowing of the curable composition and stickiness of the surface.

Accordingly, it is revealed that the curable composition composed of the vinyl polymer (II) having a photo-crosslinkable group and vinyl polymer (I) having a crosslinkable silyl group of the present invention yields a favorable cured product in not only the area where the light reaches by the UV irradiation but also the area where the light does not reach, without flowing of the composition. Therefore, from the results according to the Examples 1 to 6 and Comparative Examples 1 to 2, it is suggested that the curable composition of the present invention achieves hardening which results from rapid curability in the area where the light reaches, and also achieves hardening in the unirradiated areas (area where the light does not reach), not remain unhardened. Furthermore, the curable composition of the present invention can provide a cured product having more favorable mechanical physical properties as compared with the curable compositions including the vinyl polymer (I) or the vinyl polymer (II) alone.

Examples 7 to 8 and Comparative Example 3

The curable compositions were prepared similarly to the Examples 1 to 5 and Comparative Examples 1 to 2 except that the blend composition was changed as shown in Table 3, and the cured products (sheet-form having a thickness of about 2 mm) were produced. Thus resulting cured products were evaluated on the tensile physical properties as follows. After applying to give a sheet form having a thickness of about 2 mm, UV irradiation was carried out. Dumbbell No. 2(1/3) test pieces as provided for in JIS K 7113 were punched out of thus obtained cured product, and the cured products after further subjecting to additional aging for curing at room temperature (hereinafter, referred to as "room temperature aging") and at 50° C., respectively, and subjected to a tensile test (using Autograph manufactured by Shimadzu Corporation, measurement temperature: 23° C., pulling rate: 200 mm/sec), whereby mechanical physical properties were evaluated. Since it was presumed that the hardening would proceed due to the moisture in the cured product following the UV irradiation, the measurement was performed as soon as possible.

As the curing catalyst of the vinyl polymer (I) having a crosslinkable silyl group, DBTDL (dibutyltin dilaurate; STANN BL manufactured by Sankyo Organic Chemicals Co., Ltd.) was used in addition to #918.

The results are shown in Table 4.

TABLE 4

| Blend composition | Tensile physical properties (after irradiating light) | | | Tensile physical properties (after aging at room temperature) | | |
|---|---|---|---|---|---|---|
| (parts added) | M 50 (MPa) | Tb (MPa) | Eb (%) | M 50 (MPa) | Tb (MPa) | Eb (%) |
| Example 7 | 0.02 | 0.12 | 350 | 0.05 | 0.19 | 190 |
| Example 8 | 0.03 | 0.21 | 350 | 0.06 | 0.30 | 220 |
| Compar. Example 3 | Not hardened | | | 0.09 | 0.23 | 140 |

The curable composition (Comparative Example 3) which does not include the vinyl polymer having a photo-crosslinkable group (P2) but includes only the vinyl polymer having a crosslinkable silyl group (P1) was not cured by merely irradiating the light. However, the curable compositions (Examples 6-7) composed of the vinyl polymer having a photo-crosslinkable group (P2) and the vinyl polymer having a crosslinkable silyl group (P1) yielded satisfactorily cured products by irradiating light, and the strength could be even more enhanced by additionally subjecting to the room temperature aging. This is suggested by decrease of the modulus and greater elongation as is clear from the comparison with the cured products obtained by aging in Comparative Example 3.

Moreover, the test pieces of these cured products were subjected to heat aging at 150° C., and the mechanical physical properties were measured 72 hrs later in a similar manner to the tensile test described above, whereby the heat resistance was evaluated. The results are shown in Table 5, respectively.

TABLE 5

| Blend composition | Tensile physical properties (after aging at room temperature) | | | Tensile physical properties (after heating at 150° C.) | | |
|---|---|---|---|---|---|---|
| (parts added) | M50 (MPa) | Tb (MPa) | Eb (%) | M50 (MPa) | Tb (MPa) | Eb (%) |
| Example 7 | 0.05 | 0.19 | 190 | 0.05 | 0.17 | 180 |
| Example 8 | 0.06 | 0.30 | 220 | 0.05 | 0.18 | 180 |

Even after heating at 150° C. for 72 hrs, the curable composition composed of the vinyl polymer having a photo-crosslinkable group (P2) and the vinyl polymer having a crosslinkable silyl group (P1) exhibited the elongation at break and the strength almost equivalent to those after initial room temperature aging. Accordingly, excellent heat resistance of the curable composition of the present invention was proven.

TABLE 3

| Blend composition | Polymer | | | Curing catalyst | | | |
|---|---|---|---|---|---|---|---|
| (parts added) | P1 | P2 | S 203H | DBTDL | #918 | DAROCURE 1173 | IRGACURE 819 |
| Example 7 | 100 | 100 | | | 1 | 0.15 | 0.3 |
| Example 8 | 100 | 100 | | 1 | | 0.15 | 0.3 |
| Compar. Example 3 | 200 | | | 1 | | 0.15 | 0.3 |

Examples 9 to 11 and Comparative Examples 4 to 5

The curable compositions were prepared similarly to the Examples 1 to 5 and Comparative Examples 1 to 2 except that the blend composition was changed as shown in Table 6. Thus resulting curable composition was coated on an adherend, which had been defatted with ethanol, of a polycarbonate resin or an acrylic resin having a thickness of 3 mm according to JIS K 6850 to give a thickness of about 100 μm, whereby a sample for tensile shearing was produced. Similarly to Examples 1 to 5 and Comparative Examples 1 to 2 described above, this sample for tensile shearing was subjected to UV irradiation, and further subjected to aging for hardening at room temperature and at 50° C. In addition, A-1120 (γ-(2-aminoethyl)aminopropyltrimethoxysilane) manufactured by Nippon Unicar Company Limited was used as the adhesion promoter.

off when the test piece was held by hand. Moreover, the adhesion strength could be even more enhanced by additionally subjecting the test piece to the room temperature aging. Furthermore, although the adhesion promoter was not added, the curable compositions of Examples 9-10 could lead to more potent adhesion strength on both the polycarbonate resin and the acrylic resin as compared with the cured product of the curable composition (Comparative Example 5) which includes the vinyl polymer having a crosslinkable silyl group (P1) alone as the curable component and to which the adhesion promoter was added. Further, the cured product of the curable composition (Example 11) to which the adhesion promoter was added exhibited still enhanced adhesion strength. Therefore, it was ascertained that the curable composition of the present invention leads to further enhanced adhesion strength than the composition of a single polymer system.

TABLE 6

| Blend composition | Polymer | | Adhesion promoter | Curing catalyst | | |
|---|---|---|---|---|---|---|
| (parts added) | P1 | P2 | A-1120 | DBTDL | #918 | DAROCURE 1173 | IRGACURE 819 |
| Example 9 | 100 | 100 | | 1 | | 0.15 | 0.3 |
| Example 10 | 100 | 100 | | | 1 | 0.15 | 0.3 |
| Example 11 | 100 | 100 | 2 | | 1 | 0.15 | 0.3 |
| Compar. Example 4 | 200 | | | | 1 | 0.15 | 0.3 |
| Compar. Example 5 | 200 | | 2 | | 1 | 0.15 | 0.3 |

The samples for tensile shearing obtained as described above were subjected to a tensile test (using Autograph manufactured by Shimadzu Corporation, measurement temperature: 23° C., pulling rate: 50 mm/sec). The results are shown in Table 7, respectively.

TABLE 7

| Blend composition (parts added) | Tensile physical properties (after irradiating light) Adherend | | Tensile physical properties (after aging at room temperature) Adherend | |
|---|---|---|---|---|
| | Polycarbonate resin | Acrylic resin | Polycarbonate resin | Acrylic resin |
| Example 9 | 0.9 | 4.8 | 51.5 | 47.6 |
| Example 10 | 1.2 | 7.3 | 51.5 | 36.1 |
| Example 11 | 4.4 | 12.8 | 57.7 | 48.0 |
| Compar. Example 4 | — | — | 37.8 | 16.8 |
| Compar. Example 5 | 0.3 | 0.3 | 51.3 | 38.3 |

By merely irradiating the light, the curable composition (Comparative Example 4) which does not include the vinyl polymer having a photo-crosslinkable group (P2) but includes only the vinyl polymer having a crosslinkable silyl group (P1) achieved insufficient curing, and thus slipped off when the test piece was held by hand. However, the curable compositions (Examples 9-11) composed of the vinyl polymer having a photo-crosslinkable group (P2) and the vinyl polymer having a crosslinkable silyl group (P1) yielded satisfactorily cured products by irradiating light, and did not slip

The invention claimed is:

1. A curable composition comprising a vinyl polymer (I) having at least one crosslinkable functional group on average represented by the following general formula (1):

$$-[Si(R^1)_{2-b}(Y)_bO]_m-Si(R^2)_{3-a}(Y)_a \quad (1)$$

wherein, $R^1$ and $R^2$ are the same or different, and represent an alkyl group having 1 to 20 carbon atoms, an aryl group having 6 to 20 carbon atoms, an aralkyl group having 7 to 20 carbon atoms, or a triorganosiloxy group represented by $(R')_3SiO-$, wherein R' represents a monovalent hydrocarbon group having 1 to 20 carbon atoms; R' present in multiple number may be the same or different, and when $R^1$ or $R^2$ is each present in the number of 2 or more, $R^1$ and $R^2$ may be the same or different; Y represents a hydroxyl group or a hydrolyzable group, and when Y is present in the number of two or more, Y may be the same or different; a represents 0, 1, 2 or 3; b represents 0, 1, or 2; and m represents an integer of 0 to 19; and wherein, the relational expression of $a+mb \geq 1$ is satisfied, a vinyl polymer (II) having at least one crosslinkable functional group on average represented by the following general formula (2):

$$-OC(O)C(R^a)=CH_2 \quad (2)$$

wherein, $R^a$ represents a hydrogen atom or an organic group having 1 to 20 carbon atoms, and a photopolymerization initiator (III).

2. The curable composition according to claim 1 wherein the vinyl polymer (II) is produced by allowing a vinyl polymer having a halogen group at the end to react with a compound represented by the general formula (3):

$$M^+ \cdot OC(O)C(R^a)=CH_2 \quad (3)$$

wherein, $R^a$ represents a hydrogen atom or an organic group having 1 to 20 carbon atoms; and $M^+$ represents an alkali metal ion or a quaternary ammonium ion.

3. The curable composition according to claim 2 wherein the vinyl polymer having a halogen group at the end has a group represented by the general formula (4):

$$-CR^3R^4X \tag{4}$$

wherein, $R^3$ and $R^4$ represent a group bound to an ethylenic unsaturated group of the vinyl monomer; and X represents a chlorine atom, a bromine atom or an iodine atom.

4. The curable composition according to claim 1 wherein the vinyl polymer (I) and/or the vinyl polymer (II) have a molecular weight distribution of less than 1.8.

5. The curable composition according to claim 1 wherein the main chain of the vinyl polymer (I) and/or the vinyl polymer (II) is produced by polymerizing mainly a monomer selected from the group consisting of a (meth)acrylic monomer, an acrylonitrile monomer, an aromatic vinyl monomer, a fluorine-containing vinyl monomer and a silicon-containing vinyl monomer.

6. The curable composition according to claim 1 wherein the main chain of the vinyl polymer (I) and/or the vinyl polymer (II) is a (meth)acrylic polymer.

7. The curable composition according to claim 1 wherein the main chain of the vinyl polymer (I) and/or the vinyl polymer (II) is an acrylic polymer.

8. The curable composition according to claim 1 wherein the main chain of the vinyl polymer (I) and/or the vinyl polymer (II) is an acrylate ester polymer.

9. The curable composition according to claim 1 wherein the main chain of the vinyl polymer (I) and/or the vinyl polymer (II) is produced by a living radical polymerization process.

10. The curable composition according to claim 1 wherein the main chain of the vinyl polymer (I) and/or the vinyl polymer (II) is produced by an atom transfer radical polymerization process.

11. The curable composition according to claim 1 wherein the vinyl polymer (I) and/or the vinyl polymer (II) have at least one of the crosslinkable functional groups in the molecular chain at the end.

12. The curable composition according to claim 1 wherein the amount of the vinyl polymer (II) blended is no less than 20% and no greater than 80% of the total amount of the vinyl polymer (I) and the vinyl polymer (II) by weight ratio.

13. The curable composition according to claim 1 further comprising a polyether polymer (IV).

14. The curable composition according to claim 13 wherein the main chain of the polyether polymer (IV) is substantially polypropylene oxide.

15. The curable composition according to claim 13 wherein the polyether polymer (IV) has at least one crosslinkable silyl group on average.

16. The curable composition according to claim 1 further comprising a vinyl polymer (V) having a number average molecular weight of no greater than 5,000.

17. The curable composition according to claim 16 wherein the vinyl polymer (V) has a molecular weight distribution of less than 1.8.

* * * * *